United States Patent [19]

Miyasaka

[11] Patent Number: 5,187,517
[45] Date of Patent: Feb. 16, 1993

[54] CAMERA CONTROLLABLE WITH USE OF A CONTROL PROGRAM

[75] Inventor: Tetsuo Miyasaka, Kanagawa, Japan

[73] Assignee: Olympus Optical Co., Ltd., Tokyo, Japan

[21] Appl. No.: 775,788

[22] Filed: Oct. 11, 1991

[30] Foreign Application Priority Data

Oct. 15, 1990 [JP] Japan .................................. 2-275970
Dec. 13, 1990 [JP] Japan .................................. 2-402069

[51] Int. Cl.⁵ .............................................. G03B 17/00
[52] U.S. Cl. .................................. 354/412; 354/289.12
[58] Field of Search ............ 354/412, 465, 471, 289.1, 354/289.12

[56] References Cited

U.S. PATENT DOCUMENTS

| | | | |
|---|---|---|---|
| 4,423,934 | 1/1984 | Lambeth et al. | 354/412 |
| 4,692,005 | 9/1987 | Takami | 354/289.1 X |
| 4,853,733 | 8/1989 | Watanabe et al. | 354/412 |
| 4,945,365 | 7/1990 | Fujino | 354/412 X |
| 4,962,397 | 10/1990 | Ishikawa et al. | 354/412 X |
| 4,999,661 | 3/1991 | Ueno et al. | 354/412 |
| 5,030,979 | 7/1991 | Kobayashi et al. | 354/412 |
| 5,040,016 | 8/1991 | Ishikawa et al. | 354/412 |
| 5,097,283 | 3/1992 | Kazumi | 354/412 |

FOREIGN PATENT DOCUMENTS 1-2031 1/1989 Japan .
2-941 1/1990 Japan .

*Primary Examiner*—W. B. Perkey
*Attorney, Agent, or Firm*—Frishauf, Holtz, Goodman & Woodward

[57] ABSTRACT

A camera of the present invention which is controllable by execution of a program therefor operates in accordance with the control program for controlling the driving of each constituent camera element, the program being one inputted from an external unit. The camera comprises inputting section for inputting the control program consisting of an English character/numeral string, detection section for detecting whether or not the English character/numeral string satisfies specified conditions, symbol-code producing section for producing a symbol code in the case where the English character/numeral string satisfies the specified conditions, memory section for storing, in the form of a set of data, the symbol code and the foremost address of a subroutine used to execute a control instruction represented by the symbol code correspondingly to this symbol code, searching section for searching the foremost address in accordance with the symbol code, and execution section for causing each constituent camera element to operate in accordance with the address searched by the searching section.

49 Claims, 61 Drawing Sheets

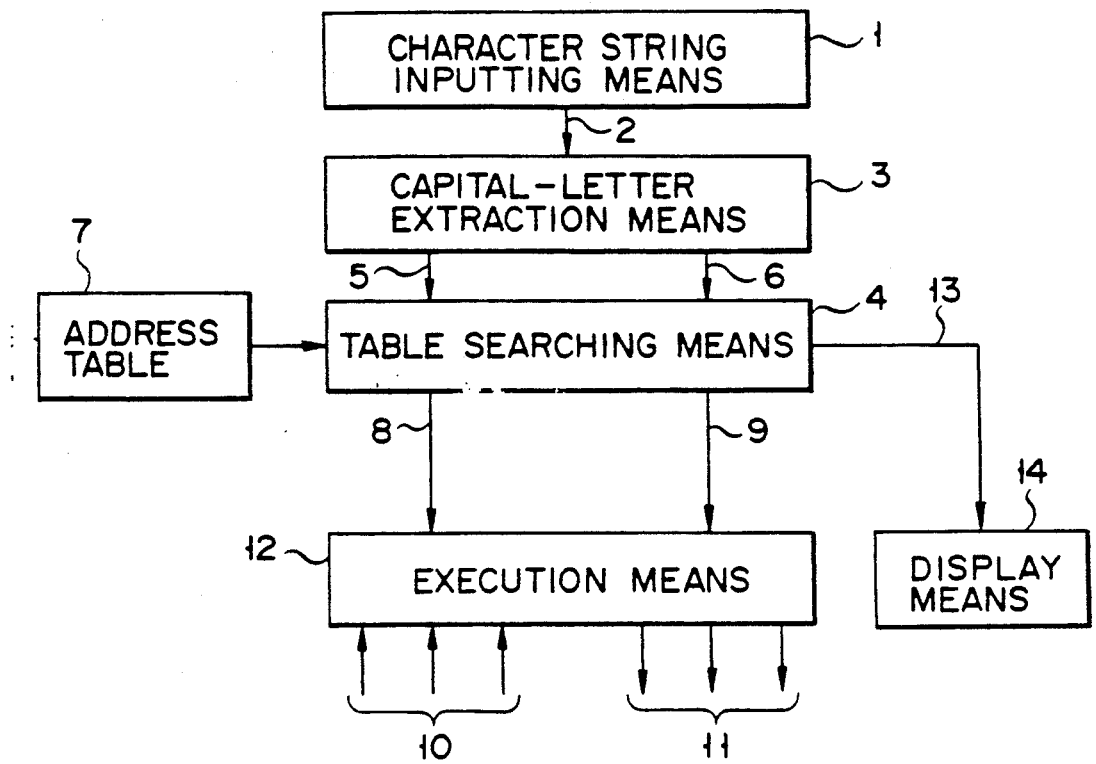
F I G. 1
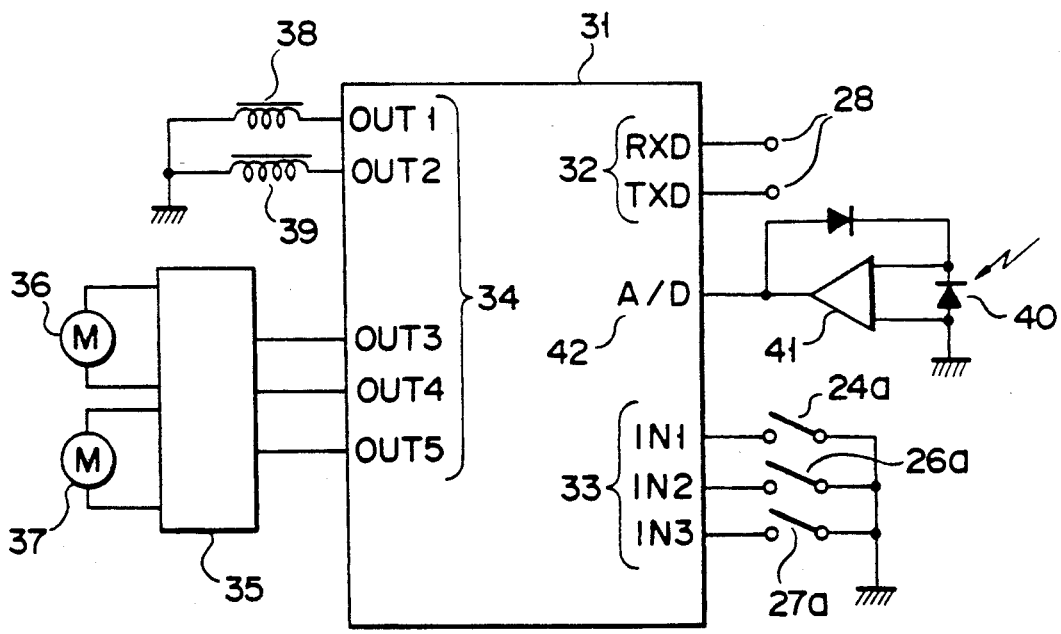
F I G. 3

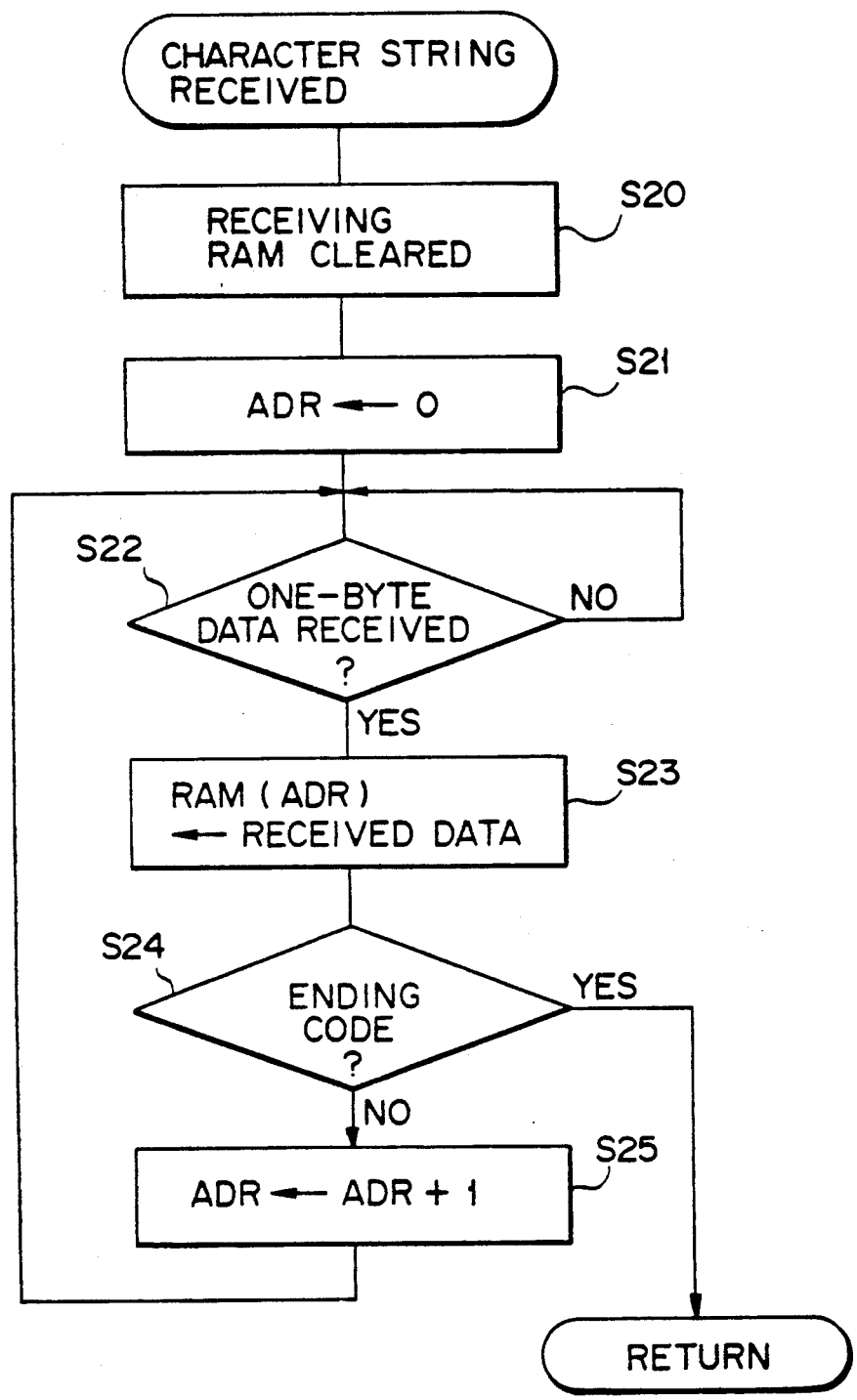
F I G. 6

FIG. 8A

| RAM ADDRESS | DATA | CHARACTER |
|---|---|---|
| 0000 | 49h | I |
| 0001 | 46h | F |
| 0002 | 20h | (SPACE) |
| 0003 | 4Fh | O |
| 0004 | 50h | P |
| 0005 | 54h | T |
| 0006 | 49h | I |
| 0007 | 4Fh | O |
| 0008 | 4Eh | N |
| 0009 | 41h | A |
| 000A | 4Ch | L |
| 000B | 20h | (SPACE) |
| 000C | 42h | B |
| 000D | 55h | U |
| 000E | 54h | T |
| 000F | 54h | T |

FIG. 8B

| RAM ADDRESS | DATA | CHARACTER |
|---|---|---|
| 0010 | 4Fh | O |
| 0011 | 4Eh | N |
| 0012 | 0Dh | (CR) |
| 0013 | 4Dh | M |
| 0014 | 49h | I |
| 0015 | 52h | R |
| 0016 | 52h | R |
| 0017 | 4Fh | O |
| 0018 | 52h | R |
| 0019 | 20h | (SPACE) |
| 001A | 55h | U |
| 001B | 50h | P |
| 001C | 0Dh | (CR) |
| 001D | 00h | (ENDING CODE) |
| 001E | 00h | |
| 001F | 00h | |

| RAM ADDRESS | DATA | CHARACTER |
|---|---|---|
| 0100 | 4Fh | O |
| 0101 | 42h | B |
| 0102 | 4Dh | M |
| 0103 | 55h | U |
| 0104 | 40h | |
| 0105 | 01h | |
| 0106 | 02h | |
| 0107 | C6h | |
| 0108 | 2Bh | |
| 0109 | | |
| 010A | | |
| 010B | | |
| 010C | | |
| 010D | | |
| 010E | 12h | |
| 010F | 00h | |

FIG. 8D

| RAM ADDRESS | DATA |
|---|---|
| 0100 | H(1) |
| 0101 | H(2) |
| 0102 | H(3) |
| 0103 | H(4) |
| 0104 | ADRI |
| 0105 | BIT |
| 0106 | ADRC |
| 0107 | |
| 0108 | |
| 0109 | |
| 010A | |
| 010B | |
| 010C | ADR |
| 010D | |
| 010E | CRADR |
| 010F | |

FIG. 8C

| | |
|---|---|
| IF OPTIONAL BUTTON | (SAMPLE SENTENCE) |
| IF OPTIONAL BUTTON | (IN THE CASE WHERE SPACES ARE LONG) |
| IF OPTION BOTAN | (IN THE CASE WHERE SPELLINGS ARE ERRONEOUS) |
| IF O B | (IN THE CASE WHERE THE SENTENCE IS EXPRESSED WITH CAPITAL LETTERS ONLY) |

F I G. 11

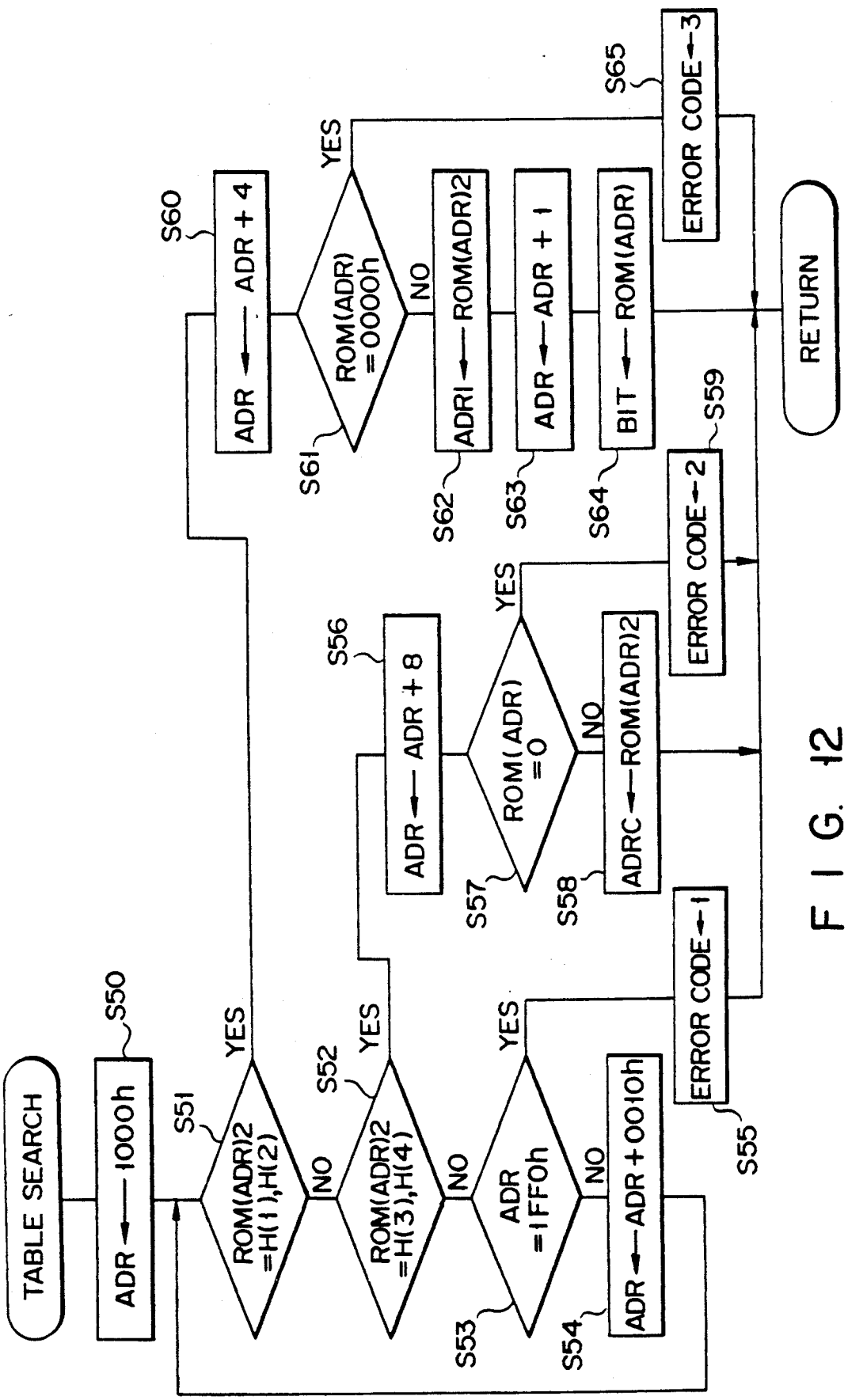
F I G. 12

| ROM LOWER-ORDER ADDRESS | |
|---|---|
| 0 | CAPITAL LETTER CODE 1 |
| 1 | CAPITAL LETTER CODE 2 |
| 2 | |
| 3 | |
| 4 | RAM ADDRESS USED WHEN INPUTTING OPERATION IS PERFORMED |
| 5 | |
| 6 | RAM BIT LOCATION |
| 7 | |
| 8 | FOREMOST ADDRESS AT CONTROL PROCESSING SUBROUTINE |
| 9 | |

FIG. 13B

| ROM ADDRESS | | |
|---|---|---|
| 1000 | OPTION BUTTON PROCESSING DATA TABLE | TABLE REGION |
| 1010 | MIRROR UP PROCESSING DATA TABLE | |
| 1020 | ----- | |
| 1FF0 | | |
| 2000 | | PROGRAM REGION |
| 2AE3 | OPTION BUTTON PROCESSING SUBROUTINE | |
| 2BC6 | MIRROR UP PROCESSING SUBROUTINE | |

| ROM ADDRESS | |
|---|---|
| 1000 | 4Fh ("O") |
| 1001 | 42h ("B") |
| 1002 | |
| 1003 | |
| 1004 | 40h |
| 1005 | 01h |
| 1006 | 02h |
| 1007 | |
| 1008 | E3h |
| 1009 | 2Ah |

FIG. 13D

| ROM ADDRESS | |
|---|---|
| 1010 | 4Dh ("M") |
| 1011 | 55h ("U") |
| 1012 | |
| 1013 | |
| 1014 | 41h |
| 1015 | 01h |
| 1016 | 04h |
| 1017 | |
| 1018 | C6h |
| 1019 | 2Bh |

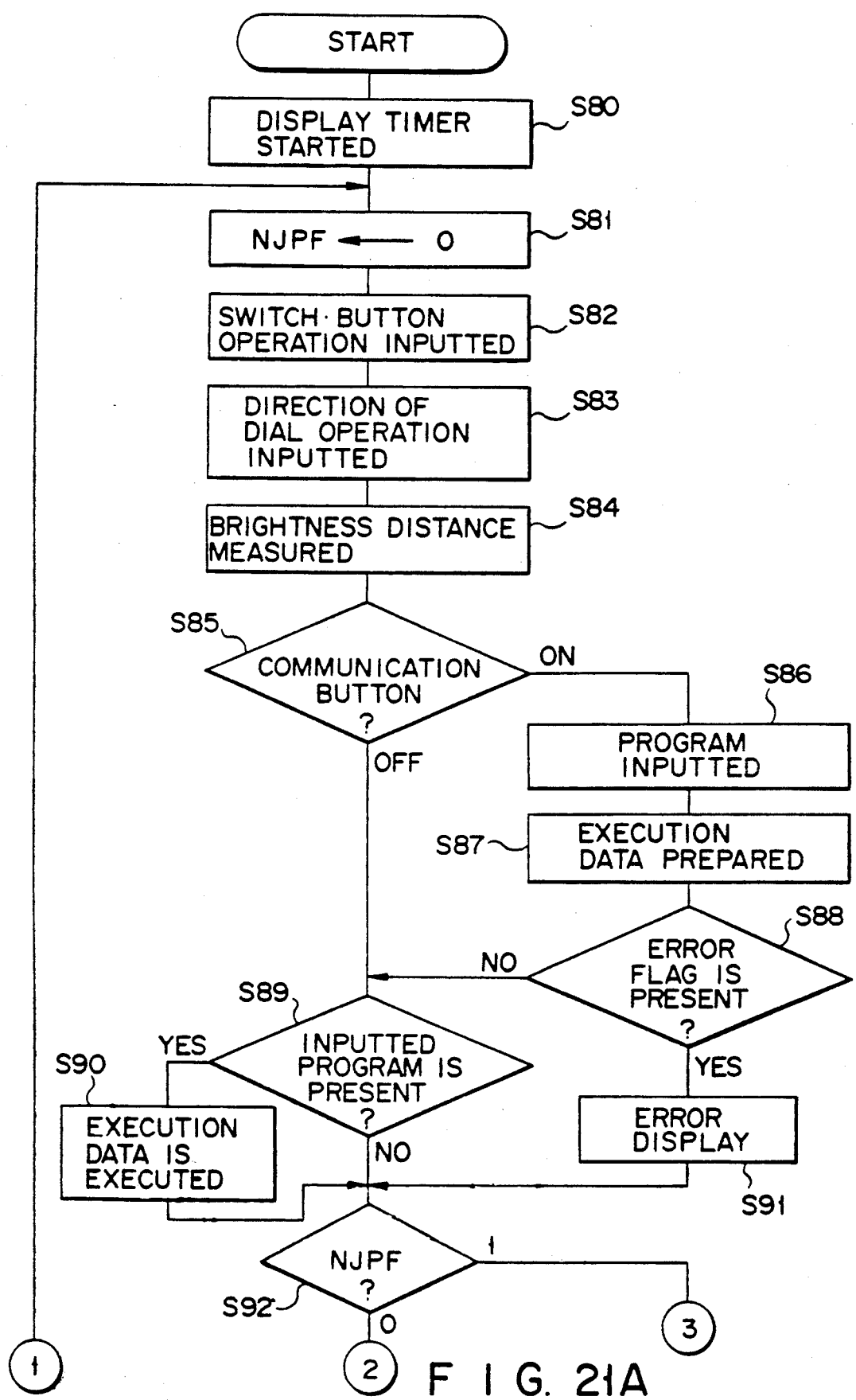
F I G. 21A

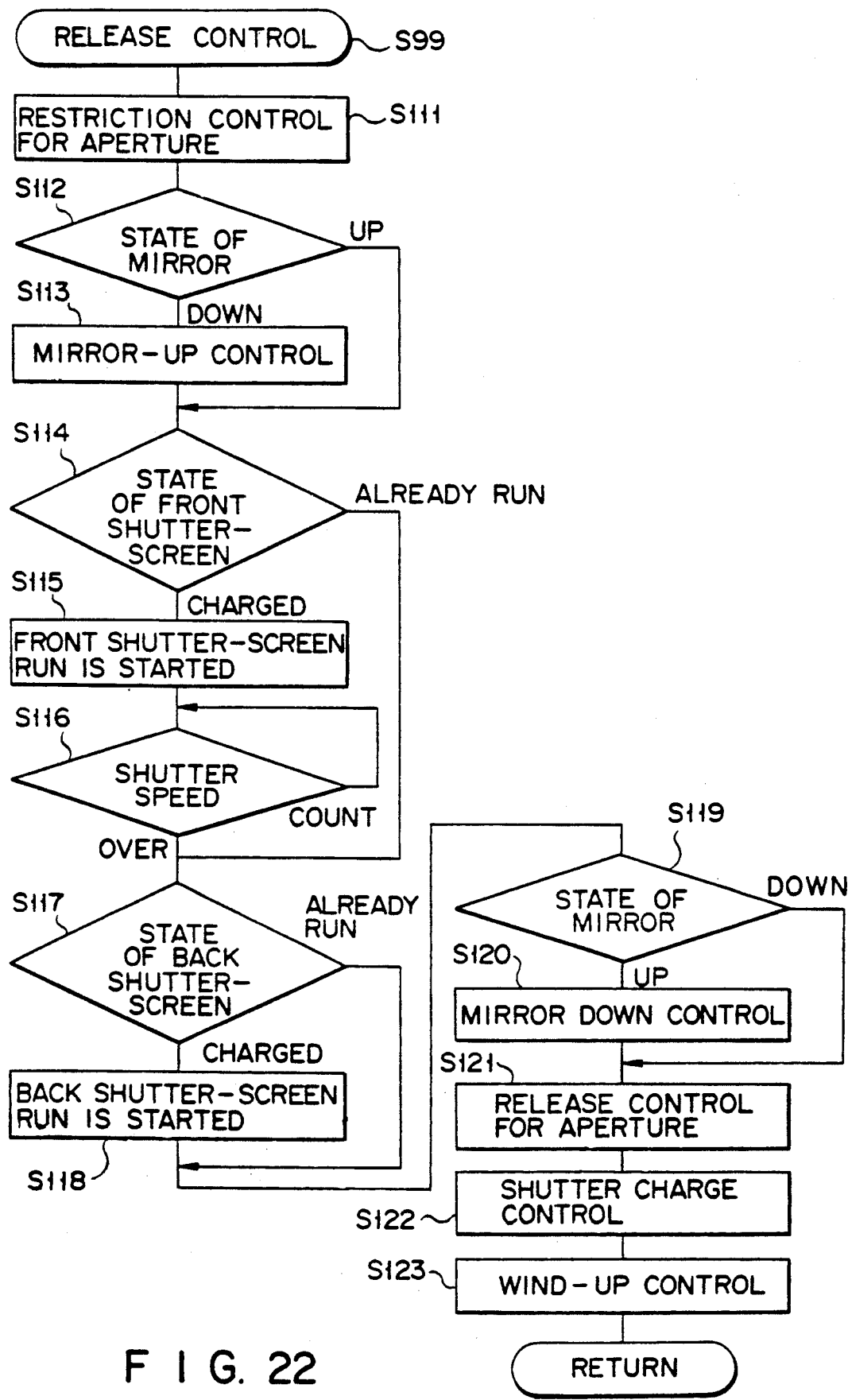
F I G. 22

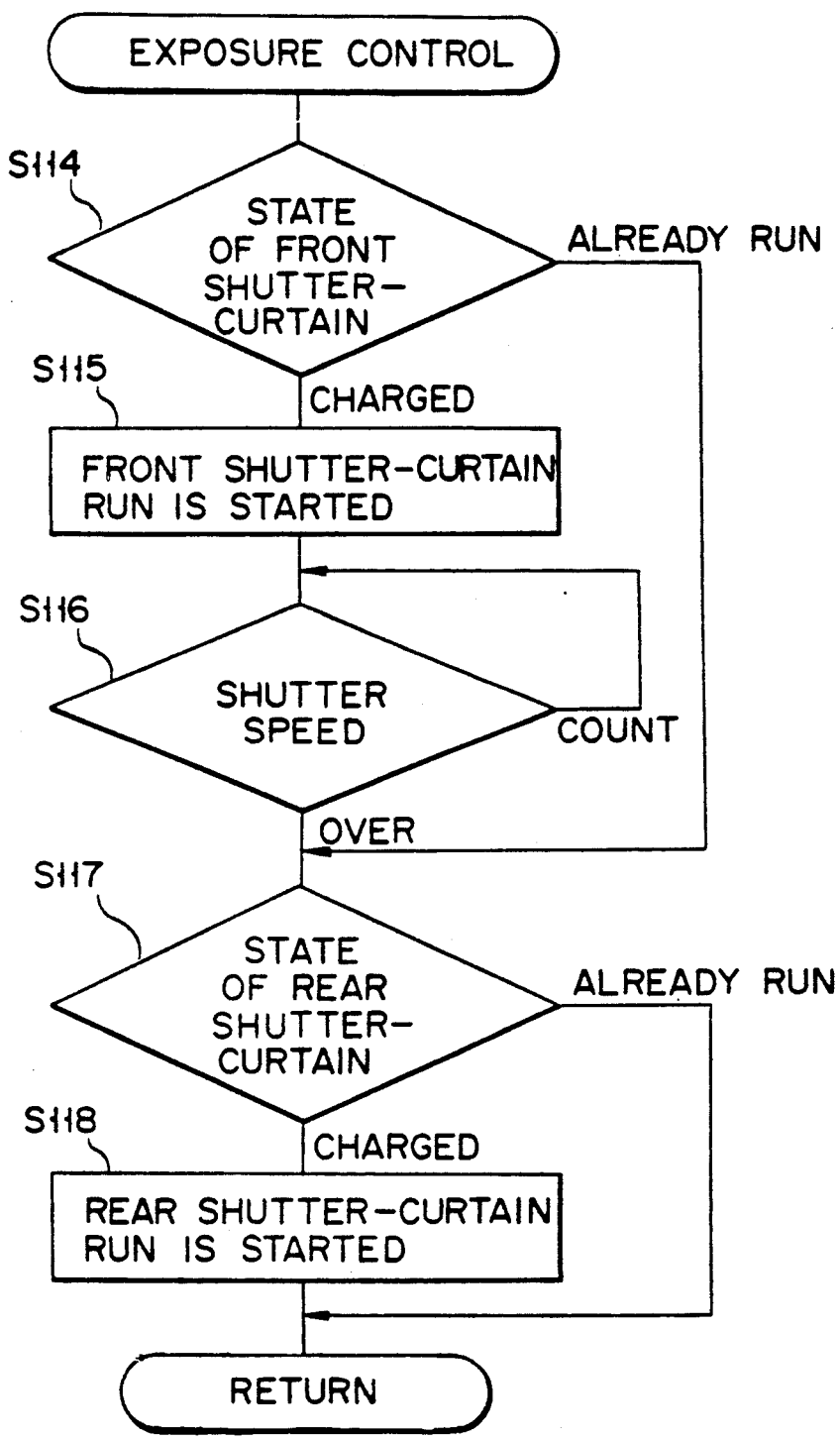
F I G. 23

| SUBROUTINE AREA ||
|---|---|
| ADDRESS | |
| 9000 ~ | MIRROR UP CONTROL |
| 91C2 ~ | MIRROR DOWN CONTROL |
| 93AE ~ | SHUTTER RELEASING (FRONT-CURTAIN RUN STARTING) CONTROL |
| 9415 ~ | SHUTTER-CLOSING (REAR-CURTAIN RUN STARTING) CONTROL |
| 963B ~ | WIND-UP CONTROL |
| 98D2 ~ | SHUTTER CHARGE CONTROL |
| 9B30 ~ | AF CONTROL |
| A103 ~ | RESTRICTION CONTROL FOR APERTURE |
| A20A ~ | RELEASE CONTROL FOR APERTURE |
| A2CE ~ | RELEASE CONTROL |

| ADDRESS | DATA | CHARACTER | ADDRESS | DATA | CHARACTER |
|---------|------|-----------|---------|------|-----------|
| 0200 | 20 | (SP) | 0210 | 44 | D |
| 1 | 20 | (SP) | 1 | 45 | E |
| 2 | 49 | I | 2 | 20 | (SP) |
| 3 | 46 | F | 3 | 42 | B |
| 4 | 20 | (SP) | 4 | 55 | U |
| 5 | 45 | E | 5 | 54 | T |
| 6 | 58 | X | 6 | 54 | T |
| 7 | 50 | P | 7 | 4F | O |
| 8 | 4F | O | 8 | 4E | N |
| 9 | 53 | U | 9 | 3D | = |
| A | 55 | S | A | 4F | O |
| B | 52 | R | B | 4E | N |
| C | 45 | E | C | 0D | (CR) |
| D | 20 | (SP) | D | 00 | |
| E | 4D | M | E | 00 | |
| F | 4F | O | F | 00 | |

F I G. 27

| BIT<br>ADDRESS | 7 | 6 | 5 | 4 | 3 | 2 | 1 | 0 |
|---|---|---|---|---|---|---|---|---|
| 0600 | FOREMOST-WORD DATA (ESYM) | | | | SYMBOL DATA (ECP) | | | |
| 1 | INPUT/OUTPUT OBJECT FORMAT (ETYP) | | | | | | | |
| 2<br>3 | INPUT/OUTPUT OBJECT ADDRESS (EADR) | | | | | | | |
| 4 | INPUT/OUTPUT OBJECT BIT LOCATION (EBIT) | | | | | | | |
| 5<br>6<br>7 | OPERATIONAL-STATE CONFIRMATION DATA (ESEQ) | | | | | | | |
| 8<br>9<br>A<br>B | FOREMOST CHARACTER DATA OF INPUT OUTPUT OBJECT (EHD$) | | | | | | | |
| C<br>D<br>E<br>F | INPUT DISCRIMINATION VALUE DATA (EVAL) OUTPUT CONTROL VALUE | | | | (EVAL0)<br>(EVAL1)<br>(EVAL2)<br>(EVAL3) | | | |

F I G. 28

| BIT LOCATION AT ADDRESS 0600 → | 7 | 6 | 5 | 4 | 3 | 2 | 1 | 0 | SYMBOL |
|---|---|---|---|---|---|---|---|---|---|
| | ← ESYM → | | | | ← ECP → | | | | |
| FOREMOST WORD | | | | | | | | | |
| IF | 0 | 0 | 0 | 1 | 0 | 0 | 0 | 1 | > |
| & IF | 0 | 0 | 1 | 0 | 0 | 0 | 1 | 0 | >= OR => |
| THEN | 0 | 0 | 1 | 1 | 0 | 0 | 1 | 0 | = |
| END | 0 | 0 | 0 | 0 | 0 | 1 | 0 | 0 | <= OR =< |
| | | | | | 0 | 1 | 1 | 0 | < |
| | | | | | 0 | 1 | 0 | 0 | <> OR >< |
| | | | | | 0 | 0 | 0 | 0 | NO SYMBOL |

FIG. 29

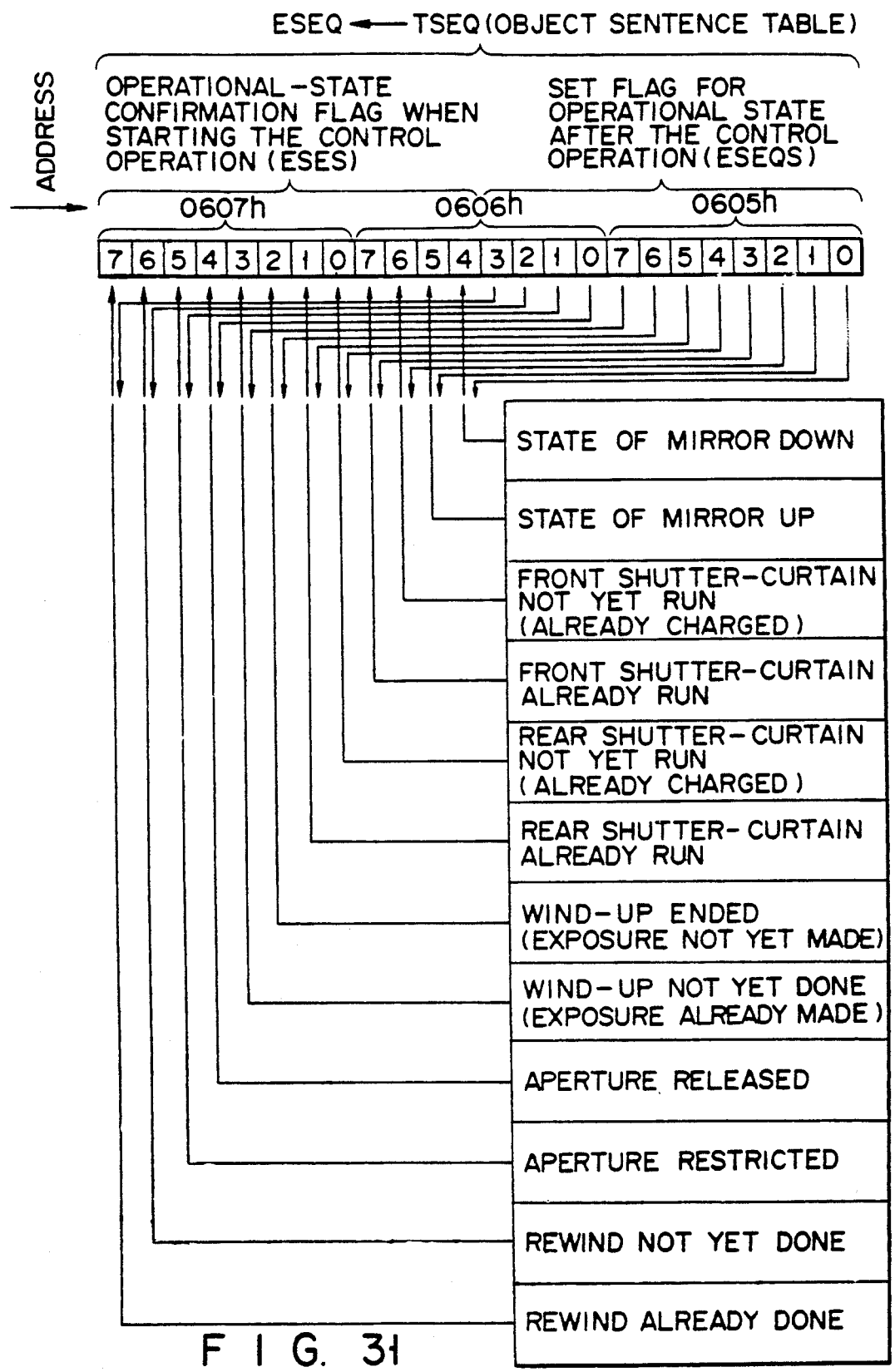
F I G. 31

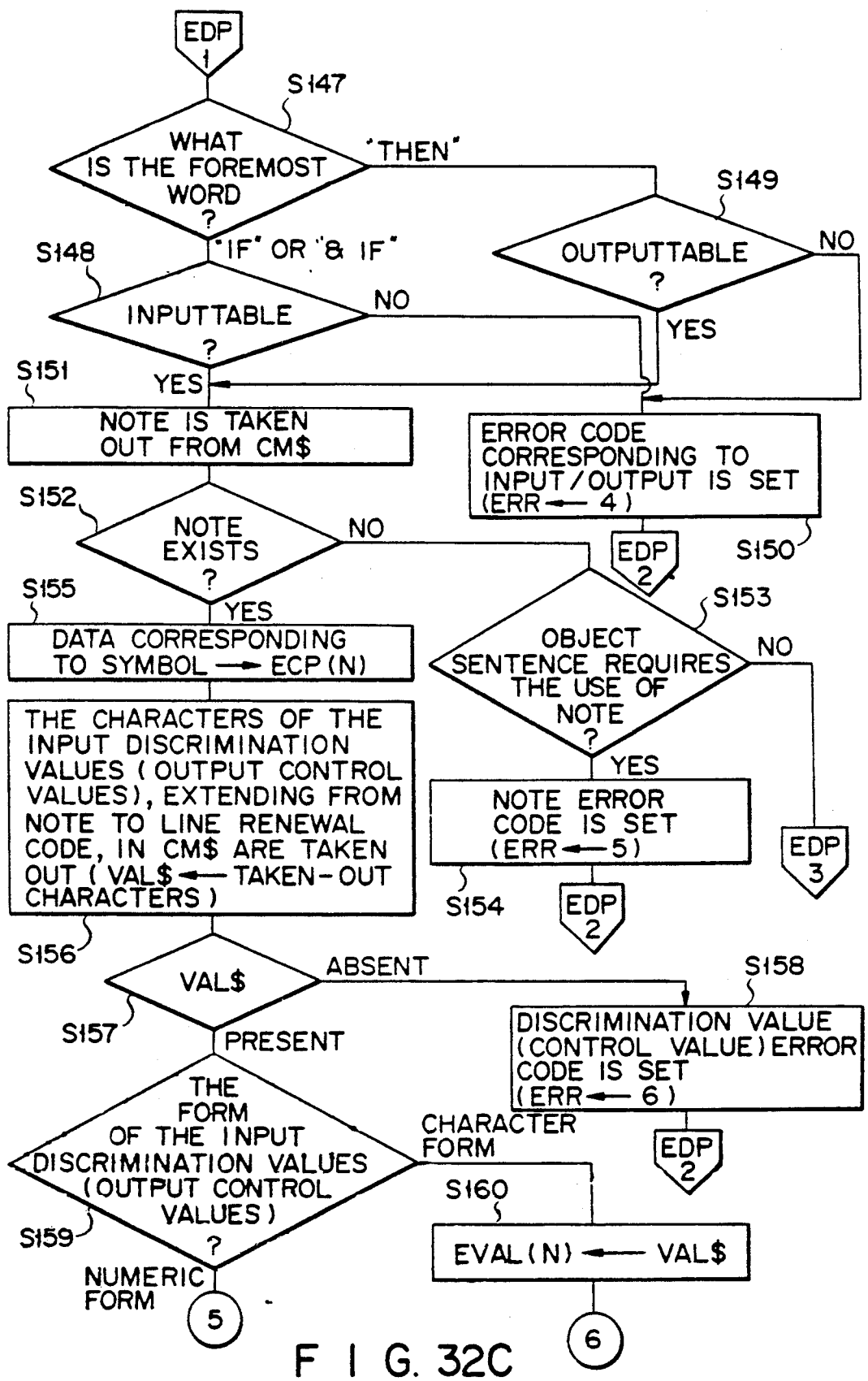
F I G. 32C

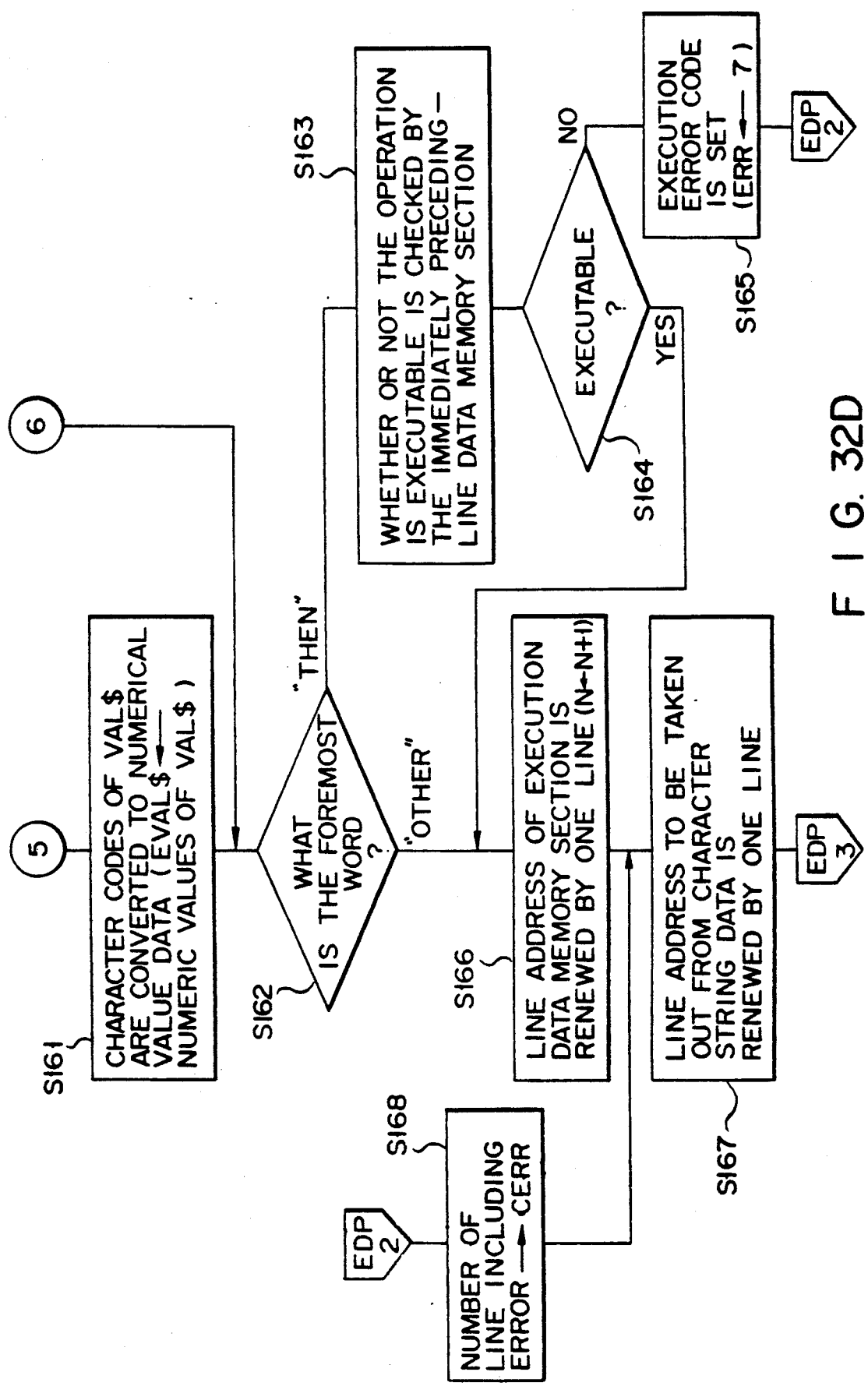
F I G. 32D

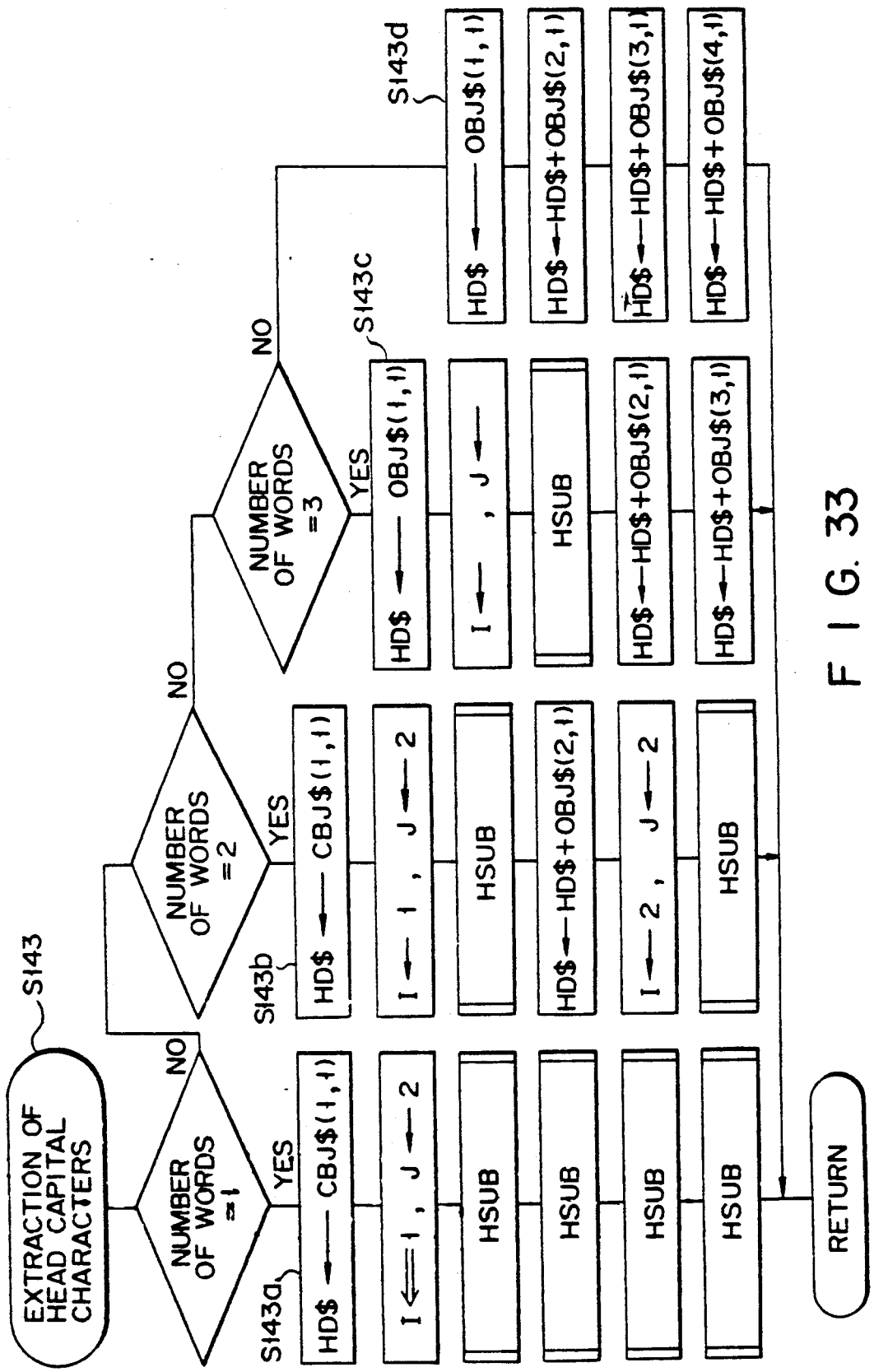
F I G. 33

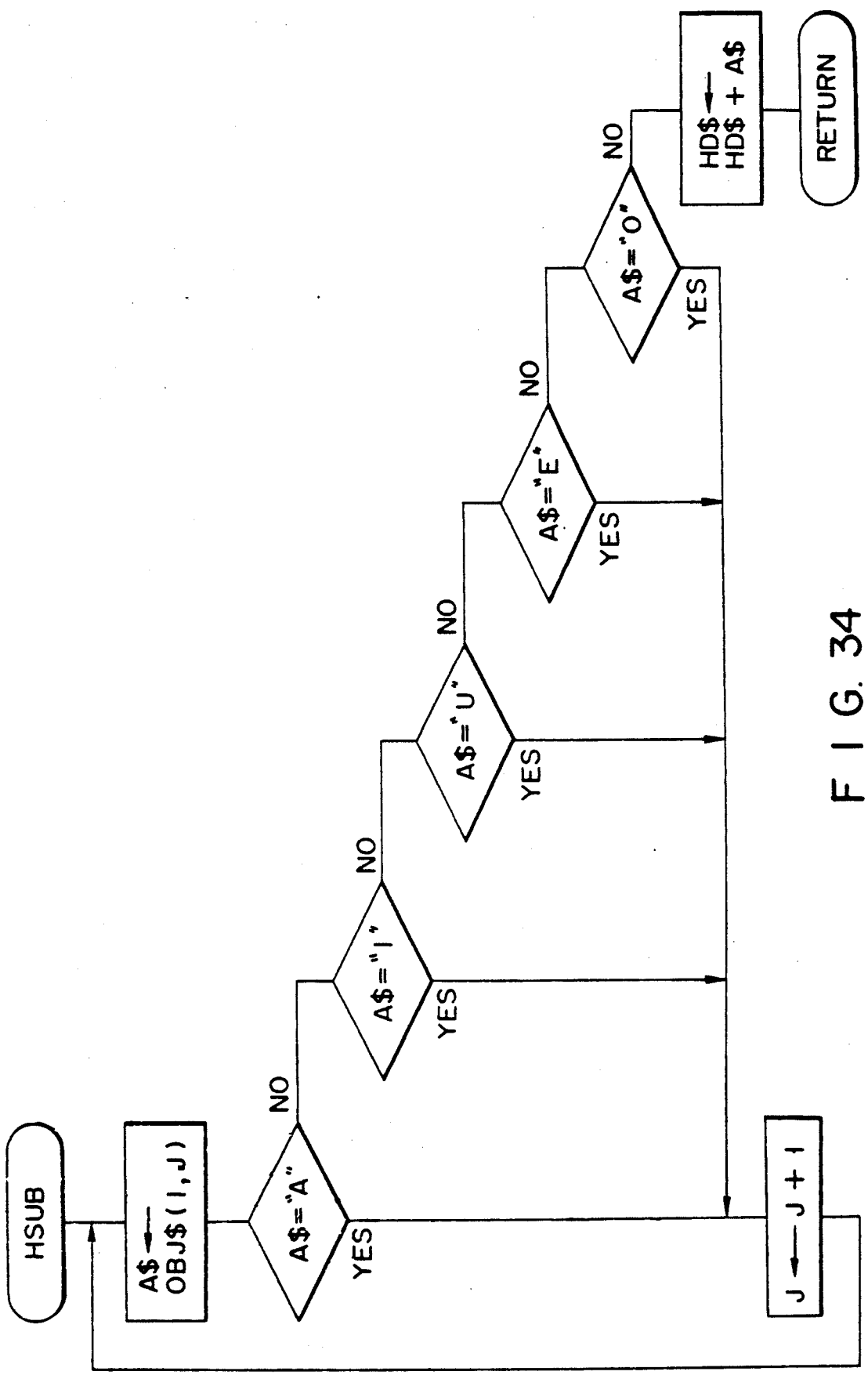
F I G. 34

| ROM ADDRESS | NAMING | | THDS | | | | TADR | | TBIT | TTYP | TSEQ |
|---|---|---|---|---|---|---|---|---|---|---|---|
| CORRESPONDING OBJECT SENTENCE | LOWER-ORDER ADDRESS | HIGHER-ORDER ADDRESS | 0 | 1 | 2 | 3 | 4 | 5 | 6 (7 6 5 4 3 2 1 0) | | |
| DISPLAY BUTTON | 800 | | "D" 44 | "S" 53 | "B" 42 | "T" 54 | 01 | 00 | 00000011 03 | | |
| RELEASE BUTTON | 801 | | "R" 52 | "L" 4C | "B" 42 | "T" 54 | 01 | 00 | 00000100 0C | | |
| EXPOSURE MODE BUTTON | 802 | | "E" 45 | "X" 58 | "M" 4D | "B" 42 | 01 | 00 | 11000000 C0 | | |
| MIRROR UP | 803 | | "M" 4D | "R" 52 | "U" 55 | "P" 50 | 90 | 00 | 00 | | |
| MIRROR DOWN | 804 | | "M" 4D | "R" 52 | "D" 44 | "W" 57 | 91 | C2 | 00 | | |
| APERTURE OPEN | 805 | | "A" 41 | "P" 50 | "O" 4F | "P" 50 | A2 | 0A | 00 | | |
| APERTURE CLOSE | 806 | | "A" 41 | "P" 50 | "C" 43 | "L" 4C | A1 | 03 | 00 | | |
| SHUTTER OPEN | 807 | | "S" 53 | "H" 48 | "O" 4F | "P" 50 | 93 | AE | 00 | | |
| SHUTTER CLOSE | 808 | | "S" 53 | "H" 48 | "C" 43 | "L" 4C | 44 | 15 | 00 | | |
| WIND UP | 809 | | "W" 57 | "N" 4E | "U" 55 | "P" 50 | 96 | 3B | 00 | | |
| ISO | 80A | | "I" 49 | "S" 53 | "O" 4F | 00 | 01 | 20 | 11111111 FF | | |
| ISO BUTTON | 80B | | "I" 49 | "S" 53 | "B" 42 | "T" 54 | 01 | 00 | 00110000 30 | | |
| EXPOSURE MODE | 80C | | "E" 45 | "X" 58 | "M" 4D | "D" 44 | 01 | 10 | 00110000 30 | | |
| DRIVE MODE | 80D | | "D" 44 | "R" 52 | "M" 4D | "D" 44 | 01 | 10 | 00001100 0C | | |
| SHUTTER CHARGE | 80E | | "S" 53 | "H" 48 | "C" 43 | "H" 48 | 98 | D2 | 00 | | |

FIG. 35A

| CORRE-SPONDING OBJECT SENTENCE | ROM ADDRESS | | | TTYP | | TSEQ | | |
|---|---|---|---|---|---|---|---|---|
| | THDS | TADR | TBIT | 7 | 8 | 9 | A | |
| | | | | 7 6 5 4 3 2 1 0 | | | | |
| DISPLAY BUTTON | | | | 1 1 0 0 0 0 0 1<br>C1 | 00 | 00 | 00 | |
| RELEASE BUTTON | | | | 1 1 0 0 0 0 0 1<br>C1 | 00 | 00 | 00 | |
| EXPOSURE MODE BUTTON | | | | 1 1 0 0 0 0 0 1<br>C1 | 00 | 00 | 00 | |
| MIRROR UP | | | | 0 0 0 0 0 1 1 0<br>06 | 0 0 0 0 0 0 0 1<br>01 | 0 1 0 1 0 0 0 0<br>50 | 0 0 0 0 0 0 1 0<br>02 | |
| MIRROR DOWN | | | | 0 0 0 0 0 1 1 0<br>06 | 0 0 0 0 0 0 0 0<br>00 | 0 1 0 0 0 0 0 0<br>40 | 0 0 0 0 0 0 0 1<br>01 | |
| APERTURE OPEN | | | | 0 0 0 0 0 1 1 0<br>06 | 0 0 1 0 0 0 0 0<br>20 | 0 0 0 0 0 0 0 1<br>01 | 0 0 0 0 0 0 0 0<br>00 | |
| APERTURE CLOSE | | | | 0 0 0 0 0 0 0 1<br>01 | 0 0 0 0 0 0 0 0<br>00 | 0 0 0 0 0 0 1 0<br>02 | 0 0 0 0 0 0 0 0<br>00 | |
| SHUTTER OPEN | | | | 0 0 0 0 0 1 1 0<br>06 | 0 0 0 0 0 0 0 1<br>01 | 0 1 1 0 0 0 0 0<br>60 | 0 0 0 1 1 0 0 0<br>18 | |
| SHUTTER CLOSE | | | | 0 0 0 0 0 1 1 0<br>06 | 0 0 0 0 0 0 0 1<br>01 | 1 0 1 0 0 0 0 0<br>A0 | 0 1 0 1 0 0 0 0<br>A8 | |
| WIND UP | | | | 0 0 0 0 0 1 1 0<br>06 | 0 0 0 0 1 0 0 0<br>08 | 0 0 0 0 0 0 0 0<br>00 | 0 1 0 0 0 0 0 0<br>40 | |
| ISO | | | | 0 0 0 1 0 0 1 1<br>43 | 00 | 00 | 00 | |
| ISO BUTTON | | | | 1 1 0 0 0 0 0 1<br>C1 | 00 | 00 | 00 | |
| EXPOSURE MODE | | | | 1 0 0 0 0 0 1 1<br>83 | 00 | 00 | 00 | |
| DRIVE MODE | | | | 1 0 0 0 0 0 1 1<br>83 | 00 | 00 | 00 | |
| SHUTTER CHARGE | | | | 0 0 0 0 0 1 1 0<br>06 | 0 0 0 0 0 0 1 0<br>02 | 1 0 0 0 0 0 0 0<br>80 | 0 0 0 1 0 1 0 0<br>14 | |

F I G. 35B

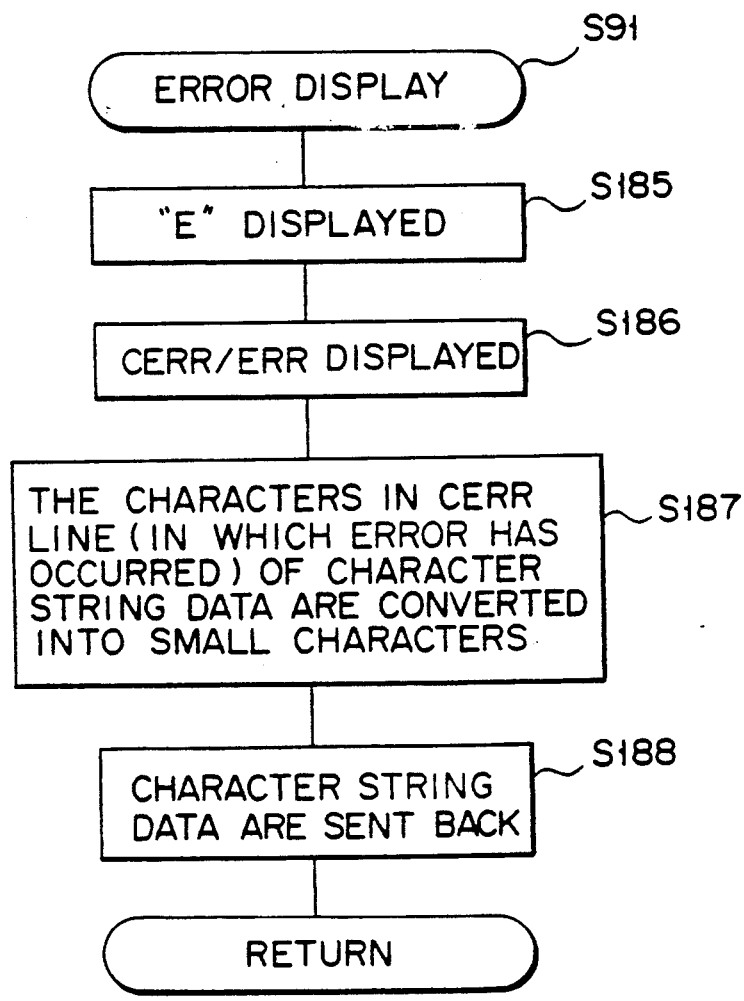
F I G. 37

F5.6　250

F I G. 38

E 3 7

F I G. 39

```
IF ISO BUTTON = OFF/ON
THEN MIRROR UP
then shutter close
```

F I G. 40

| NAMING | ESYM | ECP | ETYP | EADR | | EBIT | ESEQ | | | | EHDS | | | | EVAL | | | |
|---|---|---|---|---|---|---|---|---|---|---|---|---|---|---|---|---|---|---|
| LOWER-ORDER ADDRESS BIT | | 0 | 1 | 2 | 3 | 4 | 5 | 6 | 7 | 8 | 9 | A | B | C | D | E | F |
| HIGHER-ORDER ADDRESS | | 7 6 5 4 3 2 1 0 | | | | | | | | | | | | | | | | |
| 060 | | 0 0 0 1 0 0 1 1<br>1 3 | 49 | 01 | 00 | C0 | 00 | 00 | 00 | "E"<br>45 | "X"<br>58 | "M"<br>4D | "B"<br>42 | 00 | 00 | 00 | 03 |
| 061 | | 0 0 1 0 0 0 1 1<br>2 3 | 49 | 01 | 00 | 0C | 00 | 00 | 00 | "R"<br>52 | "L"<br>4C | "B"<br>42 | "T"<br>54 | 00 | 00 | 00 | 01 |
| 062 | | 0 0 1 1 0 0 0 0<br>3 0 | 06 | 90 | 00 | 00 | 01 | 50 | 02 | "M"<br>4D | "R"<br>52 | "U"<br>55 | "P"<br>50 | 00 | 00 | 00 | 00 |
| 063 | | 0 0 1 1 0 0 0 0<br>3 0 | 06 | 93 | AE | 00 | 01 | 60 | 18 | "S"<br>53 | "H"<br>48 | "O"<br>4F | "P"<br>50 | 00 | 00 | 00 | 00 |
| 064 | | 0 0 0 1 0 0 1 1<br>1 3 | 49 | 01 | 00 | C0 | 00 | 00 | 00 | "E"<br>45 | "X"<br>58 | "M"<br>4D | "B"<br>42 | 00 | 00 | 00 | 02 |
| 065 | | 0 0 0 1 0 0 1 1<br>1 3 | 49 | 01 | 00 | 0C | 00 | 00 | 00 | "R"<br>52 | "L"<br>4C | "B"<br>42 | "T"<br>54 | 00 | 00 | 00 | 02 |
| 066 | | 0 0 1 1 0 0 0 0<br>3 0 | 06 | 94 | 15 | 00 | 01 | A0 | A8 | "S"<br>53 | "H"<br>48 | "C"<br>43 | "L"<br>4C | 00 | 00 | 00 | 00 |
| 067 | | 0 0 1 1 0 0 0 0<br>3 0 | 06 | 91 | C2 | 00 | 00 | 40 | 01 | "M"<br>4D | "R"<br>52 | "D"<br>44 | "W"<br>57 | 00 | 00 | 00 | 00 |
| 068 | | 0 0 1 1 0 0 0 0<br>3 0 | 06 | 98 | D2 | 00 | 02 | 80 | 14 | "S"<br>53 | "H"<br>48 | "C"<br>43 | "H"<br>48 | 00 | 00 | 00 | 00 |
| 069 | | 0 0 1 1 0 0 0 0<br>3 0 | 06 | 93 | 6B | 00 | 08 | 00 | 40 | "W"<br>57 | "N"<br>4E | "U"<br>55 | "P"<br>50 | 00 | 00 | 00 | 00 |
| 06A | | 6 0 | 00 | 00 | 00 | 00 | 00 | 00 | 00 | 00 | 00 | 00 | 00 | 00 | 00 | 00 | 00 |

F I G. 41

| CHARACTER / NUMERICAL VALUE | STATE OF BUTTON/ SWITCH | DIAL | EXPOSURE MODE | WIND-UP MODE | FOCUS MODE | LIGHT MEASURING MODE | FOCAL DISTANCE | FOCUSED STATE |
|---|---|---|---|---|---|---|---|---|
| \\ INPUT DISCRIMINATION SENTENCE · OUTPUT CONTROL SENTENCE ||||||||
| 0 | OFF | OFF | P | S | A | AVERAGE | W | OUT |
| 1 | OFF/ON | R | A | C | M | SPOT | S | IN |
| 2 | ON/OFF | L | S | | | EVALUATE | T | |
| 3 | ON | | M | | | | | |

F I G. 45

| 1 | ◻ | IF | EXMB = 3 |
|---|---|---|---|
| 2 | 1 | & IF | RLBT = 1 |
| 3 | 2 | THEN | MRUP |
| 4 | 3 | THEN | SHOP |

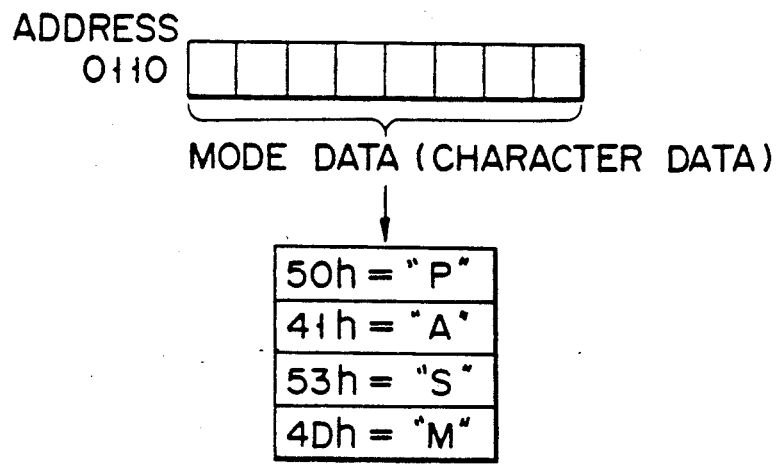
F I G. 52B
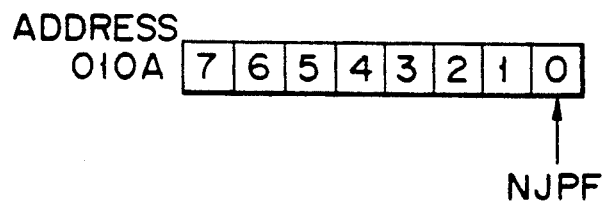
F I G. 53A
| INPUT DISCRIMINATION SENTENCE | SPECIFIC VALUE |
|---|---|
| ENABLE | 0 |
| DISABLE | 1 |
F I G. 53B

| OBJECT SENTENCE | THD$ | | | | TADR | | TBIT | | TTYP | |
|---|---|---|---|---|---|---|---|---|---|---|
| | "N" | "R" | "P" | "R" | | | 7 6 5 4 3 2 1 0 | | 7 6 5 4 3 2 1 0 | |
| NORMAL PROGRAM | 4E | 52 | 50 | 52 | 01 | 0A | 0 0 0 0 0 0 0 1 | 01 | 1 0 0 0 0 0 1 1 | 83 |

FIG. 54B

| OBJECT SENTENCE | THD$ | | | | TADR | | TBIT (7 6 5 4 3 2 1 0) | | TTUP (7 6 5 4 3 2 1 0) | |
|---|---|---|---|---|---|---|---|---|---|---|
| TIMER | "T" 54 | "M" 4D | "G" 45 | "R" 62 | A3 | EA | 0000 0000 | 00 | 1010 0110 | A6 |
| COUNTER | "C" 43 | "N" 4E | "T" 54 | "R" 52 | 01 | 28 | 1111 1111 | FF | 1001 0011 | 93 |
| COUNT UP | "C" 43 | "N" 4E | "U" 55 | "P" 50 | A4 | 00 | 0000 0000 | 00 | 0001 0110 | 16 |
| COUNT DOWN | "C" 43 | "N" 4E | "O" 44 | "W" 57 | A4 | CE | 0000 0000 | 00 | 0001 1110 | 1E |

FIG. 55A

| OBJECT SENTENCE | THD$ | | | | TADR | | TBIT (7 6 5 4 3 2 1 0) | | TTYP (7 6 5 4 3 2 1 0) | |
|---|---|---|---|---|---|---|---|---|---|---|
| FOCUS COMPENSATION | "F" 46 | "C" 43 | "C" 43 | "M" 46 | A6 | 2A | 0000 0000 | 00 | 1001 0110 | 96 |
| FOCUS | "F" 46 | "C" 43 | "U" 55 | "S" 53 | A6 | 54 | 0000 0000 | 00 | 1010 0110 | A6 |

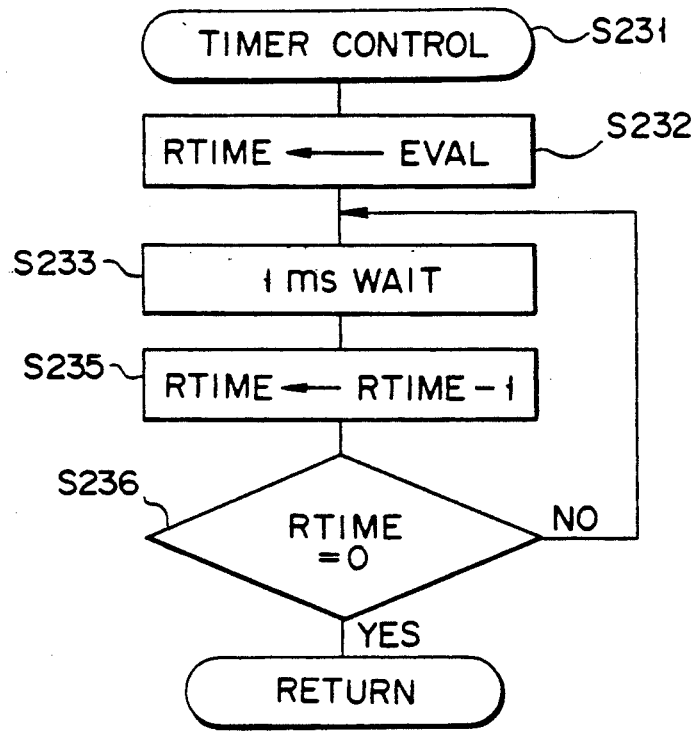
F I G. 54C
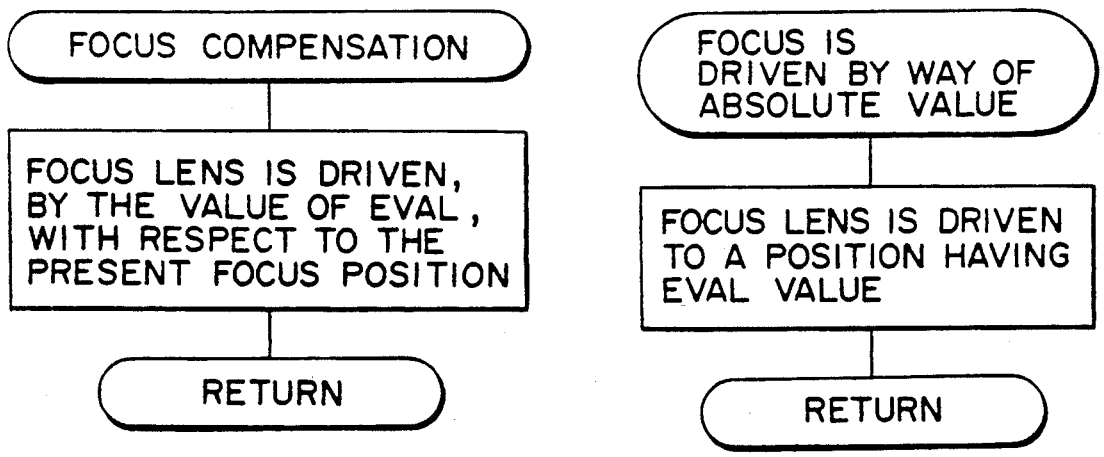
F I G. 55B  F I G. 55C

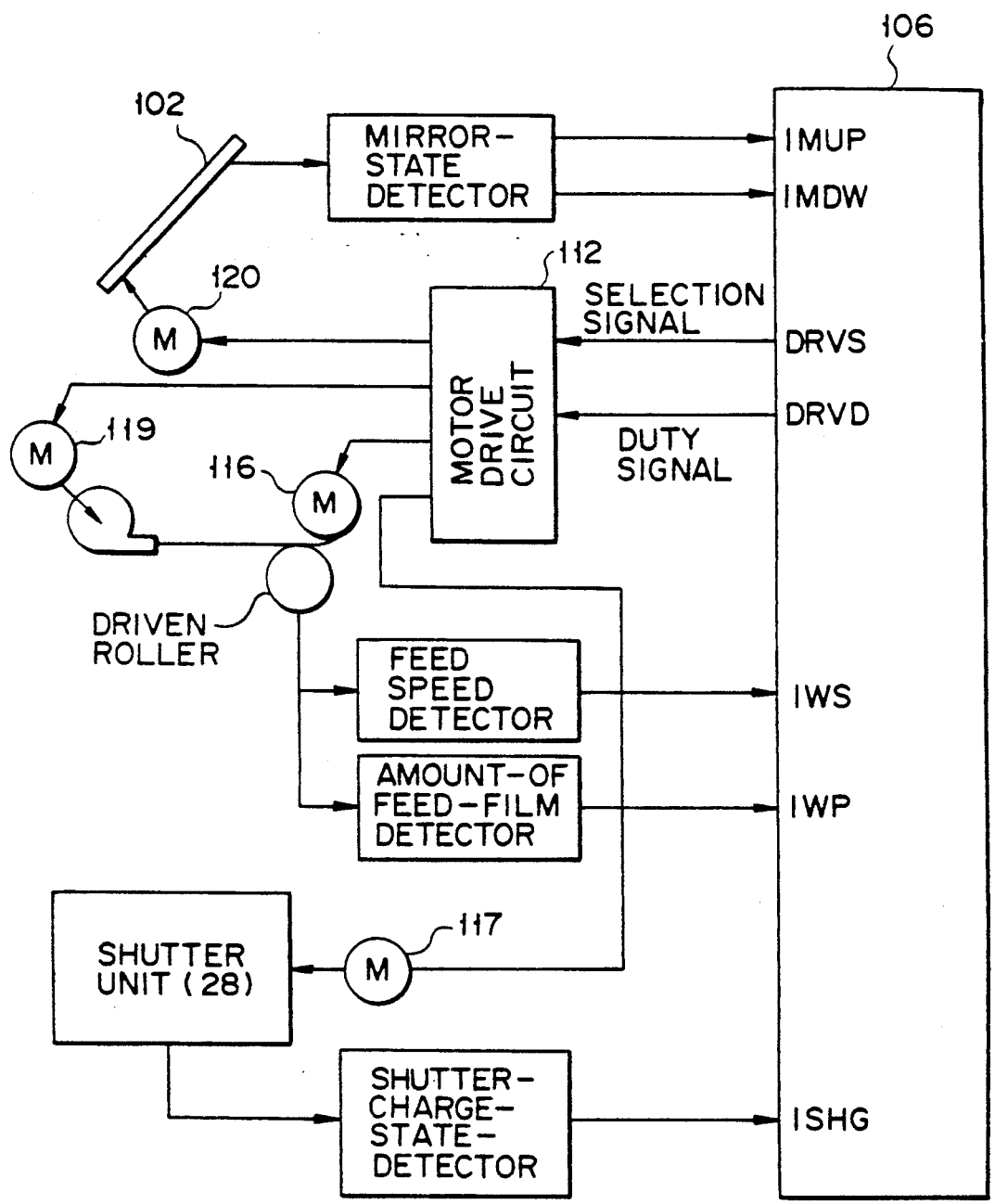
F I G. 56

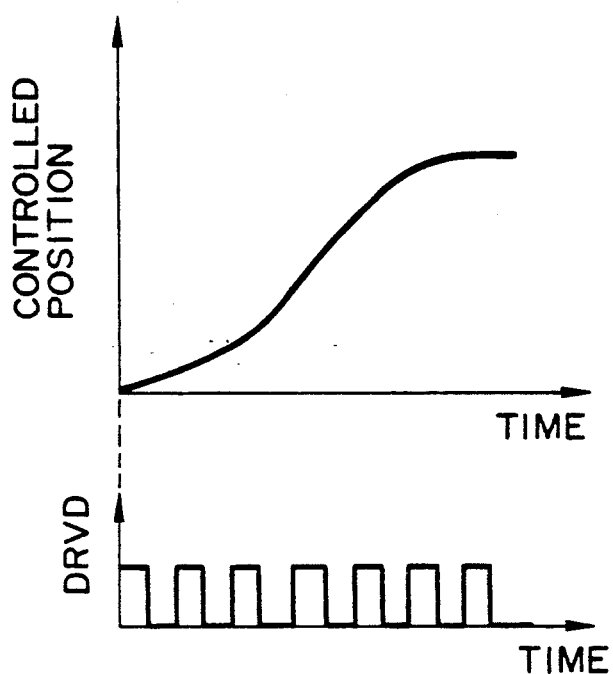
F I G. 57
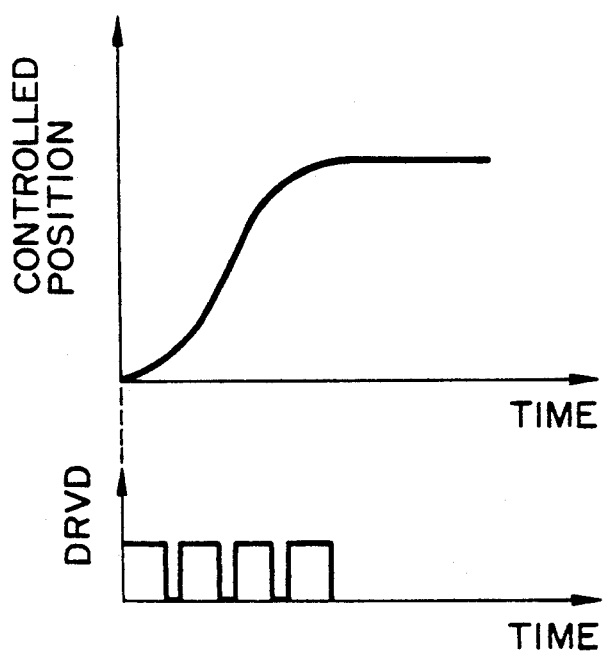
F I G. 58

| OBJECT SENTENCE | THDS | | | | TADR | | TBIT | | | TTYP | | |
|---|---|---|---|---|---|---|---|---|---|---|---|---|
| | | | | | | | 7 6 5 | 4 3 | 2 1 0 7 | 6 5 4 | 3 2 | 1 0 |
| MIRROR UP SPEED | "M" 4D | "R" 52 | "U" 55 | "S" 53 | 01 | 31 | - - - FF | - - - - FF | - - - - 1 1 1 1 | 1 0 0 1 0 0 9 | 0 0 1 3 | 0 1 |
| MIRROR DOWN SPEED | "M" 4D | "R" 52 | "D" 44 | "S" 53 | 01 | 32 | - - - FF | - - - - FF | - - - - 1 1 1 1 | 1 0 0 1 0 0 9 | 0 0 1 3 | 0 1 |
| SHUTTER CHARGE SPEED | "S" 53 | "H" 48 | "C" 43 | "S" 53 | 01 | 33 | - - - FF | - - - - FF | - - - - 1 1 1 1 | 1 0 0 1 0 0 9 | 0 0 1 3 | 0 1 |
| WIND UP SPEED | "W" 57 | "N" 4E | "U" 55 | "S" 53 | 01 | 34 | - - - FF | - - - - FF | - - - - 1 1 1 1 | 1 0 0 1 0 0 9 | 0 0 1 3 | 0 1 |
| WIND UP LENGTH | "W" 57 | "N" 4E | "U" 55 | "L" 4C | 01 | 36 | - - - FF | - - - - FF | - - - - 1 1 1 1 | 1 0 1 0 0 0 A | 0 0 1 3 | 0 1 |
| REWIND SPEED | "R" 52 | "W" 57 | "S" 53 | "P" 50 | 01 | 35 | - - - FF | - - - - FF | - - - - 1 1 1 1 | 1 0 0 1 0 0 9 | 0 0 1 3 | 0 1 |
| REWIND LENGTH | "R" 52 | "W" 57 | "L" 4C | "N" 4E | 01 | 38 | - - - FF | - - - - FF | - - - - 1 1 1 1 | 1 0 1 0 0 0 A | 0 0 1 3 | 0 1 |

F I G. 61

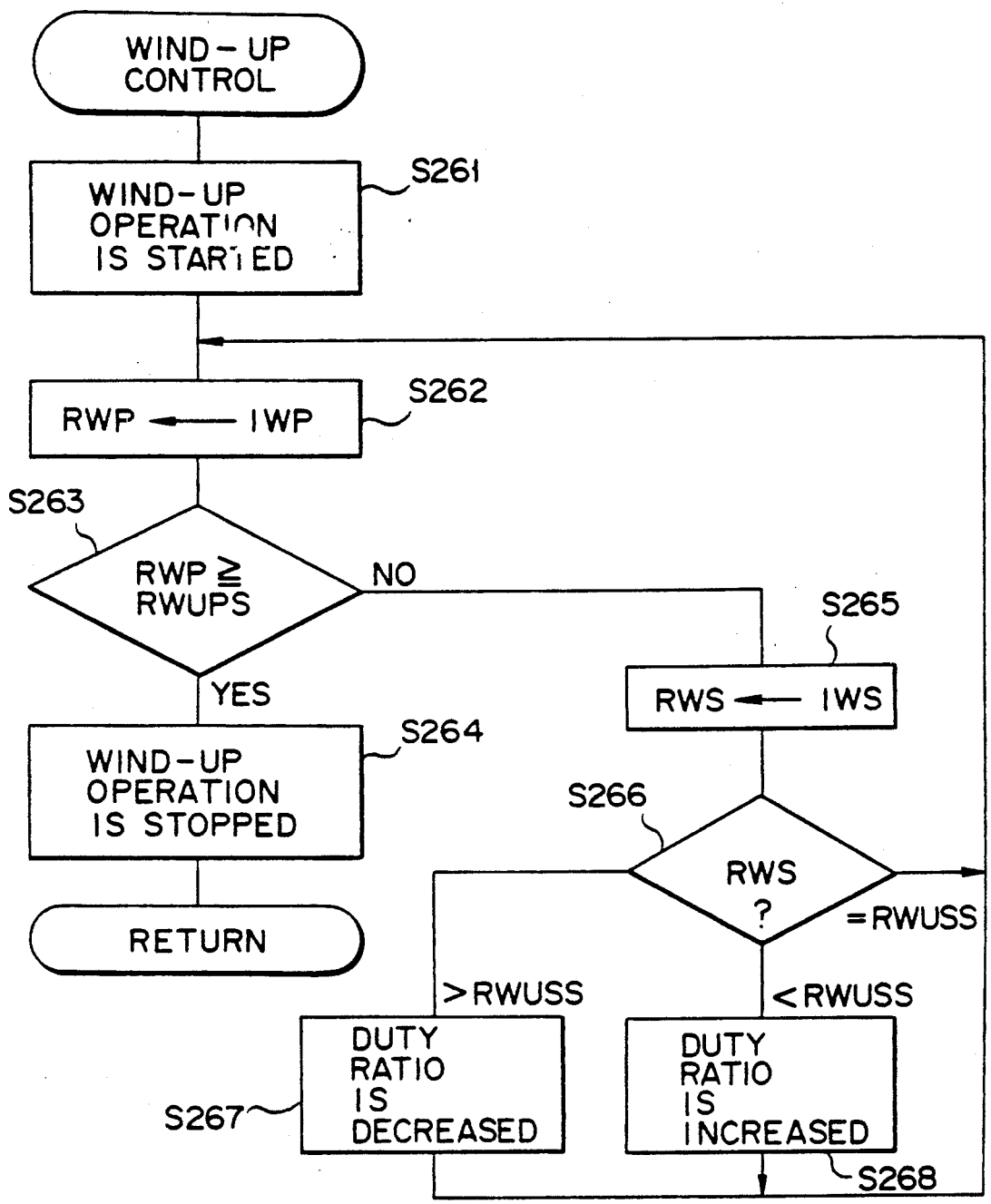
F I G. 62

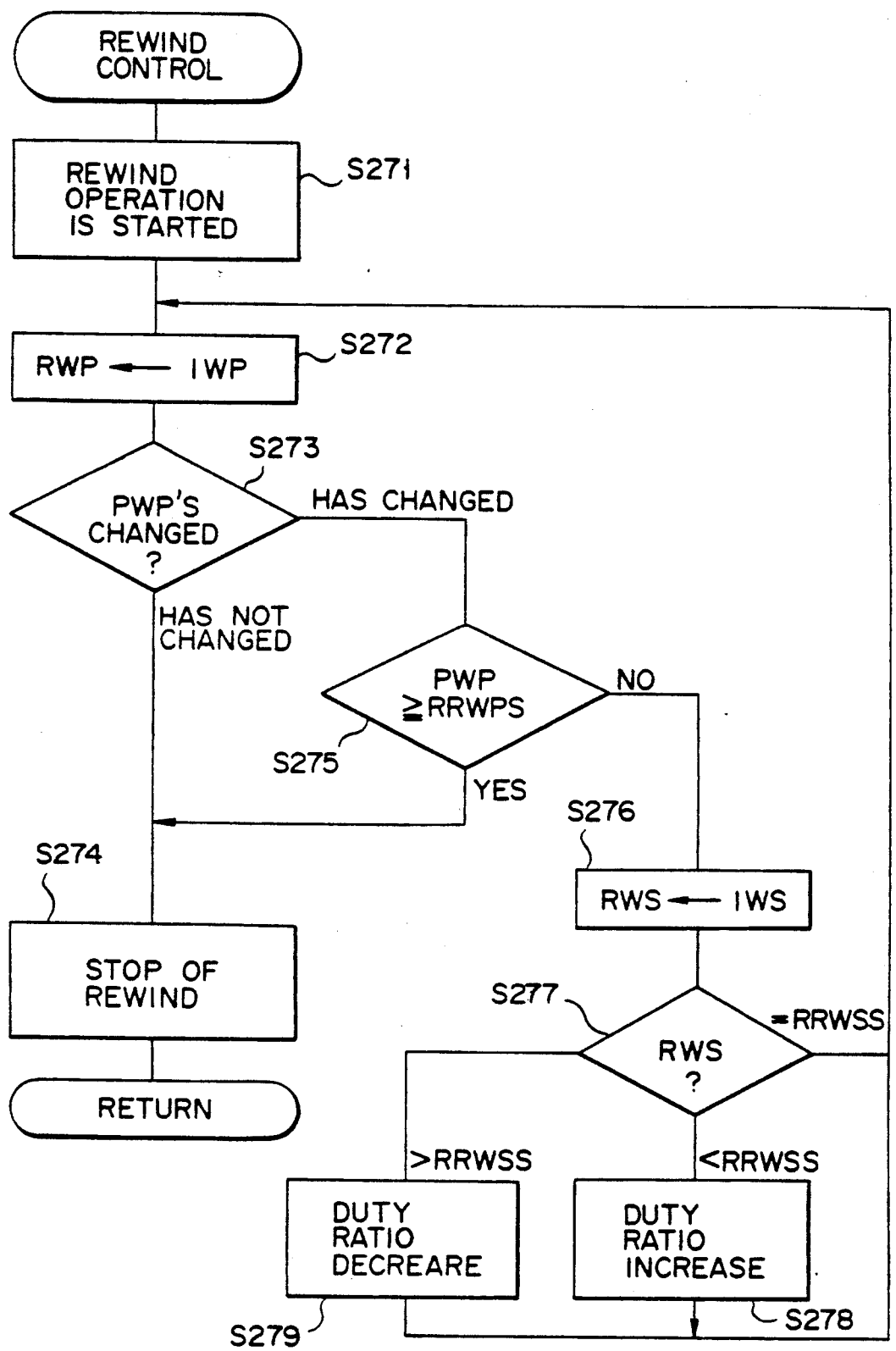
F I G. 64

CAMERA CONTROLLABLE WITH USE OF A CONTROL PROGRAM

BACKGROUND OF THE INVENTION

1. Field of the Invention

The present invention relates to a camera controllable with use of a control program, to which the program for controlling the operation of each camera mechanism is inputted from outside the camera and in which a plurality of operations are successively carried out in accordance with such program.

2. Description of the Related Art

Conventionally, there is a camera which has a function to cause each camera mechanism to operate through execution of programmed operations. In this type of camera, it is possible to change the contents of the program by sending from outside the camera to it a program intended to cause performance of operations other than the programmed operations stored in the camera.

The first technique of changing the aforesaid program contents is, as described in Japanese Patent Unexamined SHOWA Publication No. 64-2031 as filed by the applicant of this application to connect an external unit such as a computer to the camera, call a desired one control subroutine from among a plurality of control subroutines stored in a camera memory, and cause execution thereof, thereby independently causing execution of the control operation for each camera mechanism.

The second technique intended to serve the same purpose is, as described in Japanese Patent Unexamined HEISEI Publication No. 2-941, to successively call each control subroutine from a plurality of control subroutines stored in a camera memory and cause execution thereof.

By using the above techniques, it is possible to cause execution of a desired subroutine, corresponding to the operation of each camera mechanism, stored in the camera connected to the external unit, in a given sequential order. This makes it easy to analyze a failure of the camera as well as to check the operational state of the camera.

However, since the aforesaid change of the program contents is performed by reading-out or writing-in of a control subroutine, it is necessary that a person who has a high level of knowledge on the flowchart of program, or a repairman who has a similar level of knowledge on the system, performs such change through handling the external unit. For this reason, an ordinary user having no such knowledge is still unable to change the contents of the program.

Further, there exists a problem that even a person having such knowledge fails to cause the camera to operate unless he inputs the address of a control subroutine for an operation of camera desired, by himself, to be performed, with use of predetermined language and in accordance with predetermined procedures.

Accordingly, in the above-described techniques, it was necessary to determine beforehand the sequential order of calling a control subroutine when sequentially calling it, by use of an external unit, from among a plurality of control subroutines stored in a camera memory, so as to prevent the camera from performing an erroneous operation.

Further, in the above-described techniques, when an operator erroneously operates to call a control subroutine in a sequential order causing the camera to perform an abnormal operation, this erroneous operation becomes unavoidable because the camera has no mechanism to check such an erroneous operation. In case of a single lens reflex camera in particular, since the members or elements such as those of a shutter mechanism or mirror wind-up mechanism are connected with each other in a complicated manner, the above-mentioned abnormal operations sometimes destruct, or break, such members or elements inconveniently.

SUMMARY OF THE INVENTION

In view of the above, it is an object of the present invention to provide a camera which is inputted thereinto from the outside thereof a program for controlling the operations of mechanisms of the camera, to successively carry out a plurality of operations in accordance with the program, and in which, when a plurality of programs have been inputted thereinto in accordance with simple procedures, it is judged in advance whether or not the operations for each mechanism are executable in the sequential order designated by the control program, thereby preventing performance of abnormal operations as well as destruction of the mechanism elements, and which is thus controllable with use of a control program.

According to the present invention, there is provided a camera controllable with use of a control program, which comprises a plurality of control sections selectively controlled with use of an address data, a first memory section for storing therein a plurality of data strings concerning a plurality of controls, each of the plurality of data strings including, as for each control thereof, data of a symbol code representing this item of control, address data for the item of control, first data representing the state of operation of each camera mechanism necessary for causing a normal control operation to be performed, and second data representing the state of operation of each camera mechanism at a time immediately succeeding to the execution of the item of control, an inputting section for sequentially inputting a plurality of control programs, a searching section for searching the symbol code data in the first memory section in accordance with the control program thus inputted to derive the data string corresponding to the control program, an execution data producing section for causing at least the address data and the second data to be stored in a second memory section, each time the control program is inputted the at least address data and the second data being in the data string derived by the searching section, a control section for sequentially reading out the address data from the second memory section to selectively control a plurality of control objects in accordance with such address data, a section for making comparison between the first data derived by the searching section and the second data stored in the second memory section each time the control program is inputted, and thereby judging whether or not the execution of the inputted control program is possible, and a section for making judgement on the sequential order of inputting a plurality of control programs in regard to whether or not the control in that sequential order is executable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a fundamental construction of a camera;

FIG. 3 schematically shows an electric circuit inside the camera;

FIG. 6 is a flowchart for explaining a character-string receiving operation;

FIGS. 8A and 8B are views showing the stored contents of RAM in the case where a sample sentence has been received, FIG. 8C is a view showing an address map of registers used for execution of input processing, and FIG. 8D is a view showing the contents of registers used for execution of input processing;

FIG. 11 is a view showing an example of input of character strings;

FIG. 12 is a flowchart for explaining the processing operation intended to determine an input object and control object from the foremost characters as picked up;

FIGS. 13A, 13B, 13C and 13D are views for explaining data tables of ROM;

FIG. 21A is a flowchart showing a beginning half of a general flowchart showing the processing performed by CPU of the camera according to the present invention while

FIG. 22 is a flowchart showing the contents of a release control in FIG. 21A;

FIG. 23 is the flowchart of a subroutine for the processing of an exposure control in FIG. 22;

FIG. 27 is a view showing the character-string input area into which character codes composed of program language characters are inputted;

FIG. 28 is an address map showing the contents of execution data corresponding to one line in the execution data memory area;

FIG. 29 is a view showing data being stored in corresponding relation to the foremost words;

FIG. 31 is a view showing confirmation-flag data representing the states of operations of mechanism elements in the camera;

FIG. 32C is a flowchart showing a portion of from step 147 to step 160, of the flowchart covering from step 87 to step 167 intended for performance of the execution-data preparation processing;

FIG. 32D is a flowchart showing a portion of from step 161 to step 167, of the flowchart covering from step 87 to step 167 intended for performance of the execution-data preparation processing;

FIG. 33 is a flowchart showing a capital-letter extraction processing;

FIG. 34 is a flowchart showing the processing of detecting a vowel and thereby stopping the extraction of it;

FIG. 35A is a view showing the contents of object sentence tables;

FIG. 35B is a view showing the contents of object sentence tables;

FIG. 37 is a flowchart showing the processing of the operation "Error Display" in step 91 of the main flowchart shown in FIG. 21A;

FIG. 38 is a view showing the form of display of the display section prior to inputting of the program;

FIG. 39 is a view showing the form of display in the case where an error has occurred;

FIG. 40 is a view showing the form of display made the program producer at this time;

FIG. 41 is a view showing the contents stored in the execution-data memory area;

FIG. 45 is a view showing a specific value table arrangement;

FIG. 52A is a flowchart for the processing of exposure mode operation in the case where the exposure mode data is in the form of character data while FIG. 52B is a view showing the contents of a register storing therein exposure mode data;

FIG. 53A is a map of an address having a flag of NJPF and of bit locations,

FIG. 53B is a view showing a specific-value table arrangement, the tables of which are used in step 172 of FIG. 47.

FIG. 54B is a view showing an object sentence table arrangement corresponding to "TIMER", output object sentence, and FIG. 54C is a flowchart of a subroutine for performance of the timer processing;

FIG. 55A is a view showing object sentence tables corresponding to the output object sentence "FOCUS COMPENSATION", FIG. 55B is a flowchart showing a subroutine used to effect the focus compensation, and FIG. 55C is a flowchart showing a subroutine called at the time when the output object sentence is "FOCUS";

FIG. 56 is a block diagram of a circuit so constructed as to effect the speed control operations for specified motors;

FIG. 57 graphically shows a controlled position and DRVD (duty signal) as determined in relation to time in the case of performing the slow-speed driving of a specified motor;

FIG. 58 graphically shows a controlled position and DRVD (duty signal) as represented in relation to time in the case of performing the high-speed driving of a specified motor;

FIG. 59A is a flowchart showing the processing of a mirror-up control while

FIG. 61 is a view showing the contents of the object sentence tables each corresponding to an output object sentence table in the program;

FIG. 62 is a flowchart showing the processing of wind-up control;

FIG. 63A is a graphic diagram showing the wind-up speed and the wound-up length as represented in relation to time while

FIG. 64 is a flowchart showing the processing of rewind control; and

DETAILED DESCRIPTION OF THE PREFERRED EMBODIMENTS

Figure 2:
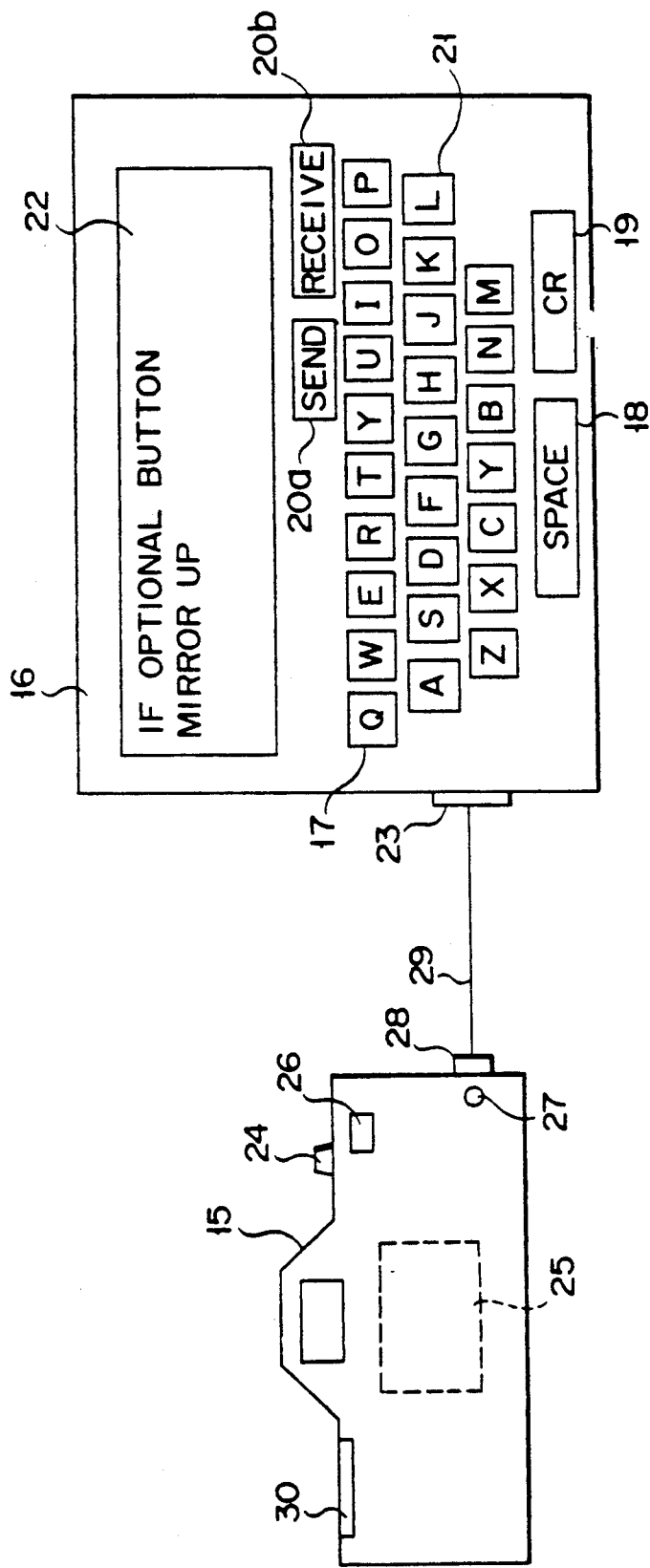
FIG. 2 is an outer appearance of a character-string producing unit and camera in combination.

Embodiments of the present invention will now be described in detail below.

FIG. 1 is a block diagram for explaining the fundamental principle of a camera controllable with use of a control program in accordance with a first embodiment of the present invention.

This diagram shows the construction of the camera which is intended to analyze the program expressed with use of character string information and produce a new program, in such a manner as to include the sequential order in which data are processed.

A character-string inputting section 1 is intended to cause a program, which consists of character string information 2 prepared by a personal computer or the like, to be inputted into the camera from the outside thereof. This character-string information 2 expresses the language "if A, then execute B" in a manner that "IF A THEN B". Namely, the character-string information 2 consists of a combination of two divided portions, one of which is a conditional portion ("IF ---") and the other of which is a control portion ("THEN ---"). It is to be noted that the word "THEN", which represents the head or foremost word of the character string of the control portion, is substituted for by a renewal code (hereinafter referred to --- CR ---) as later described. Namely, the mentioned character-string information is represented in a manner that "IF A (CR) B".

A capital-letter extraction section 3 is intended to extract capital letters in a character string succeeding to "IF" in the conditional portion as well as capital letters in a character string succeeding to "THEN" or (CR) in the control portion, from the inputted information 2.

Table searching section 4 is intended to derive a conditional portion address 8 and control portion address 9 from an address table 7 of ROM in which the extracted capital letters 5 in the conditional portion and the extracted capital letters 6 in the control portion are stored in advance. Note here that the conditional portion address 8 is an address of RAM storing therein data representing the states of input of input objects 10, or an address of an input port. The control portion address 9 is a ROM address of a foremost one of the programs stored in ROM for the purpose of controlling control objects 11. The address table 7 is a table storing therein the character code of the capital letters and the RAM or ROM address in the form of one set.

An execution section 12 is arranged to execute the control (of any one of the control objects 11) corresponding to the data of the control portion address 9 in response to the state of the input (of any one of the input objects 10) corresponding to the data of the conditional portion address 8.

Further, an error code 13 is one which, in case the extracted capital letters do not exist anywhere in the address table 7 when the table searching has been performed by the table searching section 4, indicates that the inputted character string is incapable of being executed, the error code 13 being displayed in a display section 14.

Next, FIG. 2 shows the outer appearance of a camera 15 controllable with use of a control program in accordance with the embodiment of the present invention and of a character-string preparation unit (producer) 16.

The character-string preparation unit 16 comprises a keyboard 21 composed of alphabet keys 17 including an "A" key to a "Z" key, a space key 18, a line renewal key 19, a sending key 20a and a receiving key 20b, a display section 22 displaying character-string information or the like, and a communication terminal 23 outputting character-string information or the like. Further, the character-string preparation unit 16 is not limited to a unit exclusively used for the camera according to the embodiment, but may be an ordinary personal computer having all of the functions possessed by such exclusive used unit.

The camera 15 is provided with a release button 24. Usually, a mirror 25 is driven through operation of the release button 24, whereby exposure is started. The camera 15 is also provided with an option button 26 the use purpose of which can be set by a user himself, and a communication button 27 used to permit the inputting of character-string information. The camera is also provided with a communication terminal 28 for inputting character-string information into the camera, the terminal 28 being connected to the communication terminal 23 of the character-string preparation unit 16. The camera is also provided with a display section 30 for displaying a shutter speed, a restriction value for aperture, etc.

FIG. 3 schematically shows an electric circuit inside the camera 15.

In this illustrated construction, a CPU 31 includes communication ports 32, input ports 33, output ports 34, ROM, RAM, and software for controlling them.

The communication ports 32 are constituted by a data receiving port (RXD) and a data sending port (TXD) and which are connected to the communication terminals 28. The input 33 are connected to switches 24a, 26a and 27a interlocked with the release button 24, the option button 26, and the communication button 27, respectively. The output ports 34 are connected to a mirror-up control motor 36 and a wind-up control motor 37 via a motor driver 35. The output ports 34 are also connected thereto with a front curtain magnet 38 and a rear curtain magnet 39 for controlling the front and rear curtains of a shutter. A light-receiving element 40 receives light having a specified value of brightness of an object desired to be photographed, the light current corresponding to the brightness of the photographing object being converted into a level of voltage by a light measuring amplifier 41 and inputted into CPU 31 via an analog-digital conversion input port 42 thereof.

Figure 4:
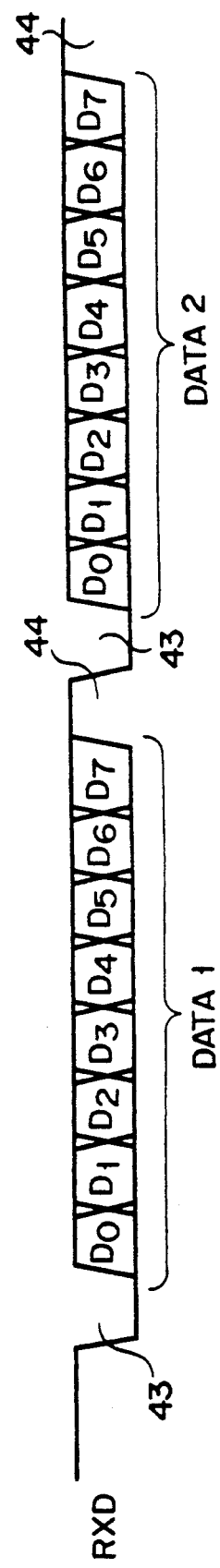
FIG. 4 is a view showing a timing chart of a communication data.

Next, FIG. 4 shows a timing chart of communication data inputted into the data-receiving port (RXD) constituting the communication ports 32 illustrated in FIG. 3. In general, what is shown in FIG. 4 is a format which is called "non-synchronized communication".

This communication data is constituted by a plurality of bytes each formed of 8 bits, D0 to D7. A start bit 43 indicating the starting of the data is added to the same at a position immediately preceding to the bit D0 while a stop bit 44 indicating the termination of the data is added to the same at a position immediately succeeding to the bit D7. The time width of each bit is defined by a time which is called "Baud Rate".

The CPU 31 operates to detect the start bit 43 of the data sent from the character-string preparation unit 16 and read the bits D0 to D7 at a specified Baud Rate and complete the reading by detection of the stop bit 44. The CPU 31 operates to cause the read data to be stored in RAM for each byte.

Further, one character of the data has values of 00h to FFh (the letter "h" means that the value added with "h" is a hexadecimal numerical value) each of which is called "character code", and therefore the one-byte data represents one character.

Figure 5:
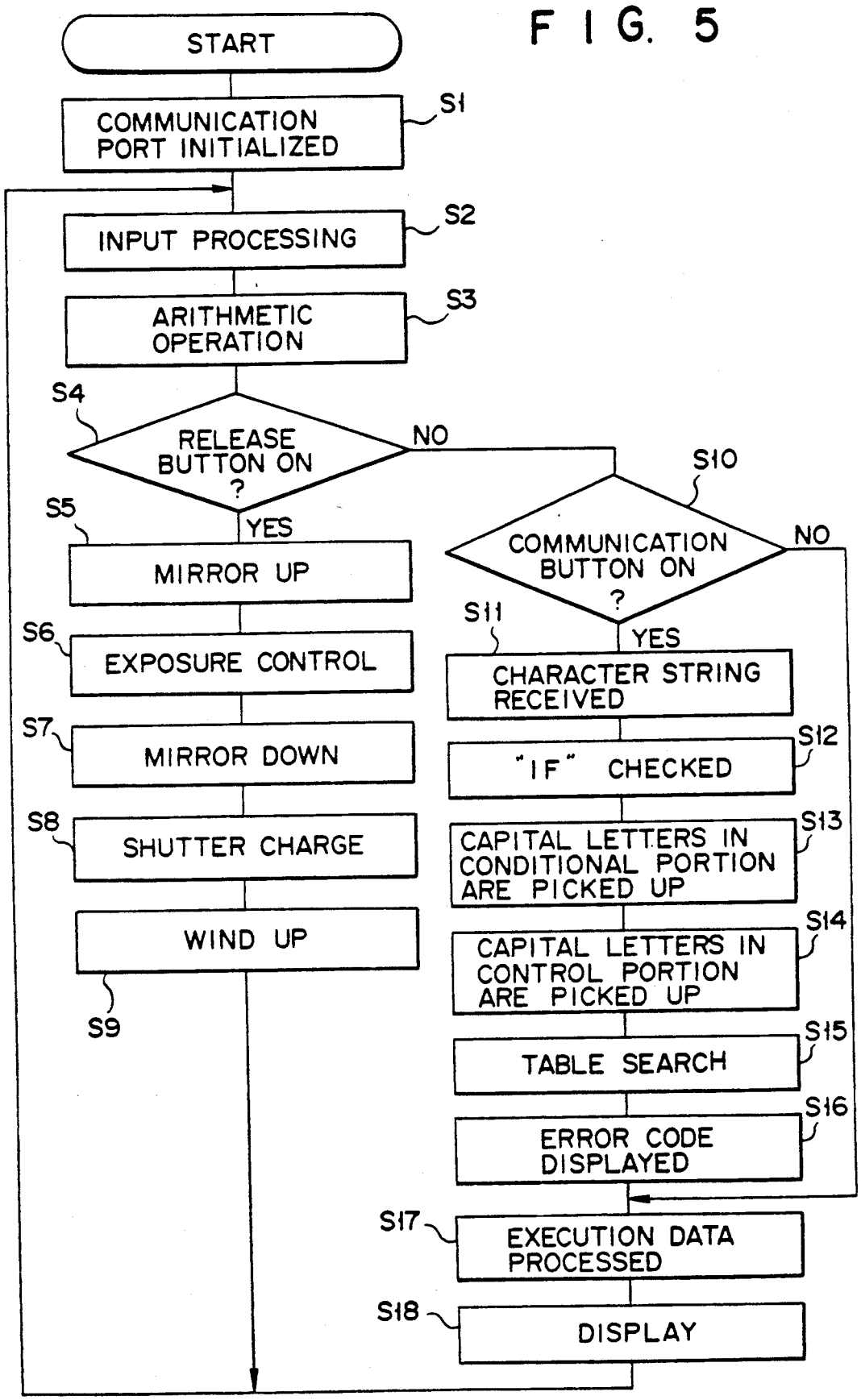
FIG. 5 is a flowchart for explaining the operation of CPU.

FIG. 5 is a general flowchart showing the processing of operations performed by CPU 31 in accordance with the first embodiment of the present invention, the explanation being made with reference to this flowchart.

Firstly, in step 1, the communication ports 32 are initialized and the Baud Rate of the CPU 31 is made to conform with that of the character-string preparation unit 16. In step 2, normal input processing is performed and, for example, measurement of light is performed.

In step 3, arithmetic operations are performed to determine the amount of exposure from the measured value of light, thereby determining the shutter speed, etc. In step 4, it is detected whether or not the release button 24 is depressed. In case the release button 24 is depressed, the processing operation proceeds to steps 5 to 9, where the exposure control operation is performed. In case the release button 24 is not depressed in step 4 (NO), the operation proceeds to step 10 where detection is made of whether or not the communication button 27 is depressed. In case the button 27 is depressed, the intended processings in steps 11 to 16 are performed, whereas, in case the button 27 is not depressed, the operation proceeds to step 17.

Steps 11 to 17 are intended to execute subroutines for performing the data processing operations shown in FIG. 1 and prepare, on the basis of the inputted character-string information, the data for execution thereof. Step 17 is intended to process the abovementioned execution data and cause performance of new control operations other than the previously programmed control operations. Note that the processing of each subroutine will be described later.

Step 18 is intended to perform normal display processings and display in the display section 30 the shutter speed, etc. which have been determined in step 3. Therefore, CPU 31 normally performs the respective processing operations in steps 2, 3, 4, 10, 17 and 18 repeatedly, and, in case the release button 24 has been depressed, performs the processings in steps 5 to 9 and, in case the communication button 27 has been depressed, performs the processings in steps 11 to 16.

The subroutines executed in steps 11 to 17 will now be described. In the following descriptions, the operations in a stage covering from preparation of character string information to mirror-up control will be explained in connection with an example of causing the control of raising a mirror 25 upwards to be newly performed when having depressed the option button 26.

First of all, when operating the keyboard 21 of the character-string preparation unit 16 shown in FIG. 2 and typing an item of information of "IF OPTIONAL BUTTON (CR) MIRROR UP (CR)", this character-string information (hereinafter referred to as "example sentence") is displayed in the display section 22. It is noted that the "(CR)" is not displayed in the display section 22 because it is a renewal code. When operating the sending key 20 thereafter, the character codes of the said example sentence are outputted from the communication terminal 23.

FIG. 6 is a flowchart showing in detail the contents of the processing in step 11 and is intended to receive the character codes of the character-string information from the character-string preparation unit 16 and cause these character codes to be stored in RAM.

Figure 7:
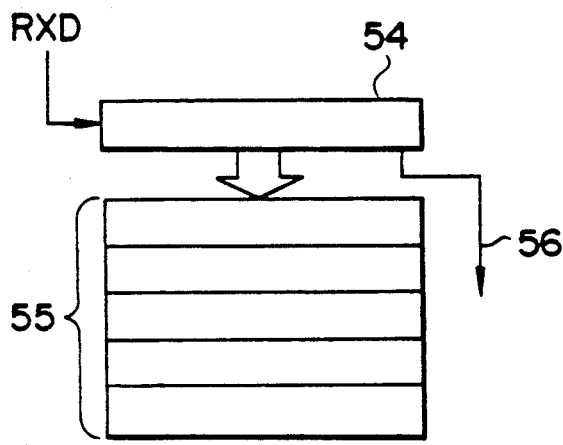
FIG. 7 is a block diagram showing the constructions of a receiving register and a received-data storage RAM.

FIG. 7 shows respective constructions of a receiving register 54 used to perform the storage processing operation and the receiving-data storage RAM 55. More specifically, in step 20 in FIG. 6, the contents of the received-data storage RAM 55 are cleared to make each content thereof "00h". Next, in step 21, each address of RAM 55 is set to "0000h". In step 22, it is judged whether or not 1-byte data enters the receiving register 54, by means of a 1-byte data reception completion flag 56, and, in case the reception is not completed, the step 22 is repeated, whereas, in case the reception is completed, the processing operation proceeds to step 23.

In step 23, the contents (received data) of the receiving register 54 are stored in the address designated of RAM 55. In step 24, it is judged whether or not the received data is a character-string completion code (00h). In case the received data is not this completion code, the processing operation proceeds to step 24, whereas, in case that data is that completion code, this subroutine is ended. In step 25, the RAM address is increased by one address to proceed to step 22.

Through performance of such processing operations, the character codes of the character-string information are sequentially stored into RAM 55. In the following description, RAM (ADR) is defined to represent a 1-byte RAM data corresponding to the address (ADR), RAM (ADR) 55 to represent a 2-type RAM data corresponding to the address, ROM (ADR) to represent a 1-byte ROM data corresponding to the address, and ROM (ADR) 55 to represent a 2-byte ROM data corresponding to the address. In this connection, FIG. 8A represents the stored contents of RAM in the case where the above-mentioned example sentence has been received.

Figure 9:
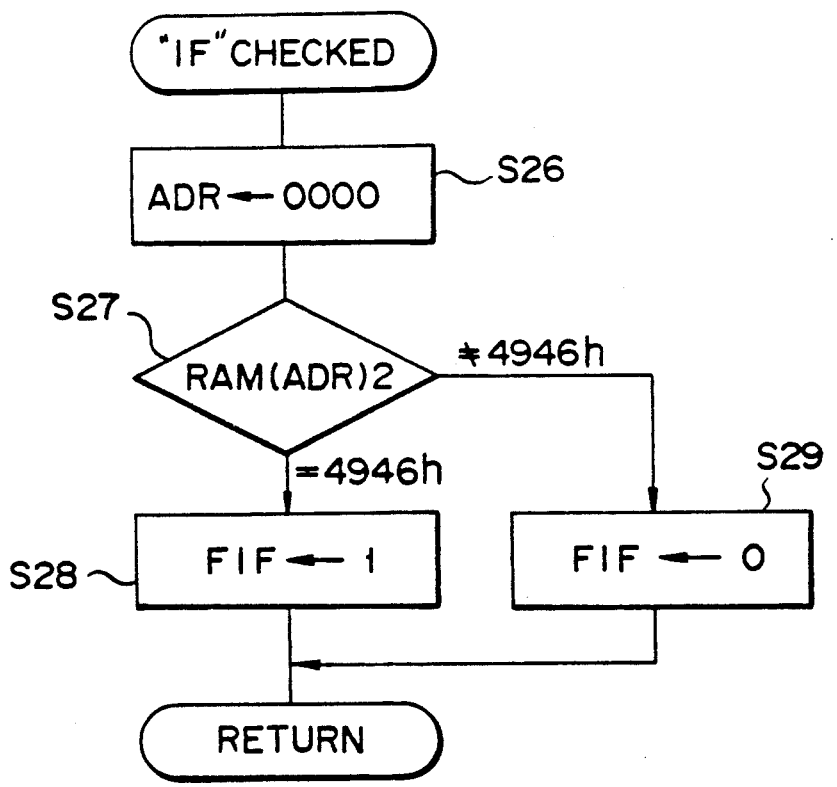
FIG. 9 is a flowchart for explaining the judging processing as to the foremost character of a character sting.

FIG. 9 is a flowchart showing in detail the contents of step 12 shown in FIG. 5. First it is judged whether or not the word "IF" is present at the foremost portion of the character-string information. Then, in case the word "IF" is present, the flag (FIF) is set to "1", and, in case of absence, the flag (FIF) is set to "0".

Usually, the word "IF" is added at the foremost portion of the character-string information which has been inputted. However, in the case where any condition setting is not prescribed, or in the case where a control operation is performed as a trial, only the character string in the control portion can be inputted without input of any character string in the conditional portion.

Further, in the case where such a special processing operation is carried out, the flag (FIF) is utilized as a reference of judgement on whether or not such special processing operation is performed in the processing operation as later described. Namely, in step 26, the RAM address is set to "0000h" and, in step 27, it is judged whether or not the 2-byte data at that address is "4946h". Namely, it is judged whether or not the foremost characters of the character-string information are "IF". As a result, in the case where the foremost characters are "IF", in step 28 FIF is set to "1", and, if otherwise, in step 29 FIF is set to "0".

Figure 10:
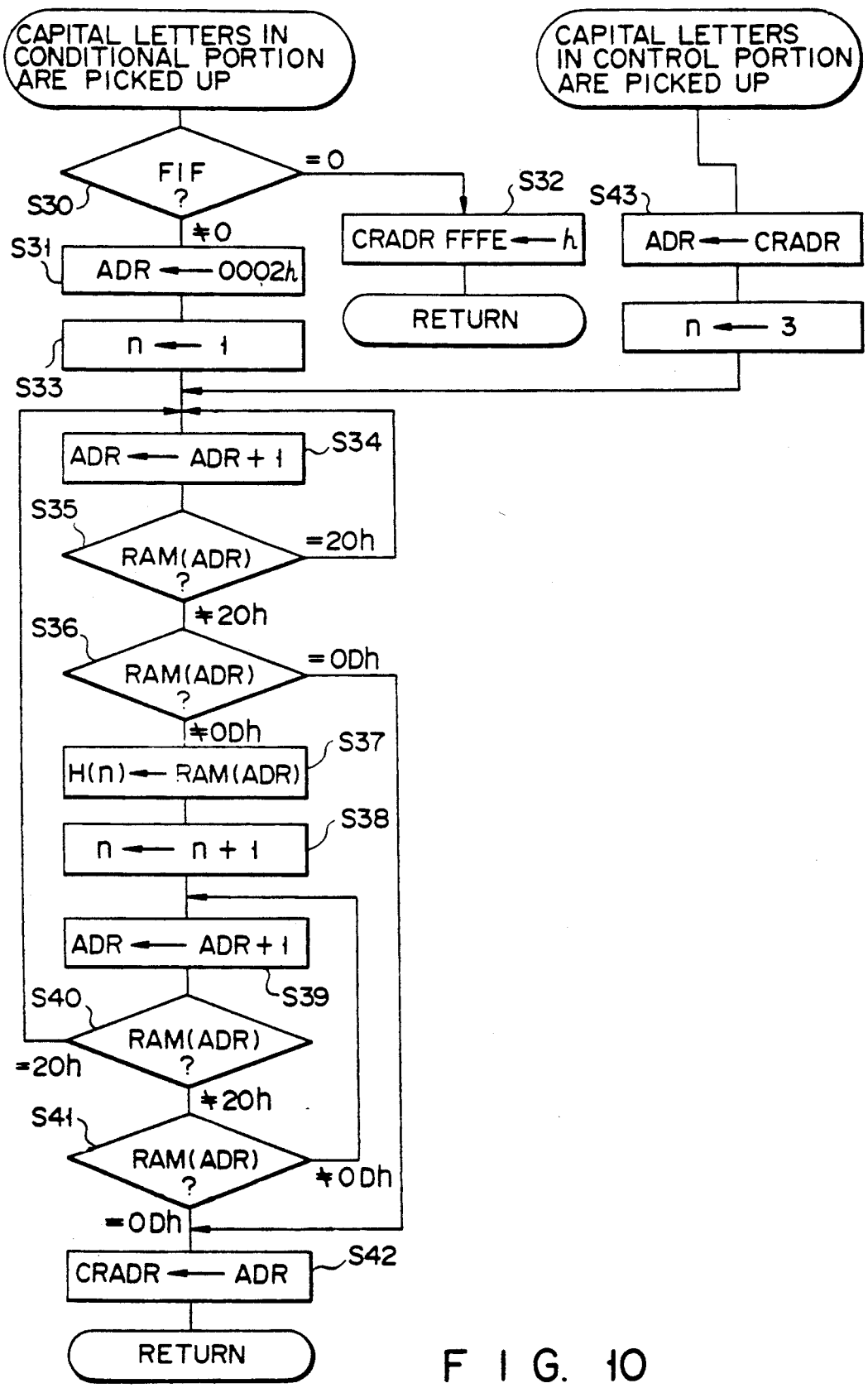
FIG. 10 is a flowchart for explaining the picking-up of the foremost characters of a conditional portion and those of a control portion and the storing thereof in registers.

FIG. 10 is a flowchart showing in detail the contents of steps 13 and 14 shown in FIG. 5. Step 13 is intended to perform the processing of picking up the foremost two characters or two capital letters from the conditional-portion character string and causing the corresponding character codes to be stored in registers of H(1) and H(2) while, on the other hand, step 14 is intended to perform the processing of picking up the foremost two characters, or two capital letters, from the control-portion character string and causing the corresponding character codes to be stored in registers of H(3) and H(4). Note that FIG. 8B shows an address map of RAM including said registers.

Hereinafter, the procedure of processing operations in step 13 (intended for picking-up of capital letters in the conditional portion string) will be described. That is, in step 30, it is judged whether or not the said flag (FIF) is "0". In other words, where the word "IF" is absent, in step 32 the contents of a CRADR register is set from "0000h" to "FFFFh", after which the processing is terminated. Note that the CRADR register is a register which is used to store therein a beginning address at which the control-portion string begins within the receiving RAM 55, the register being used at the time of picking up the capital letters, or the foremost characters of the control-portion string in step 14.

On the other hand, in step 30, it is judged whether or not FIF is "1" and, in other words, in case the word "IF" is present, the processing operation proceeds to step 31 in which the address is set to "0002h". Then, in step 33, the variable (n) of the capital-letter storage register is set to 1".

Next, in step 34, the number of the address is increased by one. In step 35, it is judged whether or not the RAM data is "20h", that is, represents a space code. Where the RAM data is a space code, the operation is returned back to step 34. If otherwise, the operation proceeds to step 36. Steps 34 and 35 function to read over the spaces between the words. Therefore, it is possible to set the space to a given length. Therefore, it is also possible to arrange the characters so as to make the reading thereof easy in the character-string producer 16.

In step 36, it is judged whether or not the RAM data is "0Dh", i.e., whether or not it represents a line renewal code. In case it represents a line renewal code, the operation is terminated and, in case it does not, the operation proceeds to step 37. In step 37, the RAM data is stored in the capital-letter storage register corresponding to the variable (n) and then, in step 38, the variable (n) is increased by addition thereto of 1.

Next, in step 39, the address is increased by one. Where the RAM has been judged to be neither a space code nor a line renewal code in steps 40 and 41, the operation is returned back to step 39. The mentioned operation performed in steps 40 and 41 is for the purpose of reading over a string of successive characters in order to pick up the immediately succeeding capital letters. Where the RAM data has been judged, in step 40, to be a space code, the operation proceeds to step 34. Where the RAM data has been judged, in step 41, to be a line renewal code, the operation proceeds to step 42 in which the value of the address is stored in the CRADR register.

The above-mentioned processing operations make it possible to obtain a capital letter from each of a plurality of words, whereby the character codes of a capital letter of the first word are stored in the register H(1) and the character codes of a capital letter of the second word are stored in the register H(2). In case of the said example sentence, the value of H(1) is "4Fh" and the value of H(2) is "42h".

Next, the processing operations performed in step 14 (intended for picking-up of capital letters in the control portion string) will be described. In step 43, the address is set to the value of the CRADR register. Therefore, in case the word "IF" is present, the value of the address at which the line renewal code has been stored in step 42 is set, whereas, in case the word "IF" is absent, "FFFFh" is set. Thus, in step 44, the variable (n) is made "3", proceeding to step 34. Since the operations succeeding to the operation in step 34 have already been explained, description thereof will be omitted here. In case of the said example sentence, the value of H(3) is "4Dh" and the value of H(4) is "55h".

An example of input of character-string information is shown in FIG. 11. In this example, the capital letters in each line are "O" and "B". In the example of FIG. 11, although the form of expression in one line is different from that in another, the operation control is intended to be performed through depression of the option button 26 and through procurement of capital letters. Therefore, the merit of enabling the characterstring information to have redundancy in terms of the expression form is produced.

FIG. 12 is a flow chart showing the contents of step S15 shown in FIG. 5 in detail, which is a processing for indexing input and control objects in the head characters picked up through step S13 or S14. FIG. 13 is a ROM data table to be referenced for the processing.

The following is the description of FIG. 13.

FIG. 13A shows the entire ROM data. Table data is previously stored in the ROM addresses between "100h" and "1FFFH" and the address "2000h" downward is used for a program area. Each table data value consists of 16 bytes as a group and the data for one input or control processing is stored.

In this case, the data for the input processing of the option button 26 is stored in the addresses between "1000h" and "100Fh" and the data for control processing of the mirror-up is stored in the addresses between "1010h" and "101Fh".

FIG. 13B shows the contents of a group of data values. The codes of head characters are stored in the low-order addresses "Oh" and "1h", the address of the RAM used for input processing is stored in the low-order addresses "4h" and "5h", and the bit information indicating the bits used is stored in the low-order address "6h".

The address of the RAM can be the address of the RAM storing the input state as a flag or that of the input port 33. The top address of the subroutine for executing control processing is stored in the low-order addresses "8h" and "9h".

FIG. 13C shows the table contents of the processing for the option button 26 and FIG. 13D shows the table contents of the mirror-up processing.

The following is the description of FIG. 12.

In step S50, the address of ROM is initialized and the top address of table is specified. In step S51, it is judged if the two-byte data of the specified ROM is equal to the head character of the picked-up conditional section. If not, step S52 starts to judge if the data is equal to the head character of the picked-up control section.

If it is judged that the data is not equal to the head character in step S52, step S53 starts to judge if the ROM address is the final one of the table area. If not, step S54 starts to increase the address by 16 bytes and then step S51 restarts. In a series of processings from step S51 through step S54, it is searched if the picked-up head character is stored in the ROM table. If the picked-up head character is not found in the table, step S55 starts to set the error code 13 to "1". The error code 13 is used for error display to be described later, which displays that an incorrect character string information is inputted.

If the picked-up head character of the control section is found in the table, step S52 ends and step S56 starts to increase the address by 8 bytes. In step S57, it is judged if a control processing subroutine is present. If so, step S57 starts to store the value of the top address of the subroutine in the address register (ADRC) for execution of control processing. If it is judged in step S57 that no control processing subroutine is present, step S59 starts to set the error code 13 to "2". The error code 13 represents that the inputted character string of the control section cannot be provided with control processing because it is exclusively used for input processing.

If the picked-up head character of the conditional section is present in the table, step S51 ends and step S60 starts to increase the address by 4 bytes. In the above step S61, it is judged if the RAM address for input processing is present. If so, step S62 starts to store the value of the RAM address in the address register (ADRI) for execution of input processing. Then, in step S63, the bit position value of the RAM to be provided with input processing is stored in the bit register (BIT) for execution of input processing. If it is judged in step S61 that the RAM address for input processing is not present, step S65 starts to set the error code 13 to "3". The error code 13 represent that the inputted character string of the conditional section cannot be provided with input processing because it is exclusively used for control processing. Thus, the ROM table is searched according to the head characters picked up through steps 13 and 14 to store data in the execution registers (ADRI, BIT, and ADRC). FIG. 8C shows the contents of each register.

Figure 14A:
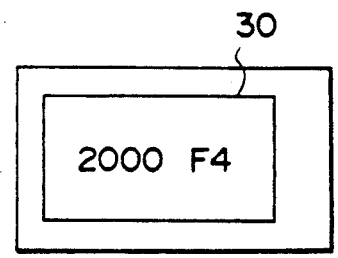
FIGS. 14A and 14B are views representing states of display in display sections of the camera.
Figure 14B:
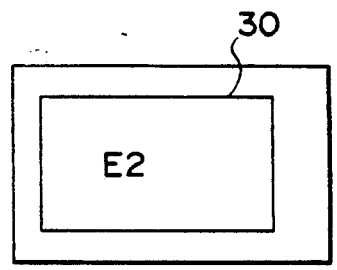

FIG. 14 shows the display state of the indicator 30 of the camera 15. FIG. 14A is a normal display example displayed by step S18, showing a shutter speed and aperture value. FIG. 15B is a display example of the error code displayed by step S16, showing the second error representing that the inputted character string of the control section cannot be provided with control processing because it is exclusively used for input processing.

Figure 15:
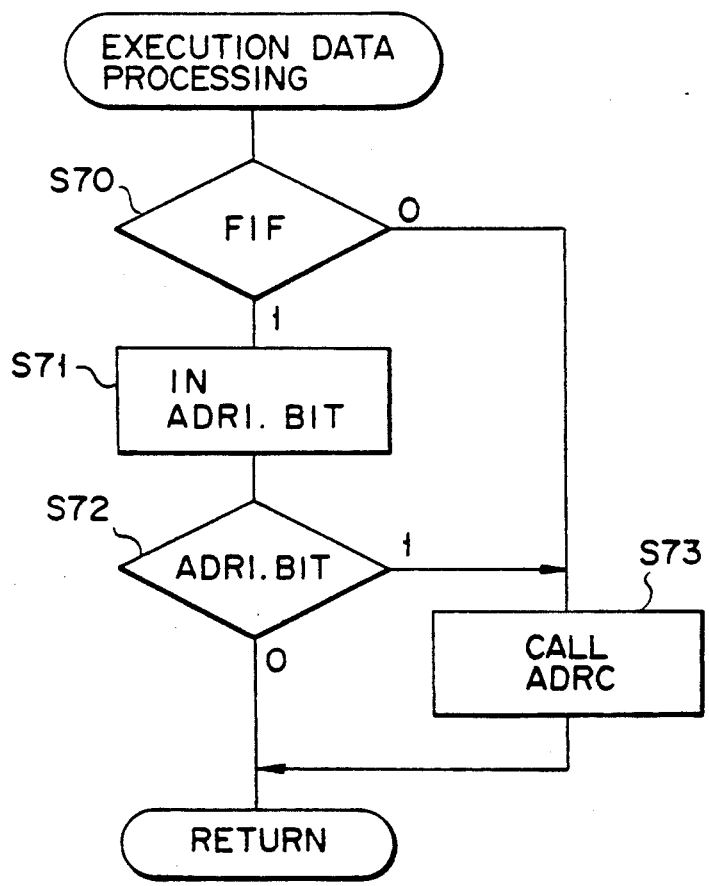
FIG. 15 is a flowchart for explaining the processing of actual control operations in accordance with data in an execution register.

FIG. 15 is a flow chart showing step S17 in FIG. 5 in detail, which is a processing to execute actual control according to the data in the execution registers (ADRI, BIT, and ADRC) prepared by step S15.

In step S70, it is judged if "1F" characters are present. If not, step S73 starts to execute the control subroutine to be accessed by the ADRC register. Step S70 is, as previously described, a special processing corresponding to the case in which no condition is set or control is executed on trial.

For example, when a character string "MIRROR UP" is generated by the character string generator 15 and inputted to the camera 15, the camera immediately executes mirror-up control. Therefore, it is possible to confirm the control to be executed by the character string "MIRROR UP".

If it is judged in step S70 that "IF" characters are present, step S71 starts to read the information from the bits specified by the BIT register in the RAM accessed by the ADRI register. For the previously-mentioned example sentence, the information in the second bit of the address "0140h" of the RAM corresponding to the input by the option button 26 is read.

Then, if the bit is set to "1", that is, the option button 26 is pressed in step S72, step S73 starts. However, if the bit is set to "0", that is, the option button 26 is not pressed, the above processing is ended. Therefore, when the option button 26 is pressed, mirror-up control is executed by step S73.

As described above, for the execution data processing in step S17, step S71 judges the type of input to be used as the condition and step S73 judges the type of control to be executed when the condition is met. Therefore, it is possible to freely describe the conditional and control portions and easily make customized setting according to the purpose.

Thus, the first embodiment allows a personal computer, electronic pocketbook, and portable computer to be used as a character string generator because a character string consisting of combination of words can be used as the language to be inputted. In addition, because words normally used for the camera can be used as the words to be inputted, no technical term or knowledge for program is necessary. Moreover, because the processing address is searched by picking up the head character of a word, it is permitted that the spelling of the word is slightly incorrect as long as the head character is correct.

Further more, because it is possible to independently set the conditional and control portions, any type of control can be executed by corresponding to an optional condition.

For the first embodiment, the case is described in which setting is made so that mirror-up is executed when the option button 26 is pressed. However, mirror-down, start of shutter moving, and start of film rewinding can be executed as the control objects when the option button 26 is pressed by making a plurality of control objects into sub-routines and setting a control processing table. Especially, it is possible to add a new processing without influence of the previously-set processings by installing the option button 26.

It is also possible to input data by not only the option button 26 but the release button 24 and other buttons by setting an input processing table corresponding to a plurality of inputs. Moreover, it is possible to input not only the data by operation buttons but the switch condition and control progress condition in the camera.

Though the first embodiment uses a head character as the abbreviation of a word, it is also possible to use any other character in the word and extract not only one character but a plurality of characters.

Though the first embodiment uses a RAM as the storage for storing data tables, it is also possible to use, for example, an EEPROM. In this case, there is an advantage that data can be held even after the power switch of the camera is turned off. Though the first embodiment stores one control instruction which is executable, it is also possible to store a plurality of control instructions to execute. Though character string information is inputted by connecting a signal line to the input section from an external unit, it is also possible to install an input section such as a keyboard on the back cover of the camera instead. As described above, the program storable camera of the present invention easily specifies a new operation by inputting character string information consisting of a combination of words used for the camera, extracting the abbreviation of each word of the character string information, searching the value of the processing address corresponding to the previously-extracted abbreviation in the data table previously stored in the storage section, and executing processings according to the value.

Figure 16:
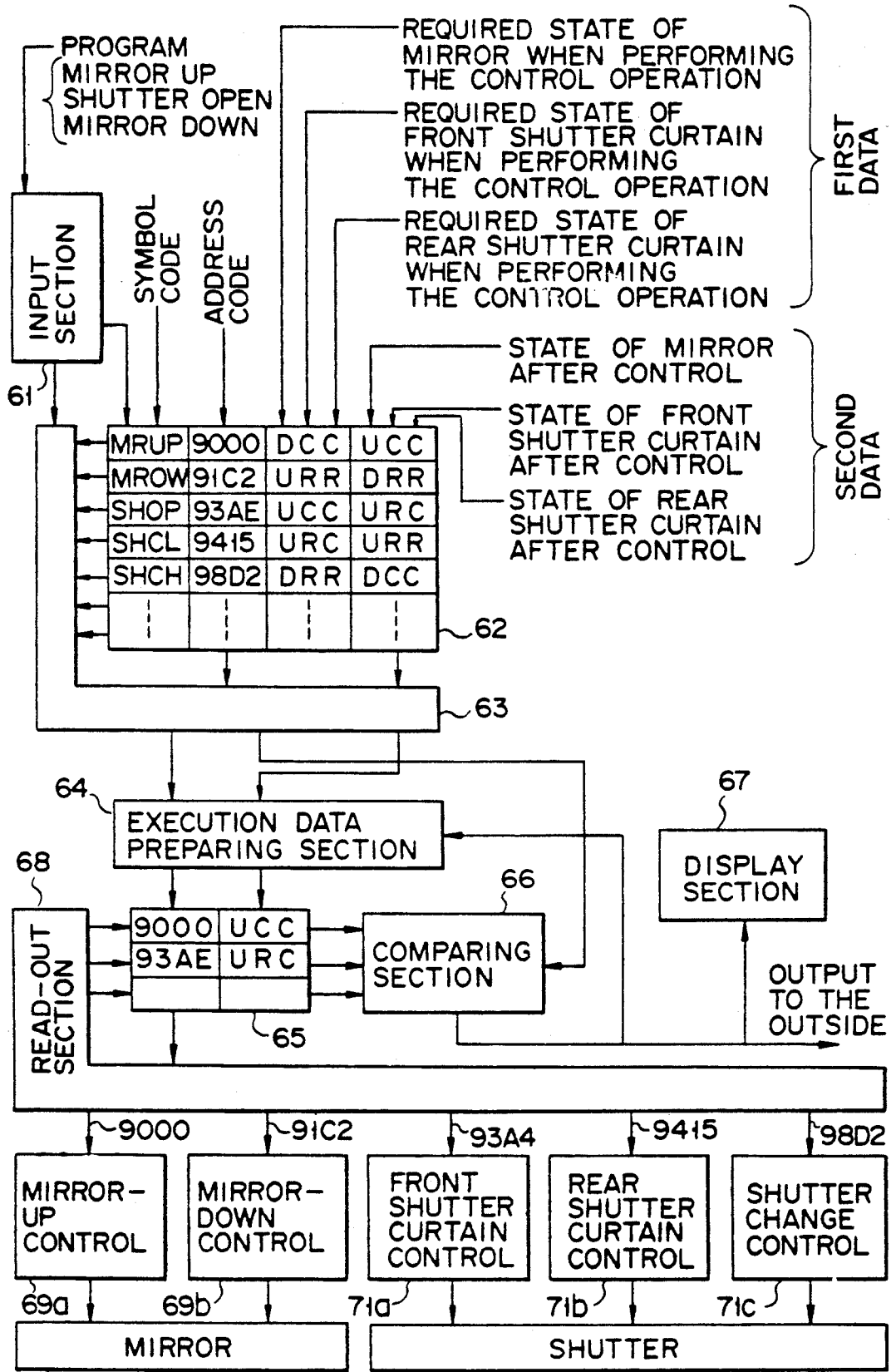
FIG. 16 is a block diagram showing a schematic construction of the camera, according to the present invention, into which programs can be inputted.

The following is the description of FIG. 16 showing a conceptual configuration of a program storable camera as the second embodiment of the present invention.

For the configuration of this camera, the first storage section 62 stores the symbol code data showing the control signal to operate each mechanical section and the address data of the control signal and, in addition to the above, a plurality of data string groups made by combining the first data showing the state of each mechanism of the camera necessary to normally operate each mechanical section with the second data showing the state of each mechanism of the camera immediately after each mechanical section operates as a group of data strings.

A program made by the user with an external unit (e.g. personal computer) is inputted to the search section 63 from the program input section 61. The search section 63 reads the symbol code data corresponding to the program out of the data strings in the first storage section 62 and sends it to the execution data generation section 64.

The second storage section 65 stores the state immediately after the latest execution as the second data. The comparison section 66 compares the first data with the second data, judges whether or not a trouble occurs when each mechanism is operated according to the first data, returns the judgment result to the execution data generation section 64, displays acceptance or rejection on the specified indicator, and outputs the result to peripheral units.

The first data judged to be correct by the comparison section 66 is stored in the second storage section 65, which is read from the second storage section 65 according to the necessity of the user. Then the control signal is sent to the control section of respectively-corresponding mechanical section. For example, to drive the mirror 70 and shutter 72, the control signal is sent to the mirror-up control section 69a, mirror-down control section 69b, shutter front-curtain control section 71a, shutter rear-curtain control section 71b, end shutter charge control section 71c.

The following is the description of an example of the operation of the camera with the above configuration.

First, the user makes a program with a unit capable of generating character strings such as a personal computer. In this case, the program "move the mirror up before opening the shutter and move the mirror down" is as shown below.

MIRROR UP
SHUTTER OPEN
MIRROR DOWN

In this case, however, because the program lowers the mirror with the shutter open, the operation is abnormal for the camera.

Then, the external unit is connected to the camera and character string data is sent to the camera through the program input section 61. Because the character string consists of a string of codes showing the characters, the character code strings are sequentially inputted to the program input section 61.

In this case, "symbol code data" is a control signal showing the operation "MIRROR UP" by the code of the head character such as "MRUP" and "address data" shows the top address of each control signal converted into subroutine. The first data shows the condition that "the mirror must be under the down state (D) and the front and rear curtains of the shutter must be under the charge state (C)" in order to execute, for example, the operation "MIRROR UP". The second data shows the condition that "the mirror is brought under the up state (U) and the front and rear curtains of the shutter is brought under the charge state (C)" after the operation "MIRROR UP" is executed.

Then, the search section 63 searches the corresponding symbol code in the first storage section 62 according to the sequentially-inputted program character code and outputs data strings of the symbol code. For example, the section 63 outputs the first data "DCC" and the second data "UCC" for the program "MIRROR UP".

The execution data generation section 62 stores at least the address data and the second data out of the data strings in the second storage section 65.

When the program "SHUTTER OPEN" is inputted, the search section 63 detects the symbol code "SHOP" and searches the address data "93AE", the first data "UCC", and the second data "URC" to output them to the execution data generation section 64 and the comparison section 66.

Then, the comparison section 66 compares the first data "UCC" for "SHUTTER OPEN" with the second data "UCC" for "MIRROR UP" stored in the second storage section 65. In this case, because both are equal, the operation "SHUTTER OPEN" can be executed.

In this words, though the mirror should be in the up state and the front and rear curtains of the shutter should be in the charge state when the shutter opens, it is possible to open the shutter because the above conditions are met according to the operation "MIRROR UP" previously mentioned.

When the program "MIRROR DOWN" is inputted, the search section 63 detects the symbol code "MRDW" and outputs the address data "91C2", the first data "URR", and the second data "DRR".

Then, the comparison section 66 compares the first data "URR" for "MIRROR DOWN" with the second data "URC" for "SHUTTER OPEN" stored in the second storage section 65. In this case, because both are not equal, the operation "MIRROR DOWN" cannot be executed. In other words, to move the mirror down, the mirror should be in the up state and the front and rear curtains of the shutter should already be operated. However, because the rear curtain is not operated in the operation "SHUTTER OPEN", an abnormal operation occurs if the mirror is moved down under the above condition. It is possible to previously check if an abnormal operation occurs by displaying the comparison results by the comparison section 66 on the indicator 67 of the camera.

It is also possible to output the comparison results to the outside from the camera.

Moreover, it is possible to prevent an abnormal operation from occurring by storing no data causing an abnormal operation in the second storage section 65.

When the program is completely inputted, the read section 68 sequentially reads the address data from the second storage section 65 and selects a control object (mechanical section to be operated) according to the address data to control the operation. In other words, the subroutine at the subroutine of the address 9000 for "MIRROR UP" is called to execute mirror-up control and then the subroutine at the subroutine of the address 93AE for "SHUTTER OPEN" is called to execute shutter open control.

Figure 17:
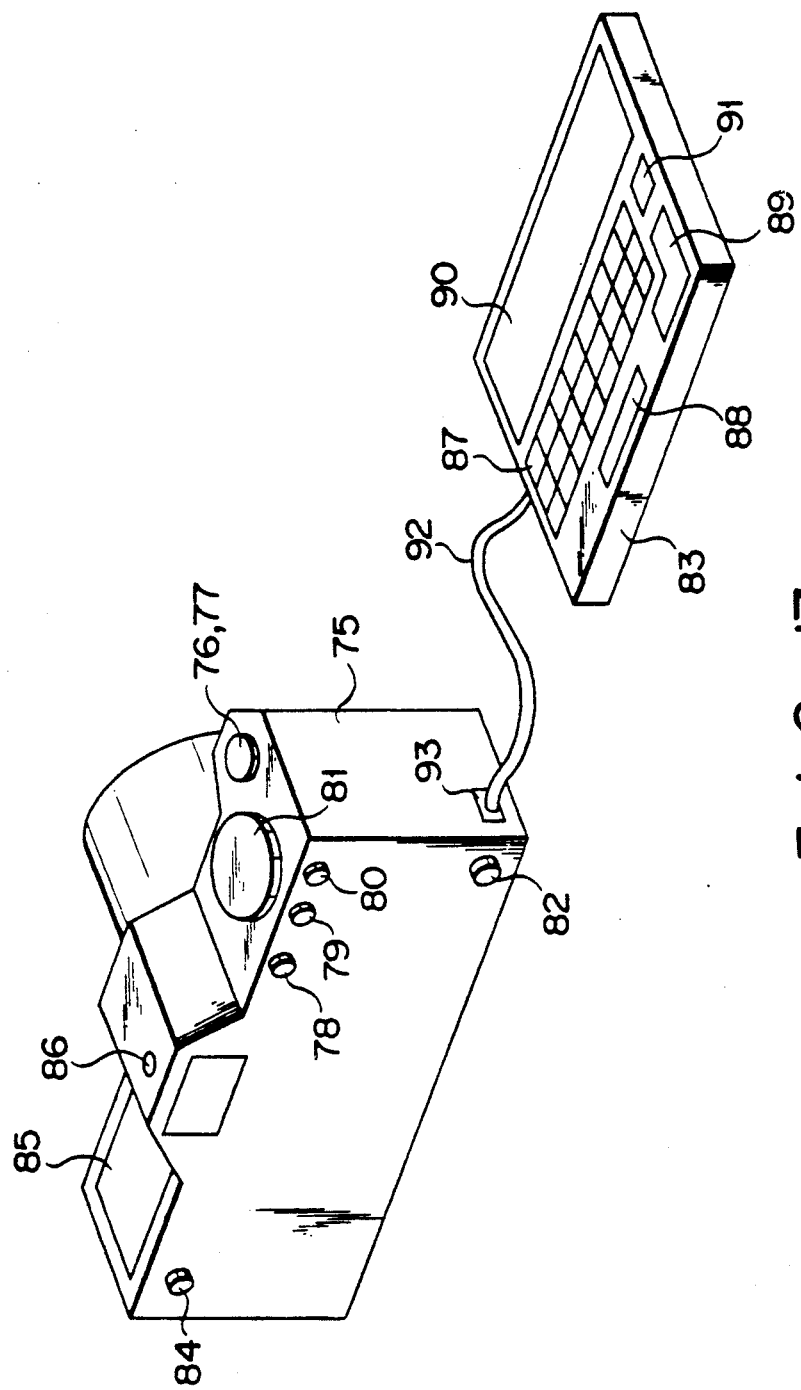
FIG. 17 is a view showing the structure of the camera and a program producer.

The following is the description of the schematic drawings of the camera and program generator according to FIG. 17.

The release button of the camera 75 consists of two-stage stroke. The first-stage stroke 76 executes auto focus (AF) control and the second-stage stroke 77 executes release control. ISO, exposure mode, and exposure correction value are respectively set by pressing the film sensitivity setting button (ISO button) 78, the exposure mode change button 79, and the exposure correction value setting button 80 while turning the dial 81.

The communication button 82 is operated to input a program language (character string) sent from the program generator 83. By operating the communication button 82, the program language is inputted to the character string input section.

The program display button 84 is operated to display the inputted program on the indicator 85. Photographing information including the exposure mode and shutter speed is normally displayed on the indicator.

The contact point 86 for stroboscope ignition control is installed on the top of the camera and the keyboard 87 consisting of alphabetical, numerical, and cymbolic keys, the space key 88 and the line feed key 89 is installed on the program generator 83 in order to generate program languages with these keys. The generated program is displayed on the indicator 90. The communication key 91 is used to send programs to the camera. Program languages are sent to the camera by operating the communication key 91. The camera 75 is connected with the program generator 83 by the connection cable 92 and program languages are communicated through the cable.

Figure 18:
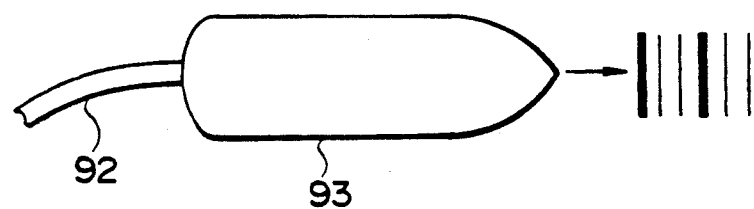
FIG. 18 shows a bar code reader.
Figure 19:
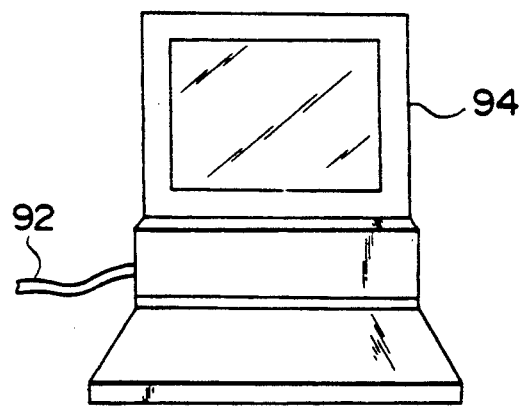
FIG. 19 shows a personal computer.

In this case, it is possible to use a word processor or electronic pocketbook having the communication function, or the bar code reader 93 in FIG. 18 or the personal computer in FIG. 19 as the program generator 93.

Especially for the bar code reader 93, a program can easily be generated by previously coding the language to be used. For the personal computer 94, a program can easily be generated by using various screen editors or software.

Figure 20:
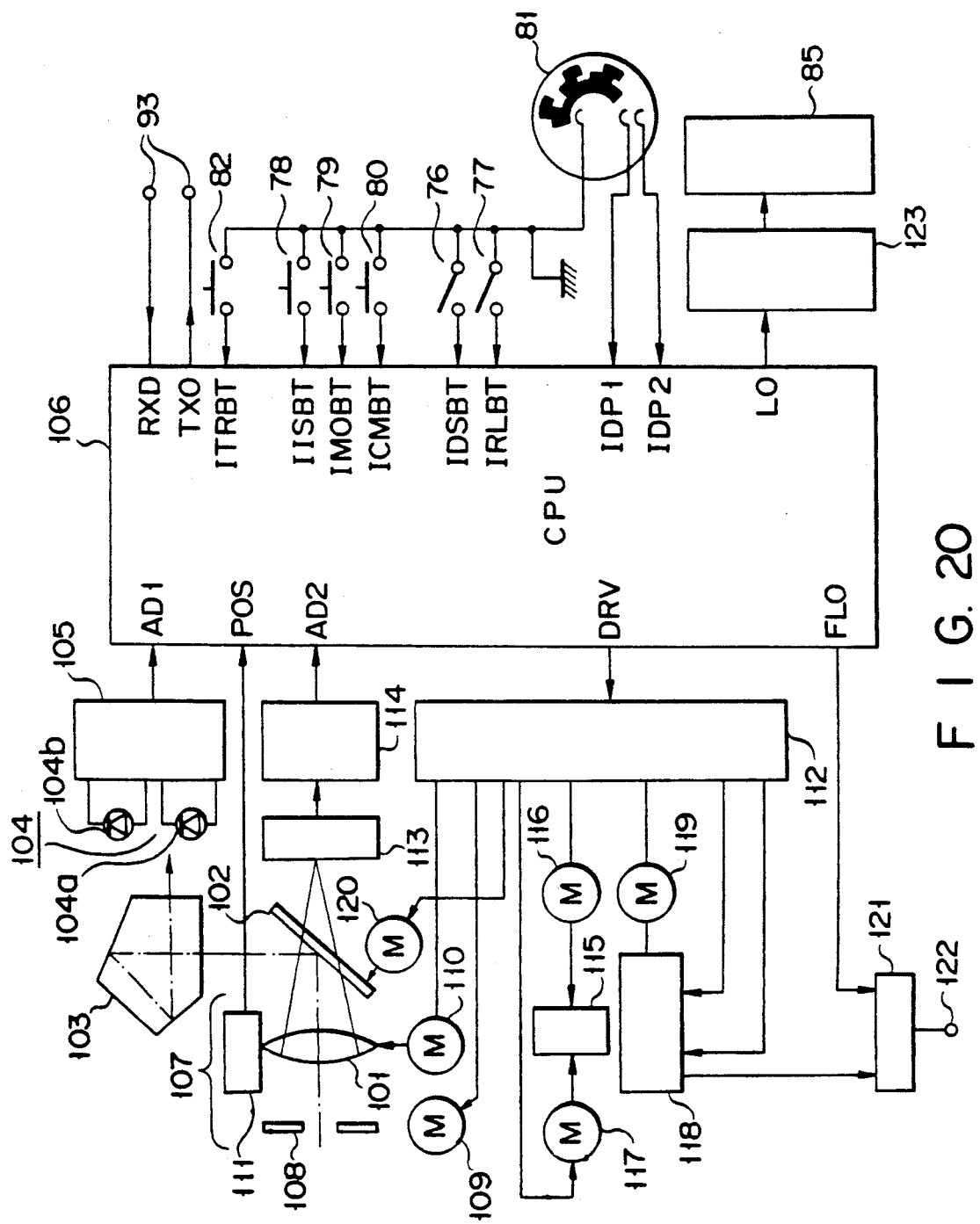
FIG. 20 shows a circuit inside the camera.

FIG. 20 shows circuits inside the camera.

For this embodiment, the microcomputer (hereafter referred to as CPU) 106 has the sections shown in FIG. 16 and controls each section of the camera according to the inputted program.

Light reflected from an object enters the light detecting element 104 through the focus lens 101, mirror 102, and the pentagonal prism 103 and it is converted into voltage by the photometric circuit 105 before entering the analog-digital conversion port (AD1) of the CPU 106 to be converted into digital values.

The light detecting element 104 is divided into the light detecting element 104a for measuring the luminous intensity of the center of an image plane and the light detecting element 104b for measuring the luminous intensity of the periphery of the image plane and the measured luminous intensity of each portion is output.

The lens 107 consists of the aperture 108, aperture driving motor 109, focus lens 101, focus driving motor 110, and focus lens position detecting section 111. Each motor is controlled by the CPU 105 through the motor magnet driving circuit 112.

The object image enters the AF sensor 113 and it inputted to the CPU 106 through the sensor driving circuit 114. The CPU 106 computes the focus displacement with the data for the object image to drive the focus driving motor 110 according to the value sent from the lens position detecting section 111.

The film 115 is advanced by the advancing motor 116 and rewound by the rewinding motor 117. The shutter unit 118 is charged at the operation start position by the charge motor 119.

The motor magnet driving circuit 112 drives the mirror motor for operating the mirror and the magnet of the front and rear curtains of the shutter unit in addition to the above motors.

The stroboscope ignition circuit 121 outputs the ignition signal to the contain 122 according to the shutter front curtain operation and signal and the CPU stroboscope control signal (FLO).

The CPU 106 has communication ports (RXD and TXD) for communication with the program generator 83 shown in FIG. 17, input ports (IDP1 "IISBT . IMDBT . ICMBT . IDSBT . IRLBT) of buttons, input ports (IDP1 and IDP2) for detecting the rotational direction of the dial, and data output port (LO) of the LCD driving circuit.

Figure 21B:
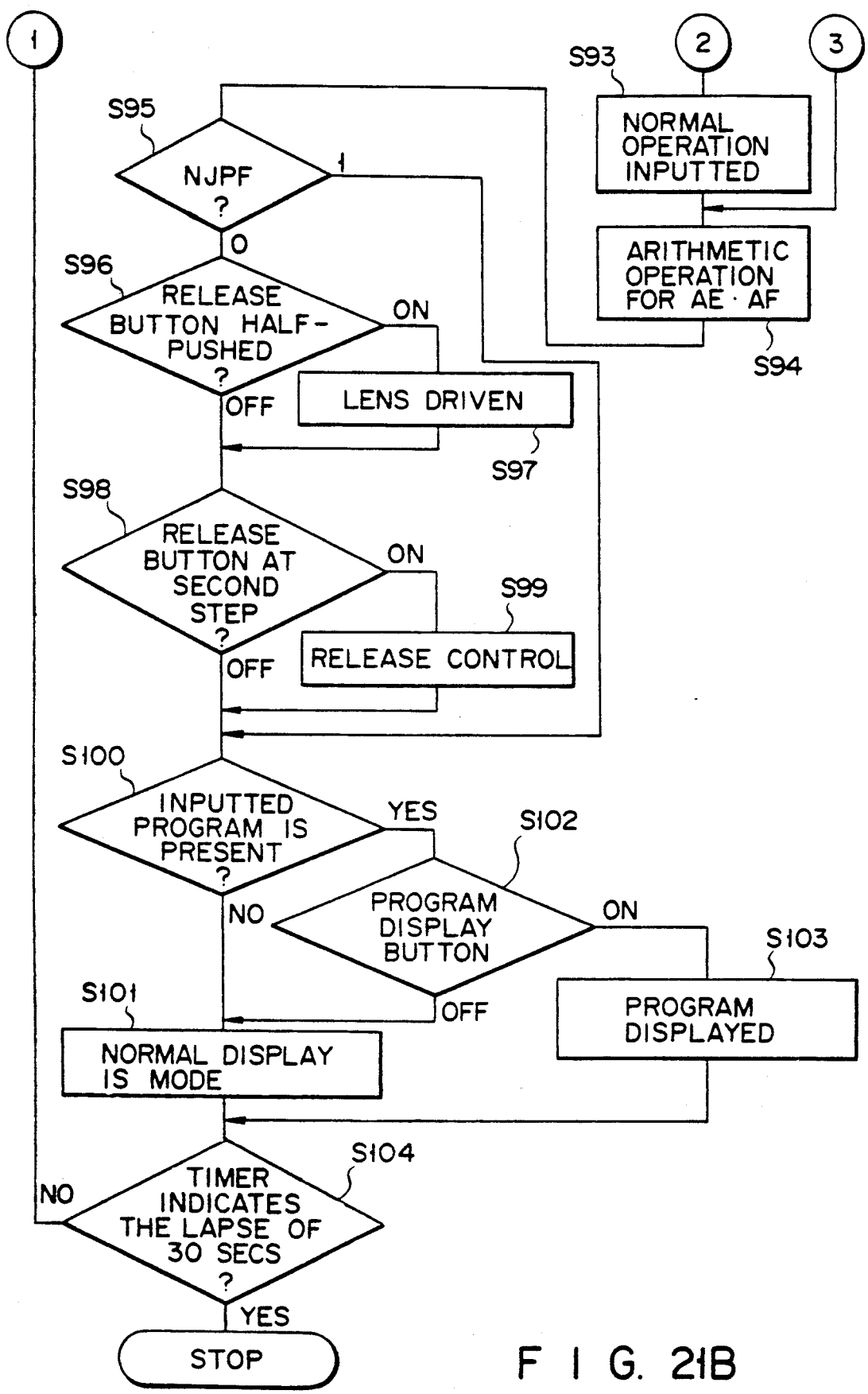
FIG. 21B is a flowchart showing an ending half of the general flowchart.

FIGS. 21A and 21B are general flow charts showing the processings of the CPU of the camera with the above configuration. "Step S" is an abbreviation showing "processing step".

When the CPU 106 is activated, it starts the display timer (step S80) and clears the flag (NJPF) showing whether to execute normal processings. NJPE, as to be described later, is the flag for avoiding duplication or inconsistency with previously-programmed normal processings when a program language is inputted.

Figure 46:
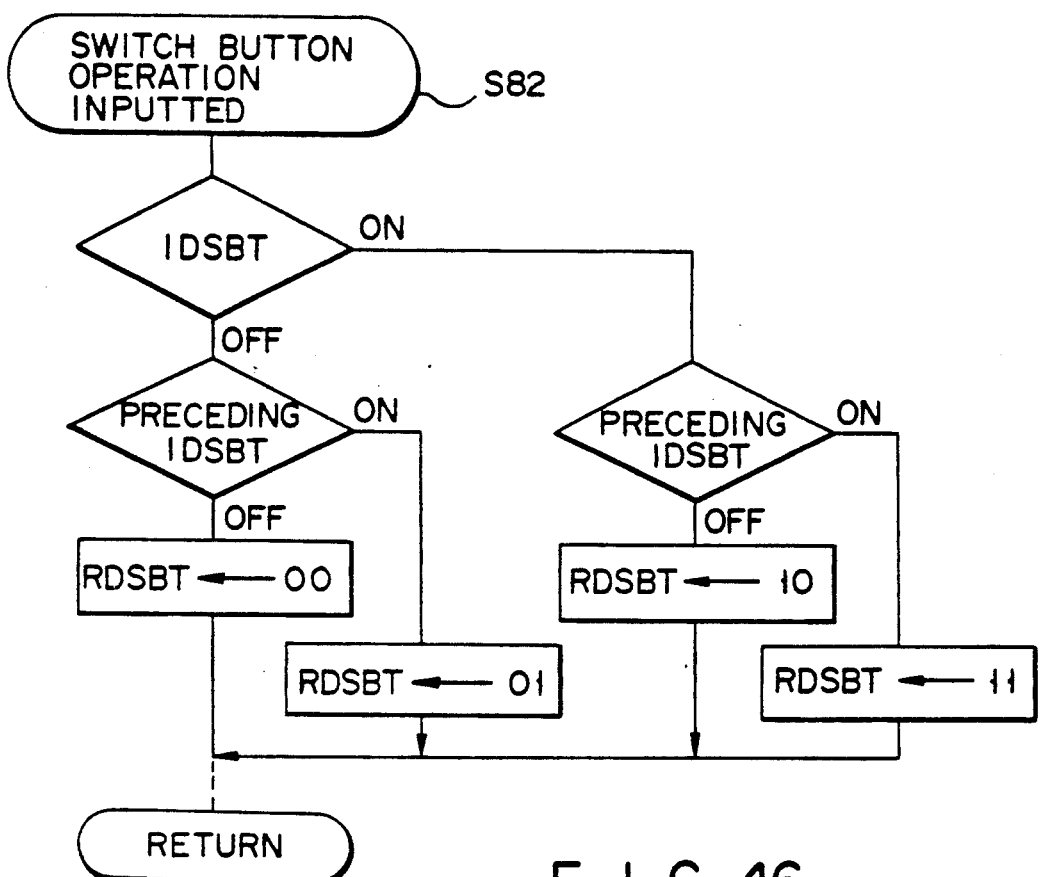
FIG. 46 is a flowchart showing the processing of input of switch and button (step 81) in FIG. 21A.

Then, the operating state of each switch and button is input from the input port of the operation button (step S82). FIG. 46 shows an example of input judgment of the operating state related to the first stroke of the release button. The dial operating direction is inputted from the input port of the dial (step S83). Then, the brightness and focus states of the object is inputted from the photometric circuit and AF sensor driving circuit (step S84).

Then, it is judged if the communication button is pressed (step S85). If not (OFF), the program input judgment starts (step S89). If so (ON), a program language is inputted from the program generator (step S85).

Then, execution data is generated with the inputted program language (step S87). In this case, if the program language cannot be executed, an error flag is set.

Then, it is judged if the error flag is set (step S88). If so (YES), the error is displayed (step S91). If not (NO), the program input judgment starts (step S89). This judges if the program is inputted. If so, execution data is executed (step S90). When the execution data is executed, the execution data generated in step S87 is read and the programmed contents are executed. In this case, the program input judgment (step S89) is the processing always judged through the normal processing and the execution program is stored. Therefore, once the program is inputted, the camera is able to independently execute the program even if it is disconnected from the program generator 83.

Because the execution data is executed before the normal operation input, normal AF control, and normal release control to be described later are executed, it is possible to inhibit their control.

For example, if an inputted program includes the description related to dial operation, it is possible to inhibit the normal operation input processing. Therefore, it is possible to avoid the duplication that both processings are executed by the dial operation.

Because it is also possible to set the inhibition flag or not according to an inputted program, the inputted program can be executed in duplication with the normal processing depending on the program.

Figure 51A:
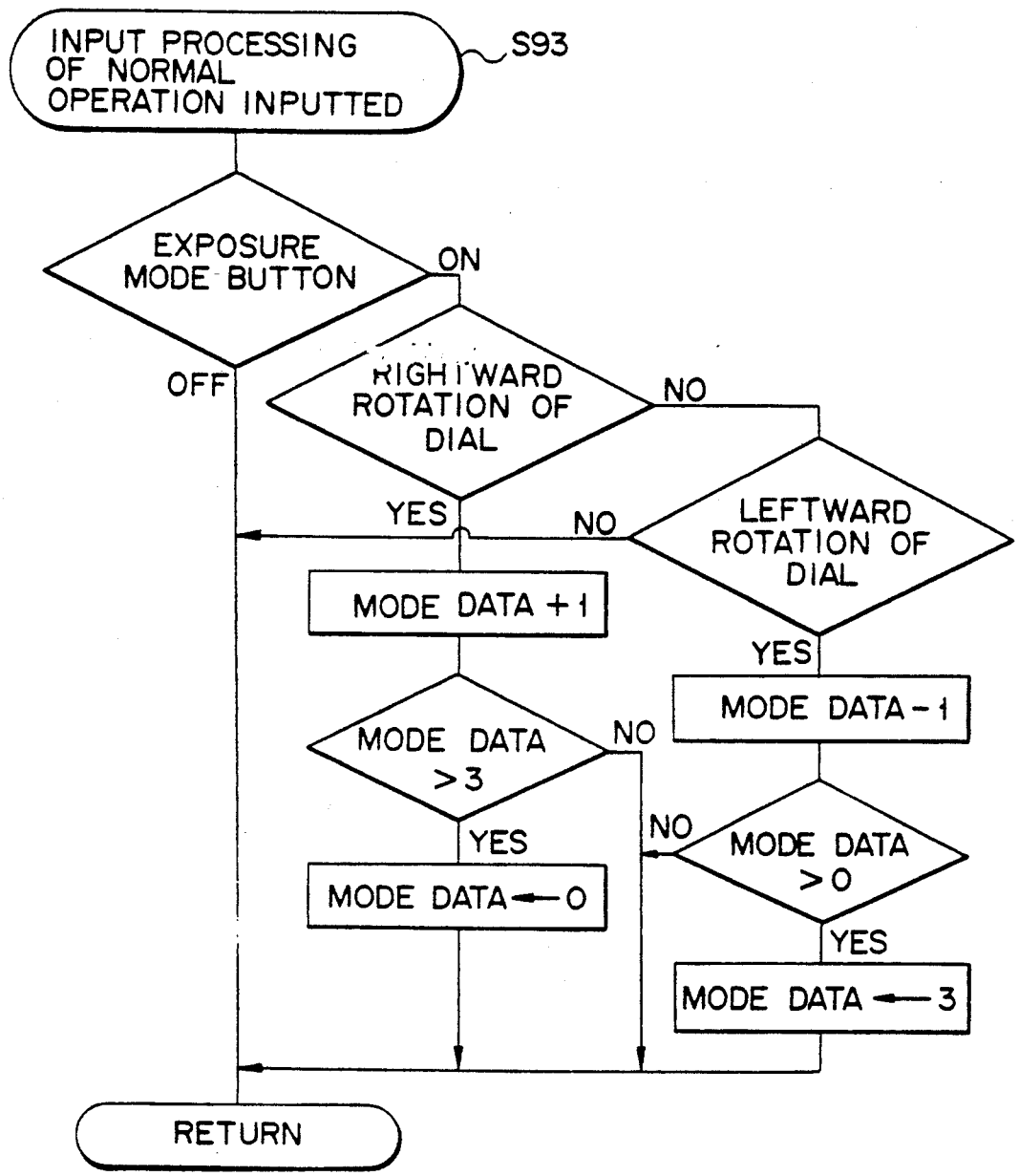
FIGS. 51A and 51B are set of views showing an example of an exposure-mode change processing and the contents of register storing therein exposure mode data.

Then, it is judged if the normal processing inhibition flag is set (step S92). If so "1", the exposure operation (AE) and AF operation start without executing the normal operation input processing (step S94). If not "0", step S93 starts. In step S93, the exposure mode and exposure correction value are set by turning the dial while pressing the operation button, or the shutter speed and aperture value are set by the dial operation. Also in step S93, FIG. 51A shows an example of exposure mode change processing and FIG. 15B shows the contents of the register for storing the exposure mode.

In the AE and AF operations (step S94), the AF operation is executed according to the data for the focus state obtained through distance measurement (step S84).

Then, it is judged if the normal processing inhibition flag is set (step S95). If so "1", the program input judgment (step S100) to be described later starts. If not [0], the next step S96 starts to judge if the first stroke (half pressed) is turned on.

If so, step S97 starts to execute AF control according to the focus data computed in step S94.

Then, it is judged if the second stroke of the release button is turned on (step S98). If so, release control is executed (step S99) according to the exposure control data computed in step S99) according to the exposure control data computed in step S94.

In addition, it is judged if program input is executed (step S100). If so (YES), it is judged if the program display button is pressed (step S102). If so (ON),, the contents of the inputted program are displayed on the indicator 85 (step S103).

If program input is not executed (NO) or the program display button is not pressed, normal exposure mode and exposure data are displayed on the indicator (step S101).

Then, it is judged if the initialized (step S80) displayed timer indicates elapse of 30 sec (step S104). If not (NO), step S81 restarts to repeat the above processing. If so (YES), the CPU 106 stops.

If any operation button or dial is operated while the CPU 106 stops, the CPU 105 restarts to execute the processings beginning with step S80.

FIGS. 22 is a flow chart showing he contents of release control (step S99) in FIG. 21B. The aperture motor 109 is driven (step S111) to control the aperture 108 according to the aperture value obtained through the AE and AF operations (step S94).

Then, the mirror state is judged (step S112). If the mirror is under the down state, mirror-up control (step S113) starts. If the mirror is under the down state, front curtain state judgment (step S114) starts.

In the mirror-up control step (step S113), the mirror driving motor 120 raise the mirror 102 from the observing position (down state) to the photographing position (up state).

In the front curtain state judgment (step S114), the state of the front curtain is judged. If the front curtain is under the charge state, the front curtain operation start (step S115) starts. If the front curtain is already operated, the rear curtain state judgment (step S117) starts.

After the front curtain operation is started (step S115), the timer continues counting by the time for the shutter speed, and counting is over, step S117 starts.

In the rear curtain state judgment (step S117), the state of the rear curtain is judged. If the curtain is under the charge state, the rear curtain operation start (step S118) starts. If the curtain is already operated, the mirror state judgment (step S119) starts.

In the rear curtain operation start (step S118), the rear curtain operation is started before the mirror state judgment (step S119) starts.

Then, the mirror state is judged (step S119). If the mirror is under the down state, the aperture open control (step S121) starts. If the mirror is under the up state, the mirror down control (step S120) starts.

In other words, the mirror is lowered to the observing position (step S120) to control the aperture open state (step S121).

Then, the charge motor 119 is driven to charge the front and rear curtains of the shutter up to the operation start position (step S122) before the winding motor 116 wind up the film 115 (step S123).

For normal sequence, judgment is unnecessary in steps S112, S114, S117, and S119. However, if the release button is pressed while the mirror is moved up after an externally-inputted program is executed, the above processing is executed to prevent any abnormal operation from occurring.

It is possible to make a subroutine in FIG. 23 for the processings between step S114 and step S118 in FIG. 22 as the "exposure control" processing.

Figure 24:
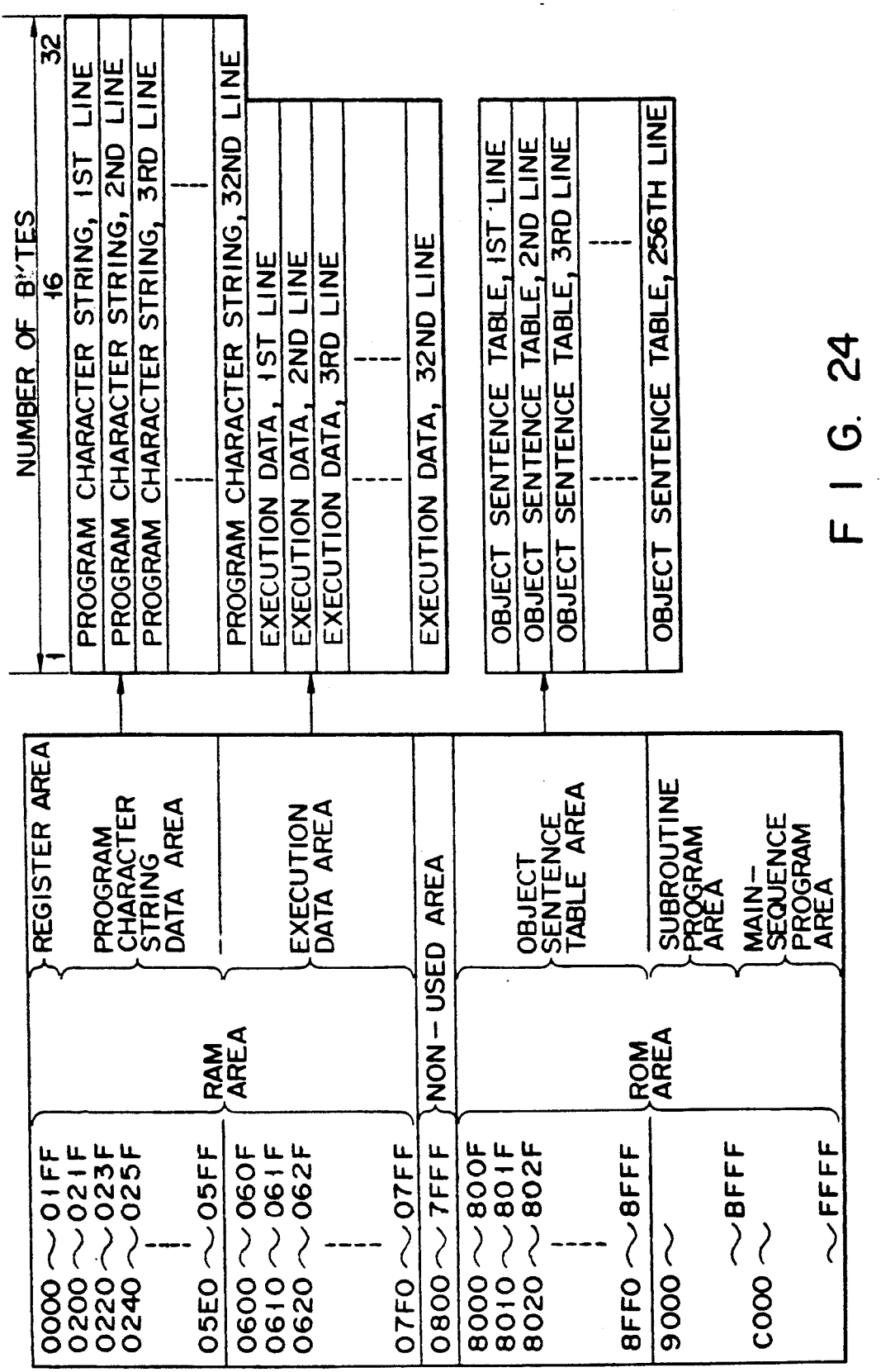
FIG. 24 is an address map for a memory area in CPU.

FIG. 24 shows an address map of the storage area of the CPU 16. That is, addresses "0000" through "07FF" are used for the RAM (random access memory) area and addresses "8000" through "FFFF" are used for the ROM (read only memory) area. Addresses "0800" through "7FFF" are not used.

The RAM area is subdivided into the following three areas. Addresses "0000" through "01FF" are used for the area for a general purpose register or input/output port control, addresses "0200" through "05FF" are used for the area to input character strings of a program language, and addresses "0600" through "07FF" are used for the area to store execution data.

The ROM area is also subdivided into the following three areas.

Addresses "8000" through "8FFF" are used for the table area to be referenced for generating execution data. This area is called "object statement table" because it is referenced according to the input or output object statement of the inputted program.

Addresses "9000" through "BFFF" are used for the area to store the program for mirror-up control and advancing control converted into a subroutine and addresses "C000" through "FFFF" are used for the area to store the program of the main sequence shown in FIG. 21A.

The following is the description of the number of bytes of the data for each area.

The character string input area of the program language used is divided every 32 bytes and one line of the program language is inputted to the area of 32 bytes. Therefore, up to 32 characters of the program language can be described in one line.

Program languages for 32 lines can be inputted to the program language input area. The execution data storage area is divided every 16 bytes and data is grouped every 16 bytes and used for the execution data for one line of the program language. Execution data for up to 32 lines can be stored in the area. The table area is divided every 16 bytes and data is grouped every 16 bytes to form one table. Table data for 256 lines is stored in the area.

Figures 25, 26:
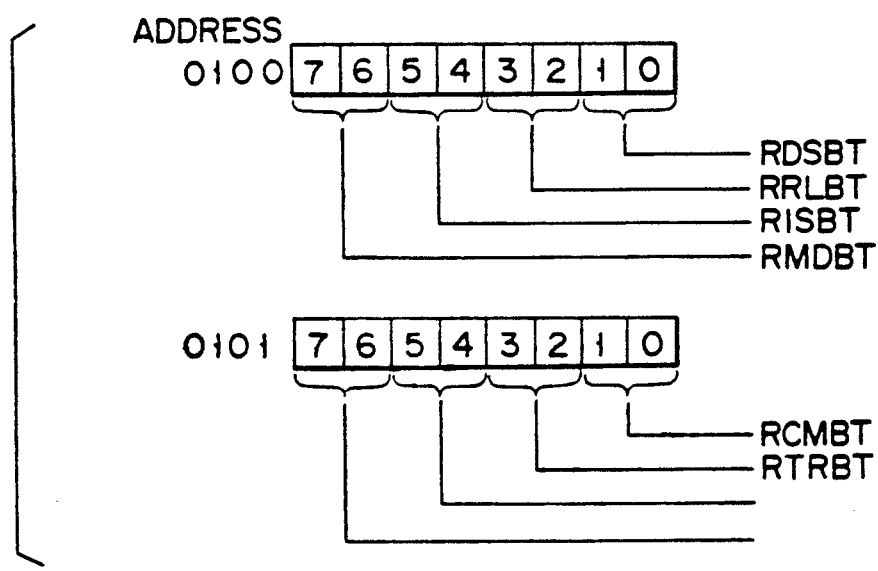
FIG. 25 shows the foremost address of each subroutine in the subroutine area.
FIG. 26 shows bit locations for storing therein data concerning an operation button, in the register area.

FIG. 25 shows the top address of each subroutine in the subroutine area and FIG. 26 shows the bit position for storing the data for operation buttons in the register area.

The information of each operation button is shown as 2-bit data which is set through the switch and button input processing (step S82). FIG. 46 shows the detailed flow chart of the switch and button input processing. In this case, the switch and button input processing compares the present state of the operation buttons with the last state of them, sets the comparison result on whether it remains off-state, changes from off- to on-state or on- to off-state, or remains off-state as 2-bit data, and stores the result in the register area.

The following is the description of the process in which a program language is inputted, execution data is generated, and the inputted program is executed according to the execution data. In this case, it is assumed that the following program is inputted.

IF EXPOSURE MODE BUTTON=ON
&IF RELEASE BUTTON=OFF/ON
THEN MIRROR UP
THEN SHUTTER OPEN
  IF EXPOSURE MODE BUTTON=ON/OFF
  IF RELEASE BUTTON=ON/OFF
THEN SHUTTER CLOSE
THEN MIRROR DOWN
THEN SHUTTER CHARGE
THEN WIND UP
END

The above program shows the operation, so-called "bulb exposure" which says, "raise the mirror and open the shutter when the release button is pressed while the exposure mode button is pressed, and close the shutter, lower the mirror, charge the shutter, and advance the film when the exposure mode button or release button is pressed". However, the above "bulb exposure" is different from the original bulb exposure, which is executed even if the camera is set to any mode.

For the following explanation, a generalized program language is described and its terms are defined as shown below.

IF A=a
  THEN X=x

In this case, "IF" and "THEN" are called "head statement", the statement located at "A" is called "input object statement", "A" is called "input object", the statement located at "a" is called "input discrimination statement", the statement located at "X" is called "output object statement", "X" is called "output object", the statement located at "x" is called "output control statement", and "x" is called "output control value".

Also, one-line program statement beginning with "IF" or "&IF" is called "conditional discrimination statement" and one-line program statement beginning with "THEN" is called "control statement". In this case, the reference numbers of constituent members use the numbers used in FIGS. 17 and 20.

The following is the description of the program input statement (step S86) in FIG. 21.

When generating the program with the external program generator 83 and operating the communication key 91 of the program generator and the communication button 82 of the camera, the character code of the program language is inputted to the character string input area shown in FIG. 27.

Actually, the CPU 16 receives the character code through the data input port (RXD) in the form of a serial signal.

In FIG. 27, "(SP)" represents a space code between characters and "(CR)" is attached at the end of a line and represents a line feed code showing that line feed is executed.

Therefore, the CPU 106 updates the address of the RAM for inputting character strings by one line by receiving the line feed code and inputs the character strings to the next line. Though FIG. 27 shows the data for one line of the program, the character code of the program is also stored in the address "0220" downward.

FIG. 28 is an address map showing the contents of the execution data for one line in the execution-data storage area. Each data value is generated through the execution data generation processing. High-order 4 bits of the address "0600" are the part for storing the data for the head statement related to "IF", "&IF", "THEN", and "END" which are at the head of the program. The part is called "ESYM" in the following description. Concretely, the value shown in FIG. 29 is stored according to the head statement.

That is, low-order 4 bits of the address "0600" are the part to store symbol data such as ">", ">=", "=>", "=", "<", "=<", "<", "<>", "><" in the program. The part is called "ECP" in the following description. Concretely, the value shown in FIG. 29 is stored according to the symbol.

The address "0601" is the part for storing the format of the input or output object such as "RELEASE BUTTON" or "MIRROR UP" in the program. The part is called "ETYP" in the following description. Concretely, the format data (TTYP) obtained from the object statement table is stored.

Figure 30:
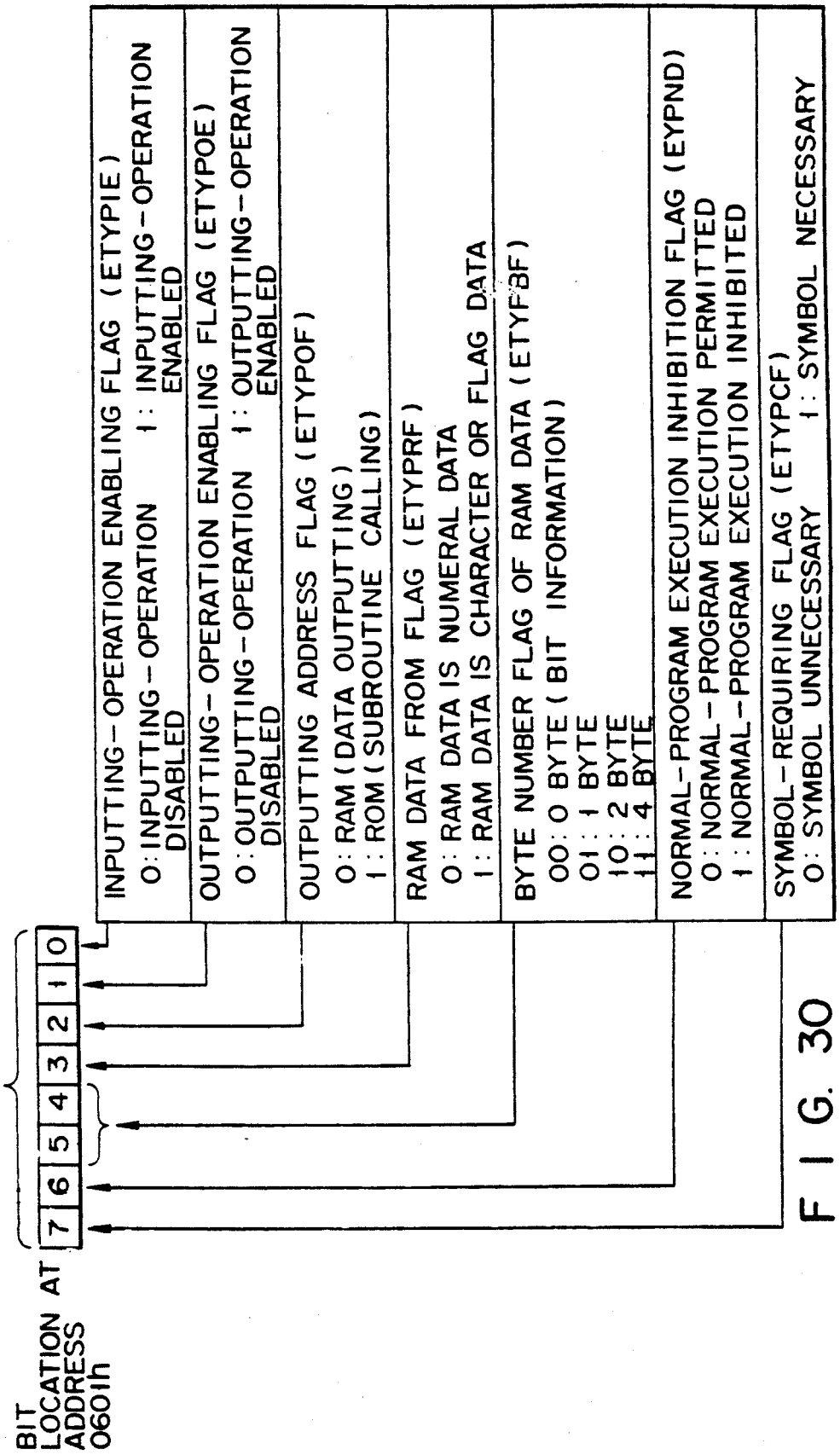
FIG. 30 is a bit map for format data.

FIG. 30 shows a bit map of format data. Addresses "0602" and "0603" are the part for storing the data showing the address of the memory area where the input or output object is present. The part is called "EADR" in the following description. Concretely, the address information (TADR) obtained from the object statement table is stored.

The address "0604" is the part for storing the bits of the address information where the input/output object is present. The part is called "EBIT" in the following description. Concretely, the bit data (TBIT) obtained from the object statement table is stored in the address "0604".

Addresses "0605" through "0607" are the part for storing the operating state of the camera to execute the control program beginning with the head statement "THEN". The part is called "ESEQ" in the following description. Concretely, the operation checking data (TSEQ) of the object statement table is stored in the addresses "0605" through "0607".

FIG. 31 shows the bit map of ESEQ. This is the data for the checking flag showing the state of the mechanical members inside the camera when high-order 12 bits of ESEQ start the control processing.

The part is called "ESEQC" in the following description. Low-order 12 bits of ESEQ are the data for the set flag showing the state of the mechanical members inside the camera when the control processing ends. The part is called "ESEQS" in the following description.

Addresses "0608", "0609", "060"A, and "060B" are the part for storing the head character of the input/output object. The part is called "EHD$" in the following description. Addresses "060C", through "060F" are the part for storing the input discrimination values such as "OFF", "OFF/ON", "ON/OFF", and "ON" in the conditional discrimination statement beginning with the head statement "IF" or "&IF". The part is called "EVAL" in the following description. If a symbol is present in the control statement beginning with the head statement "THEN", the output control value described after the symbol is also stored in the part. "EVAL" is subdivided into the areas "EVAL0", "EVAL1", "EVAL2", and "EVAL3".

The following is the description of the process in which the execution data is generated, according to the flow chart for "execution data generation processing" shown in FIGS. 32A through 32D which are the flow chart showing the contents of the execution data generation (step S87) processing in FIG. 21 in detail.

Figure 32A:
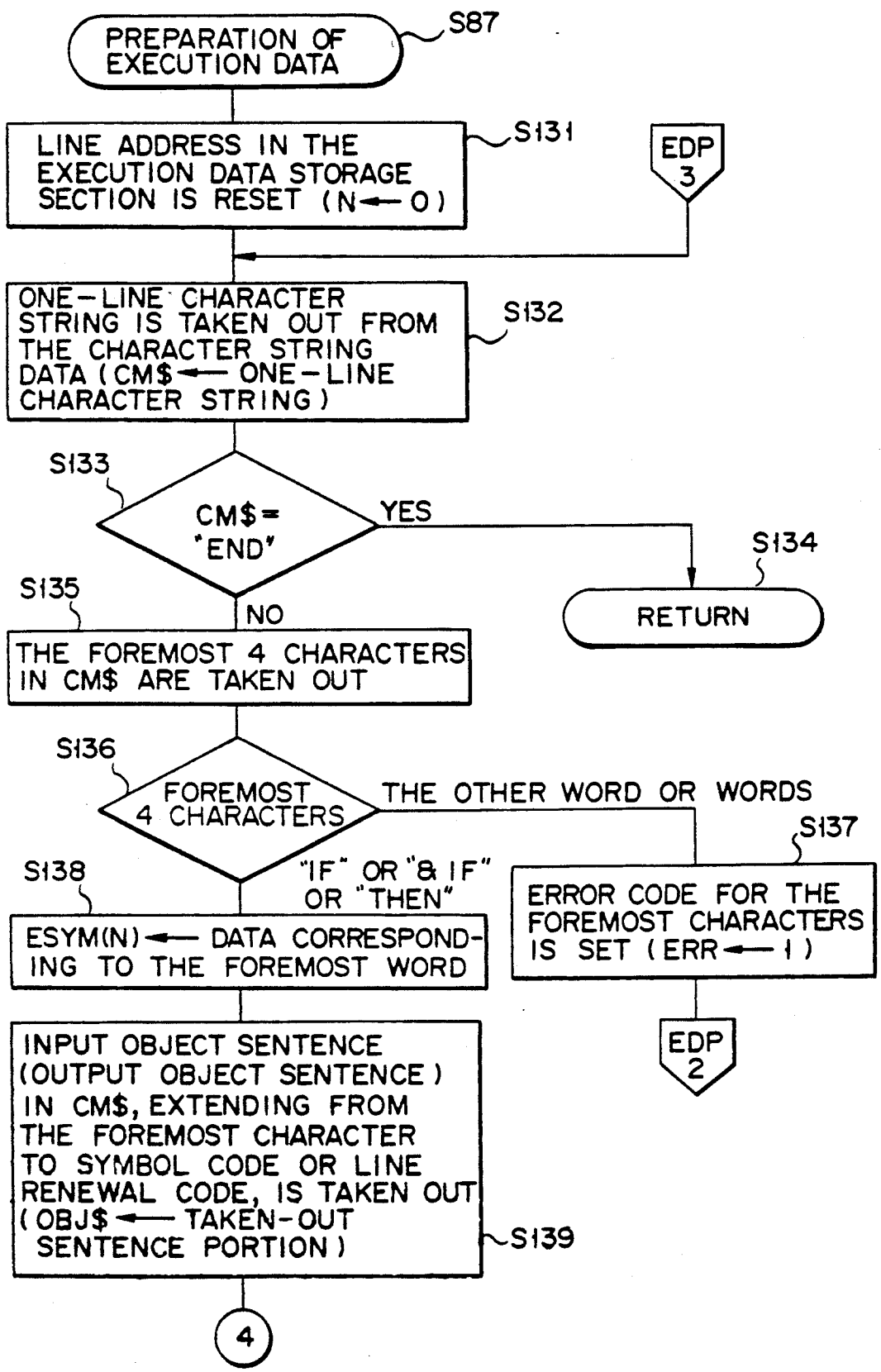
FIG. 32A is a flowchart showing a portion of from step 87 to step 139, of the flowchart covering from step 87 to step 167 intended for performance of an execution-data preparation processing.

The address of the execution data storage section is reset (step S131) as shown in FIG. 32A. In the following description, the address is shown as the variable "N". Therefore, the head statement data of the program statement at the N-th line is shown as "ESYM (N)". Only one-line statement of the inputted program language is extracted (step S132).

The one-line character string is called "CM$" in the following description.

"CM$" judges "END", that is, if the program statement ends (step S133). If so (YES), the processing ends (step S134). If not (NO), step S135 starts.

In step S135, four head characters of "CM$" are extracted and it is judged if the characters are "IF", "&IF", or "THEN" (step S136). If not, the error code showing that no head character is described is set (step S137). If so, the data corresponding to "IF", "&IF", or "THEN" is set to ESYM (N) (step S138). In this case, the relationship between the value to be set (4-bit data) and the head characters is shown in FIG. 29.

Moreover, characters up to the symbol code or line feed code after the final head character of "CM$" or the input or output object statement are extracted (step S139). These object statements are called "OBJ$" in the following description. The number of words of "OBJ$" is checked according to the space code (step S140) to judge if the number of words is "0" or if an object statement is present (step S141). If not, the error code showing that no object statement is present is set (step S142).

If so, a head character is extracted from "OBJ$" according to the number of words (step S143). The head character is called "HD$" in the following description. "HD$", as to be described later, serves as a search criterion for referencing the object statement table.

FIG. 33 is a flow chart showing the contents of the "head character extraction processing" in detail. The "head character extraction processing" has features of changing the number of characters to be extracted from each word according to the number of words of "OBJ$" to finally obtain four head characters and extracting no vowel except the head character of each word.

Concretely, if the number of words is 1, four characters are extracted from the word. If the number of words is 2, two characters are extracted from the first word and two characters are extracted from the second word. If the number of words is 3, two characters are extracted from the first word and one character is extracted from the second and third words respectively. If the number of words is 4 or more, one character is extracted from the first through fourth words respectively.

FIG. 34 shows a processing flow chart for extracting no vowel if it is detected. The flow chart shows the subroutine shown as "HSUB" in FIG. 33 in detail.

In FIG. 33, "OBJ$ (I, J)" is a symbol showing the "J"-th character from the head character of the "I"-th word in "OBJ$". Four head characters are extracted by specifying "I" and "J" according to the number of words.

Figure 32B:
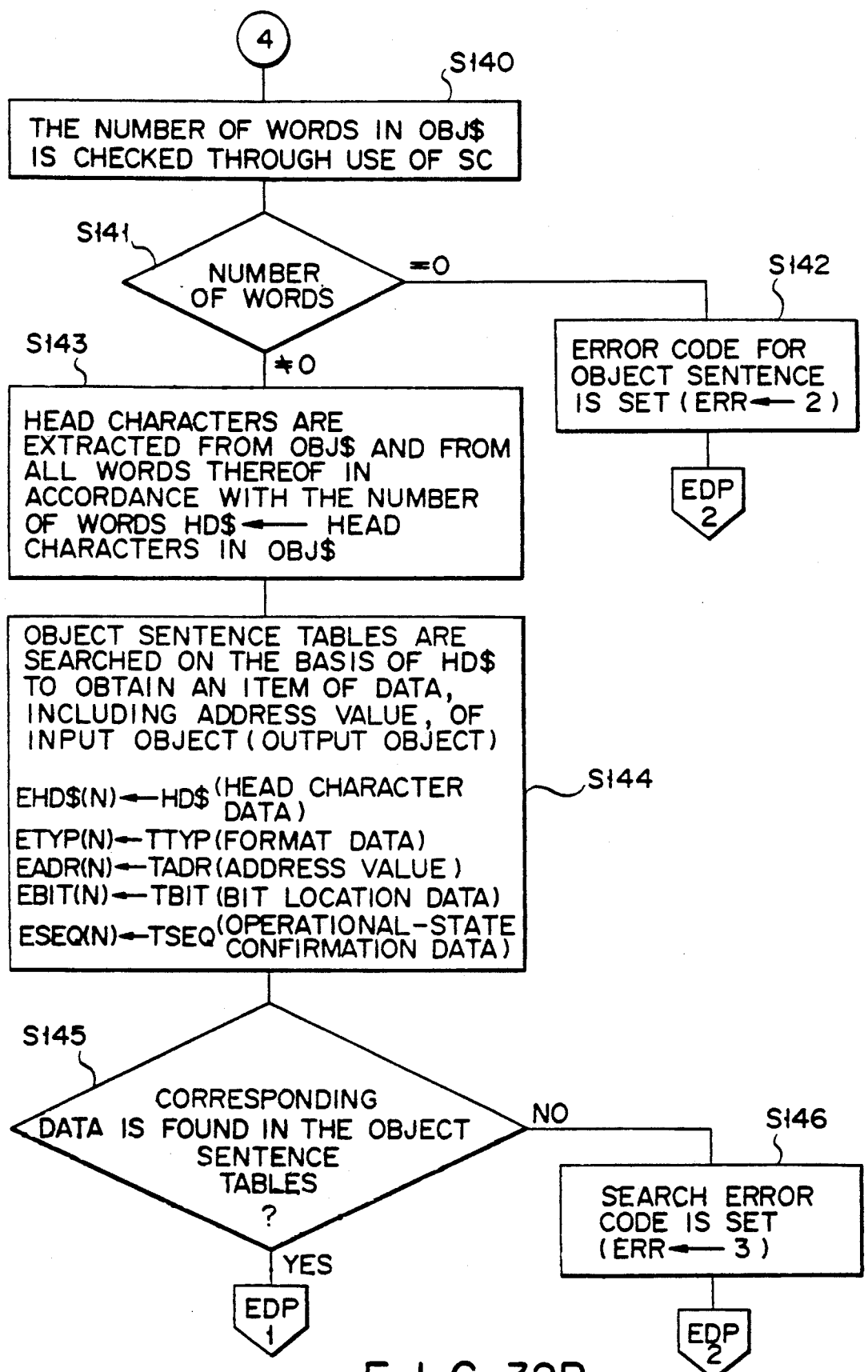
FIG. 32B is a flowchart showing a portion of from step 140 to step 146, of the flowchart covering from step 87 to step 167 intended for performance of the execution-data preparation processing.

The following is the description of FIG. 32B. In step S144, the object statement table is searched according to "HD$" and data values for TTYP, TADR, TBIT, and TSEQ are obtained from the object statement table to store the values in the execution data storage areas ETYP (N), EADR (N), EBIT (N), and ESEQ (N).

The following is the description of the object statement table and data search method. FIGS. 35A and 35B show the contents of the object statement table.

First, the table of the exposure mode button is described as an example. The exposure mode button is described as "EXPOSURE MODE BUTTON". When a head character is taken according to the head-character extraction method previously mentioned, "EXMB" is obtained. Therefore, the character code of "EXMB" is stored in the addresses "8020" through "8023" of the object statement table.

The part of the low-order addresses "0" through "3" is called "THD$". Then, the data for the input state of the exposure mode button is set to the bits 7 and 6 of the register-area address "0100" whose address value is stored in the addresses "8024" and "8025" and "11000000b" ("b" represents a binary data value) is stored in the address "8026". The part of the low-order addresses "4" and "5" is called "TADR" and the part of the low-order address "6" is called "TBIT".

Then, the bit "0" of the address "8027" is set to "1" because the exposure mode button is an object dedicated to input. Moreover, the bit "6" of the address "8027" is set to "1" in order to avoid duplication with the normal operation input processing because the exposure mode button is also used for normal operation.

Also, the bit "7" of the address "8027" is set to "1" because a judgment symbol is necessary to specify the operating state of the exposure mode button. Therefore, "11000000b" is stored in the address "8027". The part of the low-order address "7" is called "TTYP". The meaning of other bits of TTYP is shown in FIG. 30.

The following is the description of the table for mirror-up control as an example.

The mirror-up control is described as "MIRROR UP". When the head character is taken according to the head character extraction method previously mentioned, "MRUP" is obtained. Therefore, the character code of "MRUP" is stored in the addresses "8030" through "8033" of the object statement table.

Because the head address of the subroutine for mirror-up control is present at the address "9000" in the subroutine area, its address value is stored in the addresses "8034" and "8035". Because the mirror-up control is an object dedicated to output, the bit "1" of the address "8037" is set to "1". Moreover, the bit "2" of the address "8037" is set to "1" because the mirrorup control calls the subroutine. That is, "00000110b" is stored in the address "8037".

To execute the mirror-up control, the mirror should be under the down sate and the front and rear curtains of the shutter should be under the charge state. Therefore, the bit "0" of the address "8038" and the bits "6" and "4" of the address "8039" are set to "1". Because the mirror is moved up after the mirror-up operation ends, the bit "1" of the address "803A" is set to "1". Twelve-bit data made by combining 8-bit data whose low-order address is "8" with high-order 4-bit data whose low-order address is "9" is called "TSEQC" and that made by combining low-order 4-bit data whose low-order address is "9" with 8-bit data whose low-order address is "A" is called "TSEQS". The combination of "TSEQC" with "TSEQS" is called "TSEQ".

"TSEQC" shows the state of mechanical members which should be effected to start the control processing and TSEQC shows that of the mechanical members when the control processing ends. The meaning of other bits of TSEQ is shown in FIG. 31.

The table search processing (step S144) of the flow chart shown in FIG. 32B searches the position of "HD$" obtained through step S143 in the object statement table while checking with the character data of "THD$".

When "HD$" is matched with "THD$" of the object statement table (YES), "HD$" is stored in "EHD$ (N)", "TTYP" is stored in "ETYP (N)", "TADR" is stored in "EADR (N), "TBIT" is stored in "EBIT (N), and "TSEQ" is stored in "ESEC (N)".

If any "TDH$" is not matched with "HDF$ (NO), the error code showing that the input or output object statement of the inputted program language is incorrectly described is set (step S146).

However, if a control statement is described by attaching "THEN" to input object statement or a conditional discrimination statement is described by attaching "IF" to the output object statement though "THD$" is matched with "HD$", step S150 starts according to judgment in steps S147, S148, and S149, and the error code showing that no input/output processing can be executed is set.

Whether an object statement is used for input or output can be judged by the bits "0" and "1" of "ETYP (N)". For example, when "IF MIRROR=OFF/OF" or "THEN RELEASE BUTTON=ON" is described, the above error code is generated.

Then, symbol characters are extracted from "CM$" (step S151) and it is judged if any symbol is present (step S152). If so (YES), the data corresponding to the symbol is stored in "ECP (N)" (step S155). FIG. 29 shows the relationship between the symbol and the data stored in "ECP (N)". If not (NO), however, whether or not the object statement requires a symbol is judged by the bit "7" of "ETYP (N)" (step S153). If it is judged that the object statement requires no symbol, the execution data for one line is generated. Therefore "DEP3 processing" or step S132 starts to generate the execution data for the next line. If it is judged that the object statement requires a symbol, the error code showing that no symbol description is present is set (step S154).

For example, when "IF RELEASE BUTTON" is described, the above error code is generated because the condition cannot be decided in which the release button is brought under a state. Then, the characters showing the input discrimination statements or output control statements are extracted between the symbol of "CM$" and the line feed code (step S156).

These characters are called "VAL$" in the following description. Then, it is judged if "VAL$" is present (step S157). If not, the error code showing that no input or output discrimination statement is described is set (step S158).

If so, however, it is judged by the bit 3 of "ETYP (N)" whether the format of the input discrimination value or output control value is the character type or numeral type (step S159). If the value is the character type, the character code of "VAL$" is stored in "EVAL (N)" (step S160). If the value is the numeral type, the value converted from the character code of "VAL$" into numerical data is stored in "EVAL (N)" (step S161).

Figure 47:
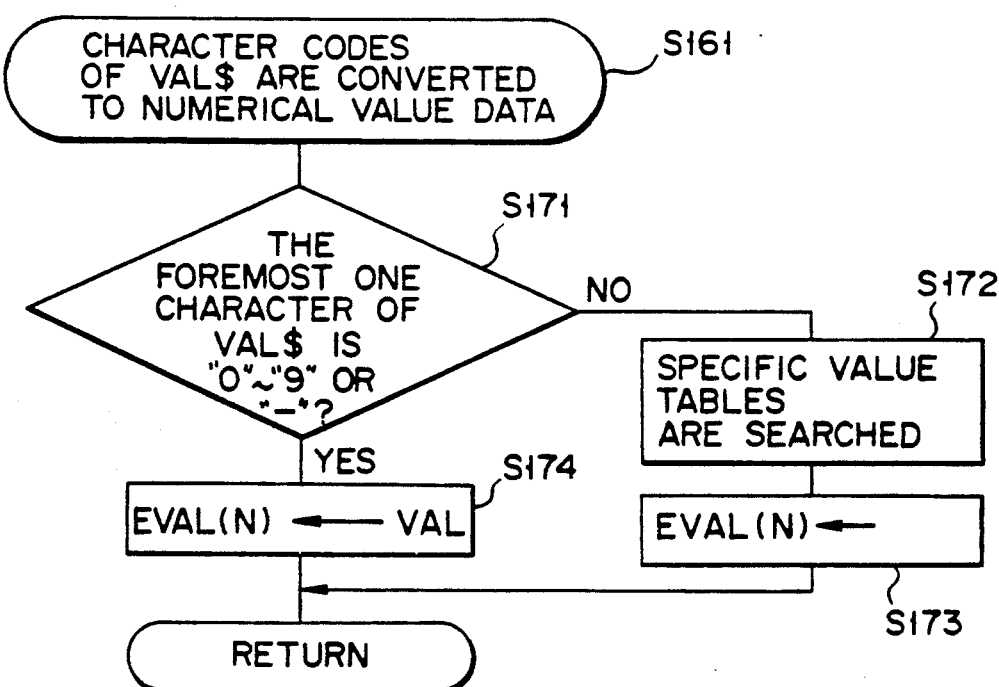
FIG. 47 is a flowchart showing the processing of conversion into numerical data (step 161) in FIG. 32D.

The flow chart in FIG. 47 shows the contents of the above step S161 in detail. For example, "VAL$" of "OFF/ON" is converted into numerical data (step S172) using the "eigenvalue table" in FIG. 45 and "0001h" ("h" represents hexadecimal data) is stored in "EVAL (N)" (Step S173).

For "VAL$" of "100", "0064h" is stored in "EVAL (N)" (step S174).

For the previously-described flow chart in FIG. 32D, it is judged whether or not the head statement is "THEN", that is, the execution data is for output control (step S162). If the head statement is an output control statement, it is judged if its output can be controlled by checking "ESEQS" of the execution data in the preceding line (step S163).

Figure 36:
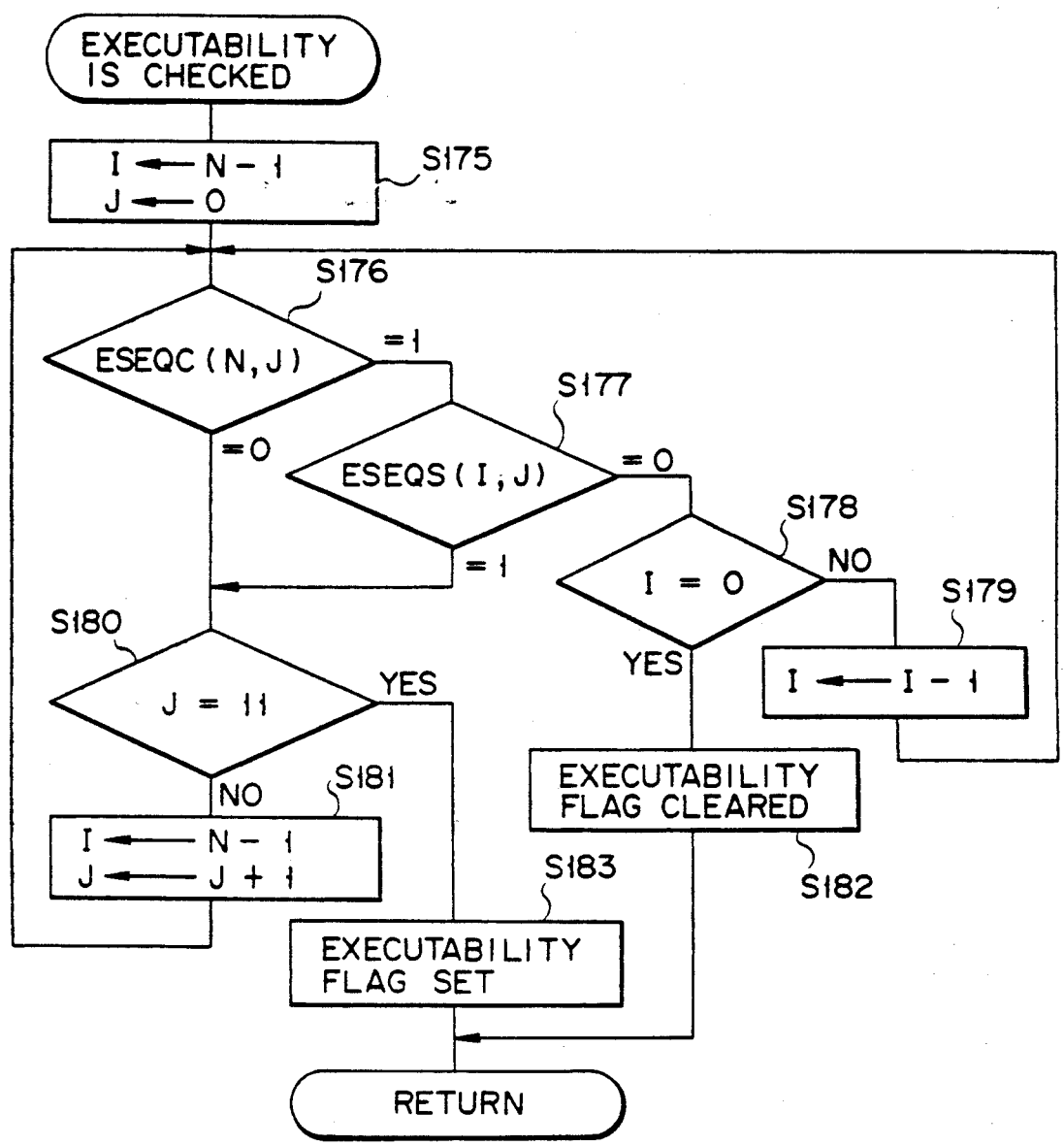
FIG. 36 is a flowchart for use in judgement on whether or not the execution data is executable.

The flow chart in FIG. 36 shows the contents for judging whether or not the previously-described output control is executable (step S163).

In FIG. 36, "ESEQC (N, J)" shows the flag at the bit "J" of "ESQC" (confirmation flag at execution) in the line of the execution data being generated and "ESEQS (I, J)" shows the flag (set flag after execution) at the bit "J" of "ESEQS" of the execution data in the I-th line. For example, to execute "SHUTTER OPEN", the bits 1, 2, and 4 of "ESEQC" are set to "1" because the mirror should be under the up state and the front and rear curtains of the shutter should be under the charge state.

Therefore, "SHUTTER OPEN" can be executed if the bits 1, 2, and 4 of "ESEQS" are set before the "SHUTTER OPEN" execution data. However, "SHUTTER OPEN" cannot be executed if any one of the bits 1, 2, and 4 of "ESEQS" is not set.

For initialization (step S175), the line for searching "ESEQS" is set to the line immediately before the current line and the bit for searching "ESEQC" is specified to the bit "0".

Then, it is judged if the confirmation flag at the bit "J" of the current line is set (step S176). If not, setting of the bit "J" starts for "0" (step S180). If so, it is judged for "1" whether or not the set flag at the bit "J" of the preceding line is set (step S177).

When the flag is set in the above step S177, setting of the bit "J" starts for "1" (step S180). If the flag is not set, it is judged for "0" whether or not search is executed up to the first line (step S178). Unless the set flag is set at the bit "J" as the result of searching up to the first line, the executable flag is cleared (step S182).

When it is judged that search is not executed up to the first line in step S178, step S179 starts to search the preceding line.

In the setting of the bit "J" (step S180), it is judged if all confirmation flags are checked. If not, the bit of the next confirmation flag is specified (step S181) and step S176 restarts. If so, the executable flag is set (step S183).

The following is the description of operations beginning with step S164 according to FIG. 32D.

It is judged by the control statement if the operation is executable (step S163) before it is judged if the executable flag is set (step S164). If the executable flag is set, step S166 to be mentioned later starts. If not, the error code showing that no operation is executable is set (step S165).

Then, one line for the address of the memory for storing execution data is fed (step S166), one line for the address of the memory for inputting character strings is fed by one line is fed, preparation for generating the execution data for the next line is executed, and "EDP3" or step S132 restarts (step S167). If an error code is generated during generation of the above execution data, "EDP2" or step S168 starts to store the line number causing the error before step S167 starts. Therefore, because the line of the section for storing the execution data is not renewed if an error occurs, the execution data causing the error is not stored but the next execution data is stored.

Because the inputted program language has 9 lines (excluding "END"), 9 lines of execution data are generated.

The following is the detailed description of the contents of "error display" of step S91 in the main flow chart in FIG. 21 according to the flow chart in FIG. 37. FIG. 38 shows the display state of the indicator before any program is inputted. The sign "E" showing that an error occurs is displayed in step S185 and the line number (CERR) causing the error and the error code (ERR) are displayed in step S186.

Therefore, if an error occurs, the display state changes to the state as shown in FIG. 39. FIG. 39 shows that the program at the third line has the "error 7", that is, the program cannot be executed in view of the sequence. In step S187, the characters of the line causing the error in the inputted program language are converted into small letters. In step S188, the program language is returned to the program generator through the transmission port (TXD). FIG. 40 shows the then display state of the program generator in which it is described by small letters that an error occurs at the third line.

As mentioned above, execution data is generated from the inputted program language. This has the following advantages.

First, execution data requires only half of the storage capacity compared with direct holding or program language because the execution data requires only 16 bytes though the inputted program language requires 32 bytes for the data for each line of the program language.

In addition, the area can be used for AF operation because the character string data of the original program language is unnecessary once the execution data is generated.

Moreover, even if the syntax of "IF", "THEN", or discrimination symbol of the program language is incorrectly described, an object statement not inputted to the camera is specified, or a description which cannot be executed is made because of the sequence of the mechanical member operation, each operation is checked to display an error, if any, and the execution data is not stored in the memory.

Therefore, the mechanical members in the camera are not broken or do not cause abnormal operation because no execution data is generated in a program which cannot be executed.

For other advantages, a program inputted to the camera itself can be checked because the data (EHD$) for the head character of an input or output object statement is included in the execution data.

Figure 48:
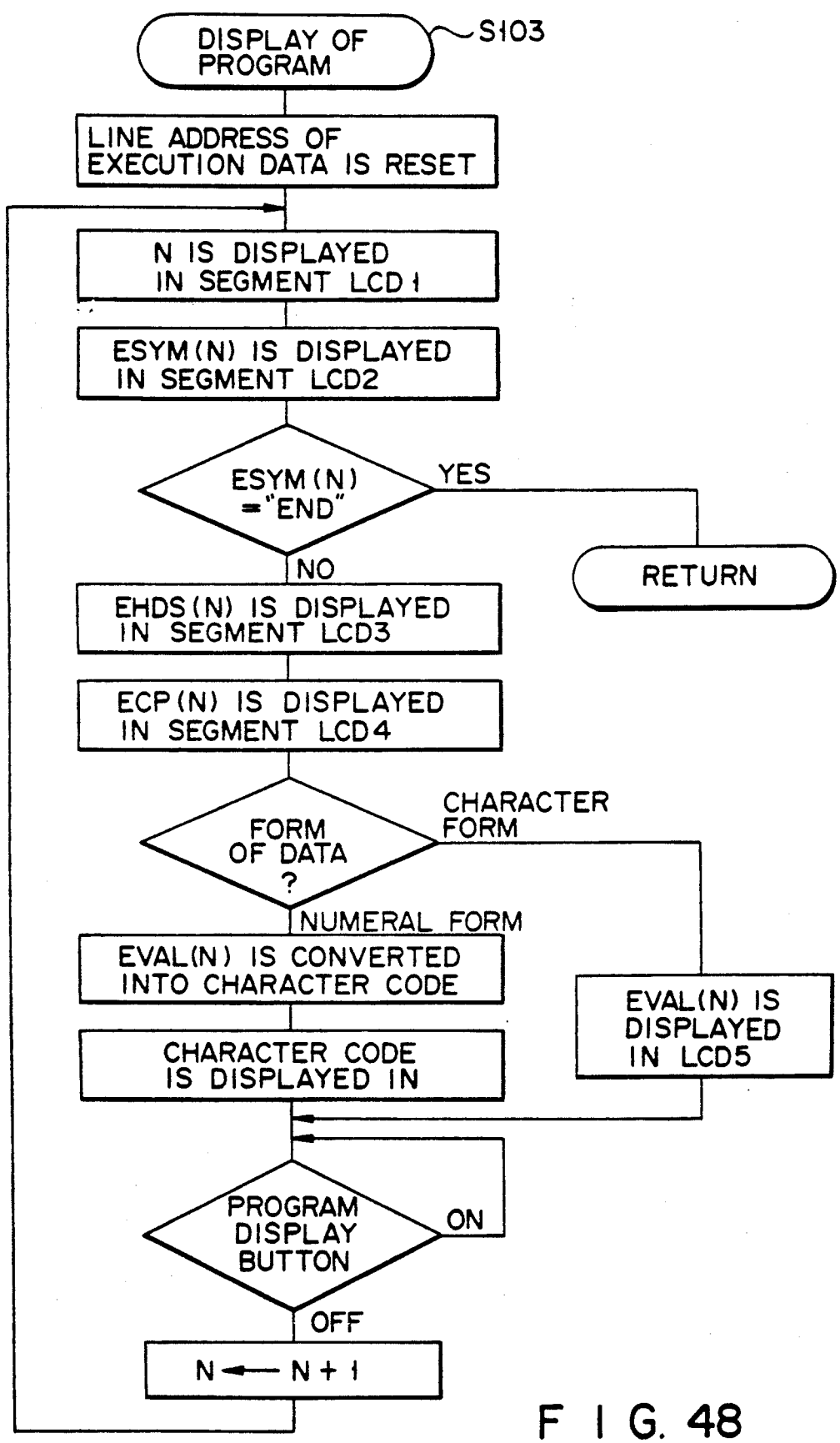
FIG. 48 is a flowchart showing the processing of display of program (step 103) in the main flowchart of FIG. 21B.

The flow chart in FIG. 48 shows the contents of "program display" of step S103 in the main flow chart in FIG. 21 in detail. In FIG. 48, data is read from the execution data one line by one line whenever the program display button is pressed and the read data is displayed on the indicator.

Figures 49, 50:
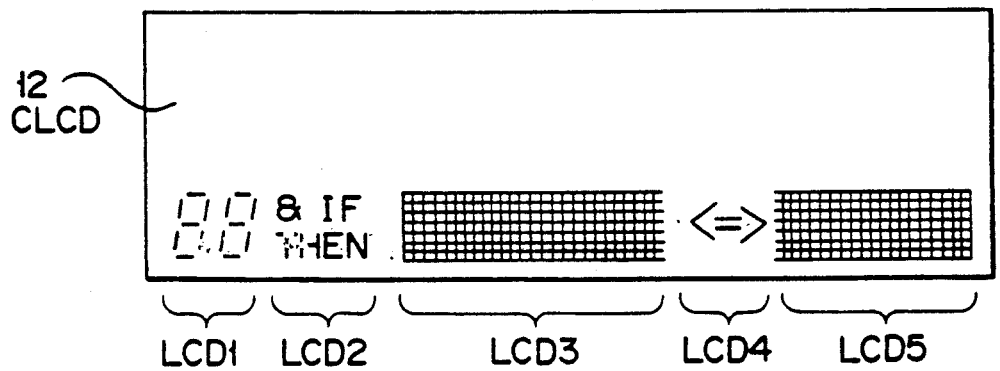
FIG. 49 is a view showing a program display portion in the display section.
FIG. 50 is a view showing the form of display which is made in the display section for each depression of the program display button.

FIG. 49 shows the section for display of the program in the indicator, in which LCD1 is a segment for displaying a line number, LCD2 is a segment for displaying a head character, LCD3 is a matrix-type segment for displaying the head character (EHD$) of an object statement, LCD4 is a segment for displaying a symbol, and LCD5 is a matrix-type segment for displaying an input discrimination value or output control value (EVAL).

FIG. 50 shows the display state of the indicator whenever the program display button is pressed. That is, the first stage shows the execution data corresponding to "IF EXPOSURE MODE BUTTON=ON" at the 0-th line, the second stage shows the execution data corresponding to "&IF RELEASE BUTTON=OFF-/ON" at the first line, the third stage shows the execution data corresponding to "THEN MIRROR UP" at the second line, and the fourth stage shows the execution data corresponding to "THEN SHUTTER OPEN" at the third line.

Thus, the indicator of the camera of the present invention allows the camera alone to display the outline of a program by displaying execution data though the camera cannot display the entire program language because it has less segments than the indicator.

The following is the description of the "execution data" of step S90 in the main flow chart in FIG. 21 according to the flow chart in FIG. 42.

Figure 42A:
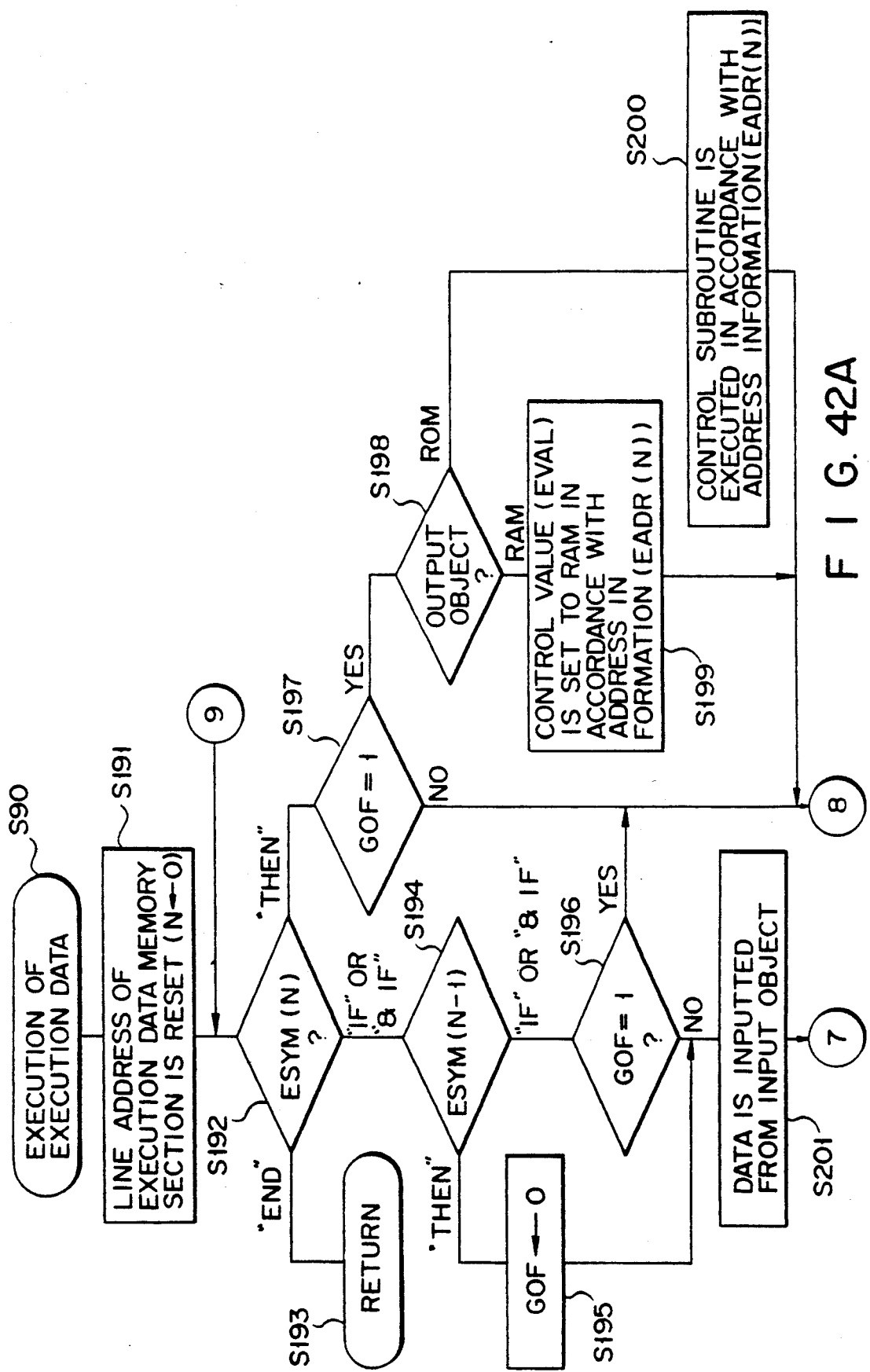
FIG. 42A is a flowchart for execution of the execution data.
Figure 42B:
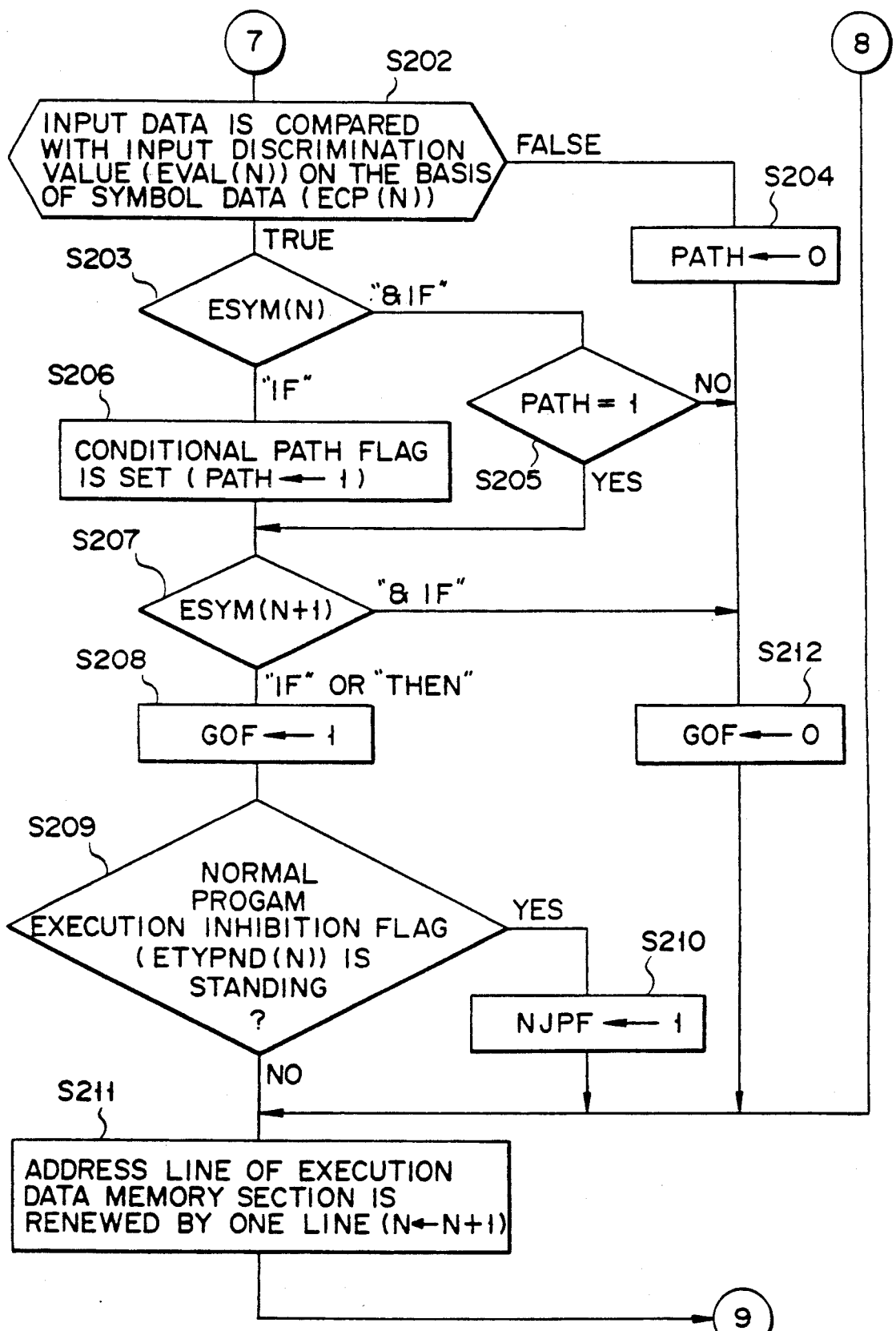
FIG. 42B is a flowchart for execution of the execution data.

The flow chart in FIGS. 42A and 42B has the feature in which the execution data is read one line by one line and, if the read data is conditional discrimination data, it is judged whether or not the relationship between the input value and the input discrimination value of an input object statement is effected as symbol data ("true" if the relationship is effected; "false" if it is not effected), and an execution permitting flag (GOF) is set for true and, if GOF is set when control data is read, operation is executed according to the control statement. If a description is made to execute the control statement when the conditions of both the first and second lines of the program language are true (e.g. "IF A=a", "&IF B=b", "THEN X"), GOF is not set even if the condition of the first line is true but GOF is set when the condition of the second line becomes true.

The flow chart in FIGS. 42A and 42B is described below.

First, the line of the execution data storage section is reset and the execution data is read starting with the head line (step S191). A line is shown by the variable "N" in the following description.

Then, "ESYM (N)" or the head character data is judged (step S192). For "END", the processing ends (step S193). If "THEN", step S197 to be mentioned later starts. For "IF" or "&IF", step S194 starts.

In other words, it is judged in step S194 if the head statement of the preceding line is "THEN". If so, GOF is cleared (step S195). If not, GOF judgment (step S196) starts.

The above GOF clearing is the processing executed when the control statement ends at the second line (e.g. "IF A=a, "THEN X", "IF B=b", ... ), a new conditional discrimination statement is described from the third line, and the execution data at the third line is read.

Because there is the above processing for GOF clearing (step S195), it is possible to continuously describe a plurality of programs consisting of the combination of "IF ... " and "THEN".

For the above GOF judgment (step S196), it is judged if GOF is set. If so, line-address line feed (step S211) starts without executing the conditional judgment processing after the input from the input object (step S201).

Because there is the above processing for GOF judgment (step S196), a description such as "IF A=a", "IF B=b", "IF C=c", "THEN X" can be made. When the condition at the first line becomes true and GOF is set, the control statement at the fourth line is executed without executing conditional judgment of the second and third lines.

Therefore, the time for conditional judgment can be decreased and processings can be executed at a high speed. Moreover, if GOF is not set for the above GOF judgment (step S196), an input object is selected to obtain the input value according to the input object data (EADR (N), EBIT (N), and ETYP (N)), in the case of the input from the input object (step S201).

The contents of the input from the above input object (step S201) are described below in detail according to the flow chart in FIG. 43.

In the flow chart, RAM (EADR) shows the data for one byte of the RAM to be accessed by "EADR (N)". DT0, DT1, DT2, and DT3 are 4-byte registers for storing the data for input values for comparison with "EVAL (N)". They are called "DT".

Figure 43:
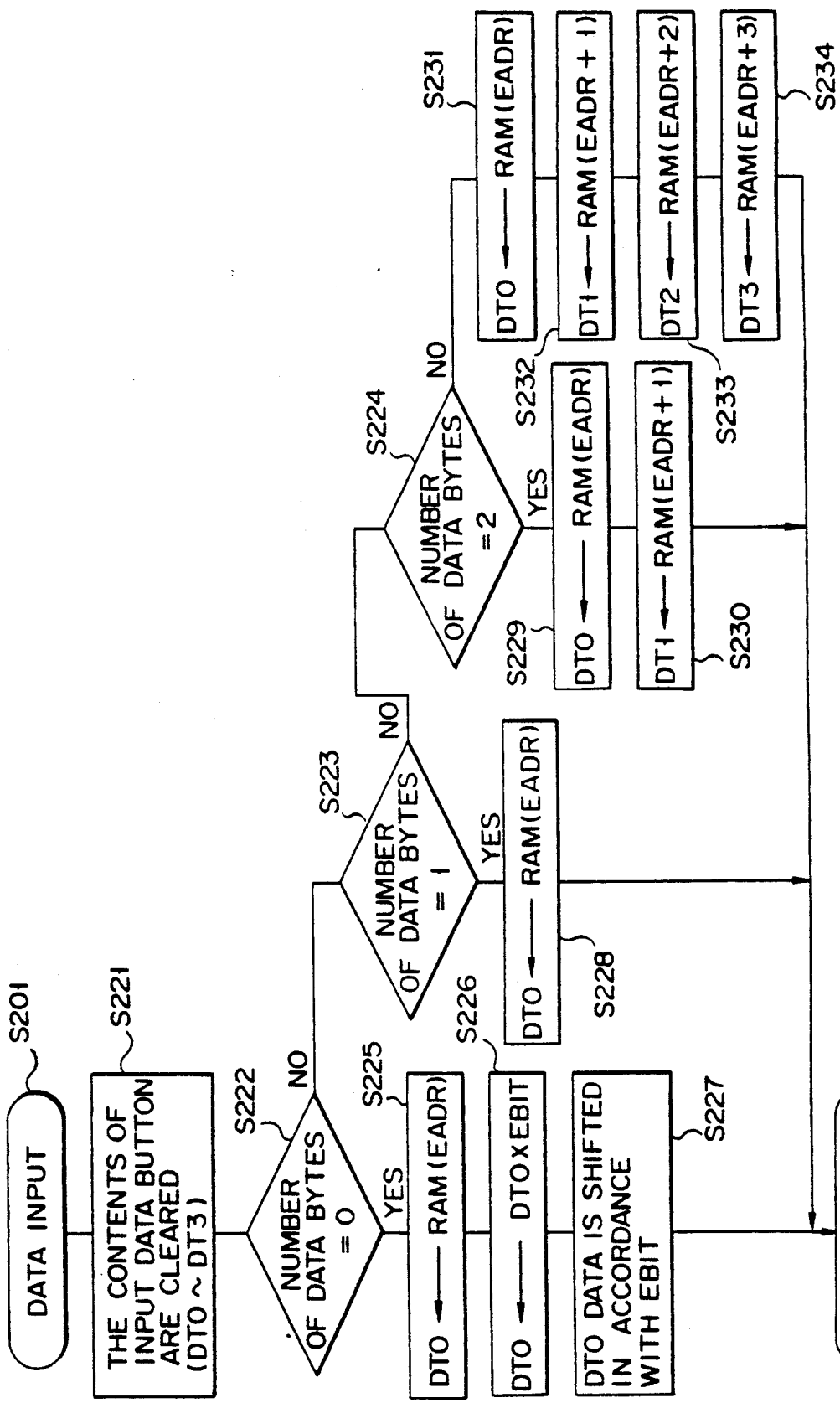
FIG. 43 is a flowchart for the processing of input data of the above-mentioned input object.

For the flow chart shown in FIG. 43, RAM is accessed by the address data "EADR (N)" of the input object, and one-, two-, or four byte data is read from RAM according to the number-of-byte data (bits 4 and 5 of "ETYP (N)") and stored in DT.

In steps S225, S226, and S227 of this processing, the logical multiplication of one-byte data and bit position data read through the processing when the number of bytes if "0" or bit data (EBIT (N) is computed and all unnecessary bits are cleared to "0" before data is shifted according to the position of "EBIT (N)".

For example, when "EBIT (N)" is "00110000b", data is shifted by 4 bits to the right.

Thus, comparison between DT and EL (N) can be executed, step S228 shows one-byte data read, steps S229 and 230 show two-byte data read, and steps S31 through S34 show four-byte data read.

The discrimination symbol judgment (step S202) in FIG. 42 is described below again.

It is judged if the relationship between the input data (DT) and the input discrimination value "EVAL (N)" from the input object in step S201 previously mentioned is equal to the relationship with the discrimination symbol "ECP (N)" (step S202).

Figure 44:
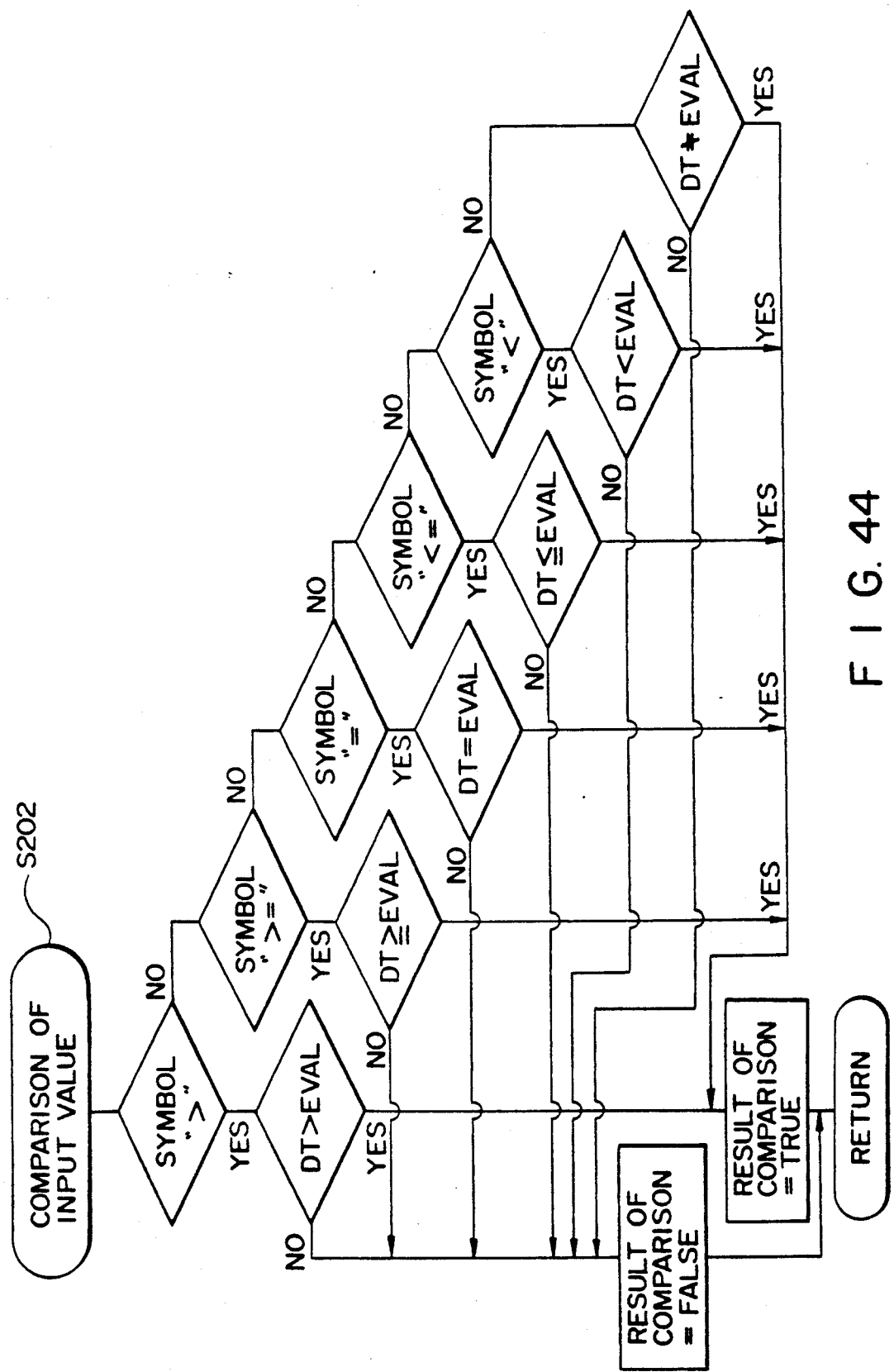
FIG. 44 is a flowchart showing the processing of discrimination note judgement (step 202) in FIG. 42B.

The flow chart in FIG. 44 shows the discrimination symbol judgment (step S202).

In step S202, comparison operation is executed according to the discrimination symbol to set the flag showing whether the comparison result is true or false. For the conditional discrimination statement "IF RELEASE BUTTON=OFF/ON", for example, the comparison result becomes true when the release button changes from off to on state.

As the result of judging whether the comparison result of the above discrimination symbol judgment is true or false (step S202), if the comparison result is false, the "PATH" flag is set to "0" (step S204) before GOF is set to "0" (step S212).

However, if the comparison result is true, it is judged whether the head statement is "IF" or "&IF" (Step S203). For "IF", "PATH" is set to "1" (step S206). For "&IF", it is judged whether "PATH is "1" of "0" (step S205). Then step S207 starts if "PATH" is "1" but step S212 starts if it is "0".

In step S207, it is judged if the head statement at the next line is "&IF". If so, GOF is cleared to "0" (step S212). If not, GOF is set (step S208).

For the processings from steps S203 through S208, GOF is set to "1" when "&F" statement is met when "PATH" is "1" and execution of control statement is permitted.

Then, it is judged if the flag (bit 6 of "ETYP (N)") for inhibiting the normal processing is set (step S209). If so, NJPF is set (step S210). If not, the line of the execution data to be read is renewed (step S219 before step S192 restarts.

Meanwhile, when the head statement is judged to be "THEN" in step S192, it is judged if GOF is set to "1" that is, the execution permission flag is set (step S197). If so, the output object judgment (step S198) starts. If not, line-address line feed (step S211) starts.

In the above output object judgment (step S198), it is judged by the bit 2 of "ETYP (N)" whether the output object statement is ROM (subroutine calling) or RAM (data setting). If the output object is RAM, step S199 starts to set the value of EVAL to the RAM to be accessed by "EADR (N)". If the output object is ROM, step S200 starts to call and execute the subroutine with the top address of "EADR (N)".

For the control statement "THEN MIRROR UP", for example, the subroutine at the address "900" is called to execute the MIRROR-UP operation. In this case, once GOF is set, it holds the flag unless the conditional discrimination statement ("IF" statement or "&IF" statement) is present. Therefore, a description such as "IF A=a, "THEN X", "THEN Y", "THEN Z" is possible and the control statements at the second, third, and fourth lines are continuously executed when the condition at the first line becomes true.

Figure 51B:
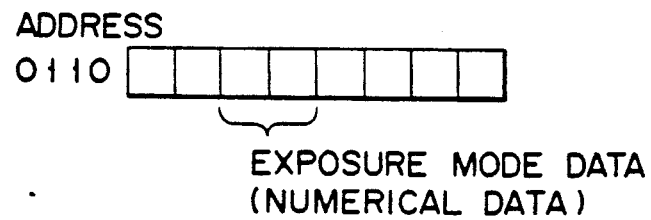

FIG. 51 shows the part for setting the exposure mode of "normal operation input processing" of step S93 in the main flow chart in FIG. 21 and the contents of the register for storing the exposure mode.

In FIG. 51, data for the exposure mode is increased if the dial rotates clockwise when the dial is pressed while the exposure mode button is pressed and decreased if the dial rotates counterclockwise. For the data for the above exposure mode, "0" represents the program mode (P), "1" represents the aperture priority mode (A), "2" represents the shutter priority mode (S), and "3" represents the manual mode (M). Therefore, when the dial rotates clockwise, the exposure mode changes in order of "P", "A", "S", "M", "P", "A", and so on.

When the dial rotates counterclockwise, the mode changes in order of "P", "M", "S", "A", "P", "M", and so on. In this case, the exposure mode is handles as numerical data. To handle numerical data, however, it is necessary to convert the input discrimination statement or output control statement of an externally-inputted program into numerals by using, for example, the eigenvalue table as shown in FIG. 45. The following is the description of a method without using the eigenvalue table.

When the above eigenvalue table is not used, it is only necessary to convert the data format into the character type. For the exposure mode, for example, it is only necessary to store the character codes including "P", "A", "S", and "M" as exposure mode data.

Figure 52A:
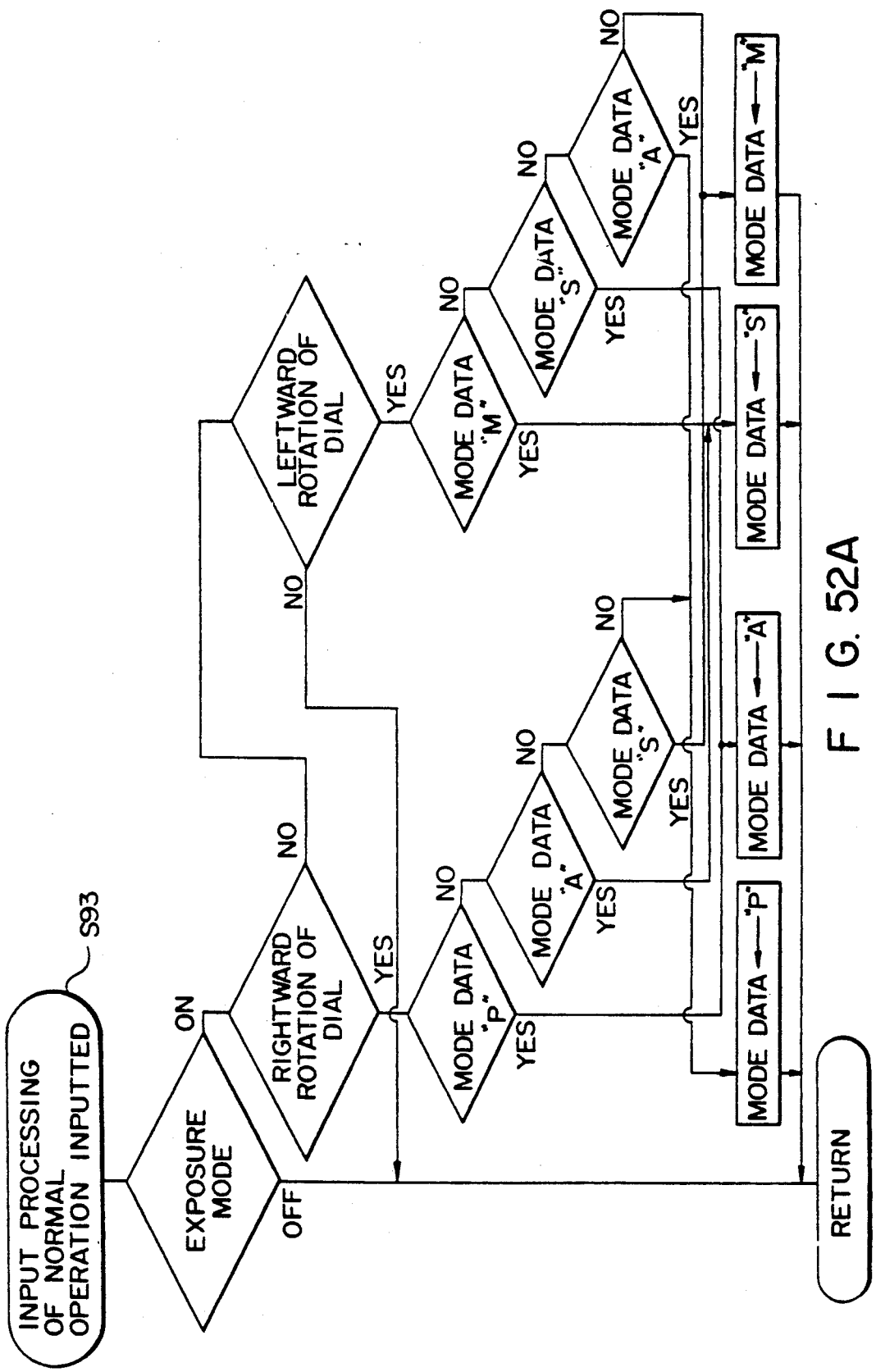

FIG. 52A shows the exposure mode processing flow chart when the exposure mode data is converted into character-type data and FIG. 52B shows the contents of the register for storing the exposure mode data.

In FIG. 52B, the character code of a new exposure mode is set according to the rotational direction of the dial and the character code of the current exposure mode. Therefore, by converting data into the character type, no eigenvalue value table is necessary for a description such as 'IF EXPOSURE MODE=M or "THEN EXPOSURE MODE=S". It is possible to handle not only the exposure mode but the advancing mode and focus mode as character-type data.

The following is the description of execution of the program language for bulb control according to the flow chart in FIG. 42B.

First, when the exposure mode button is turned on by the description of "IF EXPOSURE MODE BUTTON=ON" at the first line, steps S202, 203, and 206 start in order and "PATH" is set to "1". However, the control statements on and after the third line are not executed because GOF does not come to "1" even if the above state is maintained.

Then, when the second stroke of the release button is changed from off to on by the description "&IF RELEASE BUTTON=OFF/ON" at the second line, steps S202, S203, S205, S207, and S208 start in order and GOF is set to "1". Then, step S109 is started by the description "THEN MIRROR UP" at the third line and by the fact that GOF is "1" and the subroutine for mirror-up control is called to move up the mirror.

Then, step S200 is started by the description "THEN SHUTTER OPEN" at the fourth line and by the fact that GOF is "1" and the subroutine for shutter-open (start of the front curtain operation) is called to operate the front curtain and open the shutter.

When the second stroke of the release is changed from off to on, release control is normally executed by step S99 in FIG. 21. In this case, however, because NJPF is set to "1", the release does not malfunction even if the operation in the main flow chart restarts after the execution data is executed.

Even if the release button is kept on, the comparison result in step S202 becomes false and GOF is set to "0" by step S212. Therefore, control statements on and after the seventh line are not executed but the shutter is kept open. When the exposure mode button or the release button is released by the descriptions "IF EXPOSURE MODE BUTTON=ON/OFF" at the fifth line and "IF RELEASE BUTTON=ON/OFF" at the sixth line, GOF is set to "1" by step S208.

Then, the subroutine for start of shutter rear curtain operation is called to close the shutter by the description "THEN SHUTTER CLOSE" at the seventh line and by the fact that GOF is "1".

Then, the subroutine for mirror down is called to move down the mirror by the description "THEN MIRROR DOWN" at the eighth line and by the fact that GOF is "1".

Then, the subroutine for shutter charge is called to charge the shutter by the description "THEN SHUTTER CHARGE" at the ninth line and by the fact that GOF is "1".

Then, the subroutine for advancing is called to advance the film by the description "THEN ADVANCE" at he tenth line and by the fact that GOF is "1".

The following is the description of an processing example when another program language is inputted.

For example, the program that "the mirror moves up after AF operation control when the first stroke of the release button is turned on and the release operates when the second stroke of the release button is turned on" is described as follows:

IF DISPLAY BUTTON=OFF/ON
THEN AF
THEN MIRROR UP
 IF RELEASE BUTTON=OFF/ON
THEN RELEASE
END

Conventionally,, there is a camera in which the mirror is moved by a lever and the release is operated by a release button in order to prevent the camera from vibrating.

However, to execute AF operation before moving up the mirror, it is necessary to half-press the release button first. Therefore, three types of operations are necessary. Also, camera shake may occur even if the mirror is moved up because the release is not operated unless the release button is pressed again.

However, by inputting the program language to the camera, operation is simplified and camera shake is prevented because the mirror is moved up and the release is operated by the same operation member. The subroutine for release control is designed to prevent the mirror from moving up again when it is moved up as shown in FIGS. 22 and 23. Therefore, the release smoothly operates even if the above program is inputted.

The program to inhibit AF operation control by the first stroke of the release button but execute AF operation by operating the ISO button is described as follows:

IF DISPLAY BUTTON=OFF/ON
THEN NORMAL PROGRAM=DISABLE
 IF ISO BUTTON=OFF/ON
THEN AF
END

In this case, the program at the second line is used to set the previously-mentioned NJPF flag (normal-program execution inhibiting flag), by which NJPF is set and AF operation by the first stroke of the release button is inhibited.

Figures 53C, 54A:
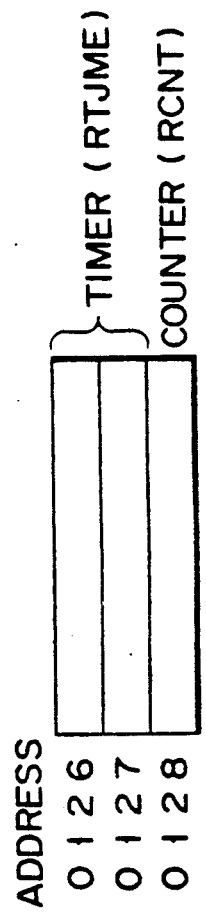
FIG. 53C is a view showing an object sentence table for input object sentence of the "NORMAL PROGRAM" referred to in connection with step 144 of FIG. 32B.
FIG. 54A is a view showing a RAM map concerning the timer register (RTIME) used for the processing of timer operations

FIG. 53A shows the map for the address and bit position where the NJPF flag is present and FIG. 53B shows the eigenvalue table used for step S161 in FIG. 32. FIG. 53C shows the object statement table for the input object statement "NORMAL PROGRAM" to be referenced in step S144 in FIG. 32.

When the above program is inputted, control of AF operation and that of release operation can be executed by a separate operation member. It is conventionally necessary to half-press the release button for so-called "AF operation locking" to hold a lens at the position after AF operation. For the above program, however, AF operation locking can easily be made because AF operation is executed by the ISO button before the release is operated by the release button.

The program in which "the release operates 200 ms after the mirror moves up when the second stroke of the release button is turned on" is described as follows:

IF RELEASE BUTTON=OFF/ON
THEN MIRROR UP
THEN TIMER=200
THEN RELEASE
END

In the above program, the third line is a program for calling the subroutine for timer processing to be freely used by users. FIG. 54A shows a RAM map of the timer register (RTIME) used for the above timer processing. "RCNT" in FIG. 54A is a count register to be freely used by users.

FIG. 54B shows the contents of the object statement table corresponding top "TIMER" of an output object statement. It also shows the contents of the object statement table corresponding to the input/output object statement "COUNTER" and the output object statements "COUNT UP" and "COUNT DOWN".

FIG. 54C shows a flow chart for the subroutine for timer processing. In the timer processing (step S231), the output control value (EVAL) of execution data is inputted to RTIME (step S232) to make the latency of 1 ms (step S233) and subtraction is applied to RTIME (step S235).

Then, it is judged if RTIME comes to "0" (step S236). If not, step S233 restarts. Therefore, users can freely specify the setting time with the unit of 1 ms.

For a conventional camera, the mirror is previously moved up or the release time is delayed by a self-timer in order to prevent camera shake. However, because the delay time can only be set to a predetermined value, there is no freedom of selection.

However, by inputting the above program, users can freely set the delay time. The above program is designed so that the mirror is moved up before the release is operated. However, it is also possible to set the time (release time lag) until the release operation starts after the release button is pressed by the following program.

IF RELEASE BUTTON=OFF/ON
THEN TIMER=200
THEN RELEASE
END

In addition, by using the above-mentioned time, it is possible to easily program so-called "interval photographing" in which the release operation is controlled at any time interval. The following is an example for operating the release every one second.

IF RELEASE BUTTON = OFF/ON
THEN RELEASE

```
THEN TIMER = 1000
THEN RELEASE
THEN TIMER = 1000
THEN RELEASE
   .
   .
   .
```

The program language to "execute AF operation after the release button is half-pressed and move the focus lens forward by two pulses from the original lens position (to make back focus)" is described as follows:

```
IF DISPLAY BUTTON=OFF/ON
THEN AF
THEN FOCUS COMPENSATION=2
END
```

The third line of the above program is a program for compensating the position of the focus lens by two pulses. FIG. 55A shows the object statement table corresponding to the output statement "FOCUS COMPENSATION" and FIG. 55B shows the subroutine for focus compensation. In this case, the resolution for the number of pulses to be compensated is equal to the detection resolution of the lens position detecting means in FIG. 20. Compensation control is executed by moving the focus lens from the current position by the distance equivalent to the output control value (EVAL).

The above program is effective to, when focusing the camera on, for example, the face of a person, first execute AF operation at a portion such as his "eye" or "hair" which is easily brought into focus and then compensate the focus to his "nose" or "cheek" which should finally be brought into focus. Focus compensation is conventionally executed by half-pressing the release button to execute AF operation before manually compensating the focus through manual focus. However, the problem is solved by inputting the above program.

The program language to focus the camera on three positions such as the current focused position, a position 3 pulses forward from the current position, and a position 2 pulses backward from the current position and continuously take pictures is described as follows:

```
IF RELEASE BUTTON=OFF/ON
THEN RELEASE
THEN FOCUS COMPENSATION=-3
THEN RELEASE
THEN FOCUS COMPENSATION=5
THEN RELEASE
END
```

In the above program, the third line is a program for compensating the focused position by 3 pulses forward and the fifth line is a program for compensating the focused position by 2 pulses backward. In the above fifth line, the compensation value is set to "5" because the focused position is brought to "−3" by execution of the program at the third line.

Conventionally, there is a technique called "exposure shifting photography" or "AEB (Auto Exposure Bracketing)" in which photographing is executed while shifting the exposure value in release control. However, by inputting the above program, "focus shifting photographing" or "AFB (Auto Focus Bracketing)" is realized.

Especially to finely focus a camera on the "eye" or "nose" of a person, troublesome operation for executing photographing while adjusting the focus through manual focus is eliminated.

The above program is use to compensate the focused position of the image currently taken in. However, the following is an example of the program language for setting the focused position with an absolute value regardless of change of the image.

```
IF RELEASE BUTTON=OFF/ON
THEN FOCUS=100
THEN RELEASE
THEN FOCUS=97
THEN RELEASE
THEN FOCUS=102
THEN RELEASE
END
```

The above program shows a program language to "continuously execute photographing while setting the lens position to the positions 100, 97, and 102. FIG. 55A shows the contents of the object statement table corresponding to the output object statement "FOCUS".

FIG. 55C shows the contents of the subroutine which is called when the output object statement is "FOCUS", in which the lens is controlled by the output control value (EVAL).

By inputting the above program, "focus position shifting photography" or "ADB (Auto Distance Bracketing)" is realized. Especially when the positional relation between a camera and an object is kept constant, there is the advantage that AF operation can be omitted or the position of a focus lens can be specified even if AF operation cannot be executed because of a low brightness.

It is described above that the motor is used to move the control member only up to the target position. FIG. 56 shows a block diagram for controlling the speed of each motor.

That is, in FIG. 56, the selection signal (DRVS) for selecting at least one motor and the duty signal (DRVS) for controlling the driving waveform of the motor are inputted to the motor driving circuit 112 from the CPU 106.

The selection signal selects the direction in which any one of the mirror motor 120, advancing motor 116, rewinding motor 119, and charging motor 117 is driven and the duty signal changes the time for on and off to control the motor speed.

"IMUP" of the CPU 106 is an input port for detecting if the mirror is present at the photographing position (up state) and "IMDW" is an input port for detecting if the mirror is present at the observation position (down state). Each signal is input from the mirror state detecting means.

"IWS" of the CPU 106 is a port for inputting the feeding speed to obtain the signal generated by the roller following a film through the "feeding speed detecting means" and "IWP" of it is a port for inputting the feeding quantity to obtain the signal generated by the roller following the film through the "feeding quantity detecting means".

It is assumed that the feeding speed is the film moving length/sec shown in millimeters and the feed quantity is the quantity shown in millimeters. Therefore, when advancing or rewinding a film, speed feedback control can be made. Thus, the film can be fed at a constant speed.

"ISHG" of the CPU 106 for control is an input port for obtaining the charge state of the shutter through the "shutter charge state detecting means".

FIG. 57 shows the relationship between the control position and the time and that between the state of DRVD (duty signal) and the time when decreasing the duty ratio of a motor and driving the motor at a low speed, and FIG. 58 shows the relationship between the control position and the time and that between the state of DRVD (duty signal) and the time when increasing the duty ratio of the specified motor and driving the motor at a high speed.

Figure 60:
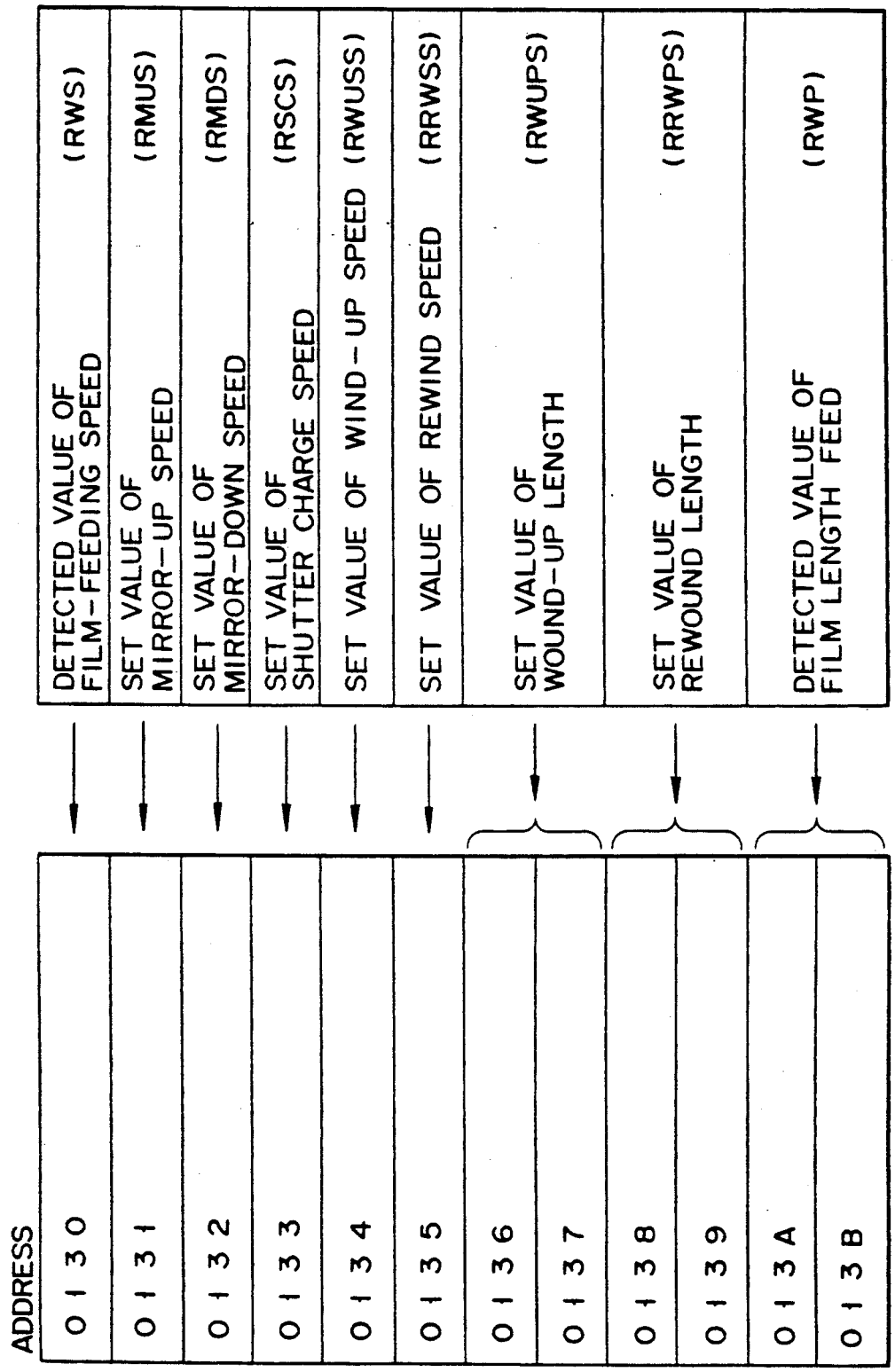
FIG. 60 is a RAM map for registers each storing therein a parameter used to control the motor speed and position in FIG. 59.

FIG. 60 shows the RAM map of the registers storing the parameter for controlling the speed and position of each motor. Each register stores the specified value when CPU is activated. The following is the description of how to control the speed of each motor.

Figure 59A:
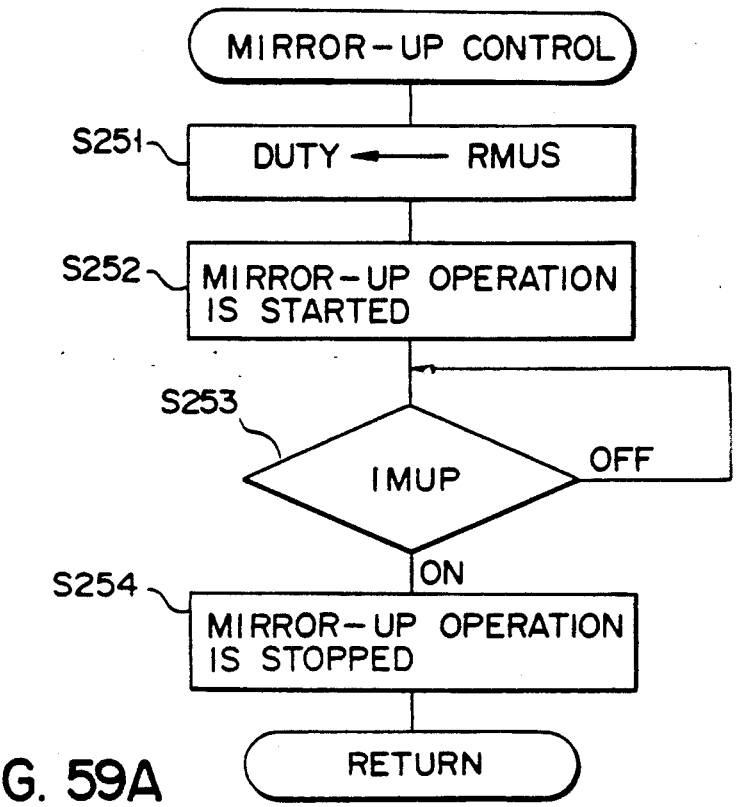

FIG. 59A is a flow chart showing the mirror-up control processing. First, the duty ratio is set according to the value stored in RMUS (step S251). Then, the mirror motor is set to the normal-rotation side (step S252) and mirror-up operation is started. Then, it is judged if IMUP is turned on (step S253). If not, step S253 restarts. If so, the mirror-up operation is stopped (step S254).

Figure 59B:
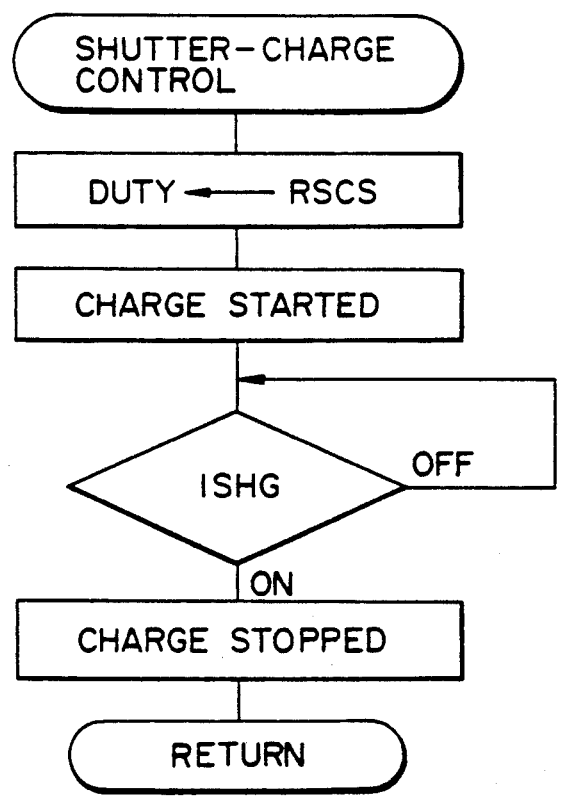
FIG. 59B is a flowchart showing the processing of a shutter charge control.

The flow chart for mirror-down control processing is omitted. However, similarly to the above, the duty ratio is set according to the value stored in RMDS and the mirror is reversed until IMDW is turned on. FIG. 59B is a flow chart showing the shutter charge control processing, in which the duty ratio is set according to the value stored in RSCS before the charge motor is driven until ISHG is turned on.

FIG. 62 is a flow chart showing the winding control processing. The winding speed (film wind up speed) control is executed by the flow chart.

Figure 63A:
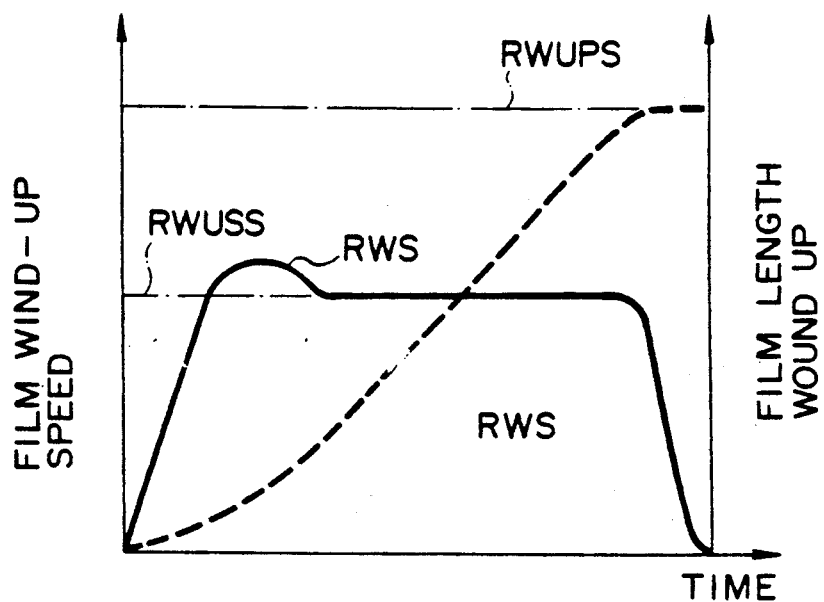
Figure 63B:
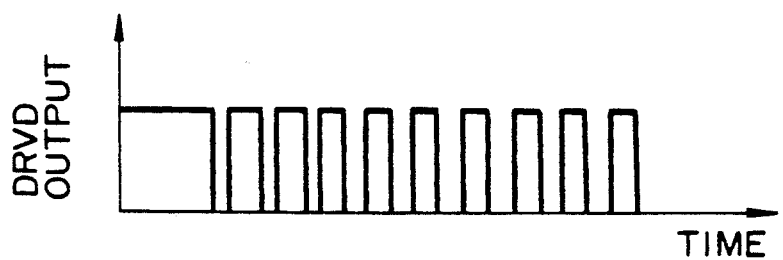
FIG. 63B is a waveform view showing the duty signal (DRVD) as represented in relation to time.

FIG. 63A shows the relationship between the speed and the time and that between the film length wound up and the time, and FIG. 63B shows the relationship between the duty signal (DRVD) and the time.

In previously-mentioned FIG. 62, the winding motor 116 is driven before winding starts (step S261). Then, the film length wound up is inputted to store it in RWP (step S262). Then, RWP is compared with RWUPS (the film length wound up set value) (step S263). If the RWP reaches the set value, winding ends (step S264).

If not, the next step S265 starts.

In this case, RWUPS normally stores the data for the wound up for one frame. Therefore, the film is normally advanced for one frame. Then, the winding speed is inputted (step S265) to store it in RWS.

Then, RWS is compared with RWUSS (winding speed set value) (step S266). If RWS is lower (slower) than RWUSS, the duty ratio is increased (step S268). If the former is higher (faster) than the latter, the duty ratio is decreased (step S267). That is, for the winding speed, the duty ratio is decreased as shown in FIG. 63B when RWS is faster than RWUSS as shown in FIG. 63A to keep the speed constant with the value of RWUSS.

FIG. 64 shows a flow chart showing the rewinding control processing. In FIG. 64, the rewinding motor 119 is driven before rewinding is started (step S271).

Then, the feeding quantity is inputted to store it in RWP (step S272) and it is judged if RWP is changed from the last time (step S273). In other words, it is judged if the film is removed from the driven roller and rewound up to the end of the film and the driven roller stops.

That is, if RWP does not change as the result of judgment in step S273, step S274 starts to end rewinding. If RWP changes, step S275 starts. In step S275, it is judged if RWP reaches the value of RRWPS. If so, step S274 starts. If not, step S276 starts.

In this case, step S275 is not normally shifted to step S274 to end rewinding by storing a value larger than the length of one film in RRWPS. In step S276, the winding speed is inputted to store it in RWS. Then, step S277 starts.

In step S277, RWS is compared with RRWSS (rewinding speed set value). If RWS is lower (slower) than RRWSS, step S278 starts to increase the duty ratio. If the former is higher (faster) than the latter, step S279 starts to decrease the duty ratio. Therefore, the rewinding speed is kept constant with the value of RRWSS. As mentioned above, because the driving speed of each motor can be controlled according to the value stored in each register, it is possible to eliminate noises produced due to driving of motors by the following program.

```
THEN ERROR UP SPEED = 20
THEN MIRROR UP
...
THEN MIRROR DOWN SPEED = 15
THEN MIRROR DOWN
...
THEN SHUTTER CHARGE SPEED = 35
THEN SHUTTER CHARGE
... .
THEN WIND UP SPEED = 38
THEN WIND UP
...
THEN REWIND SPEED = 76
THEN REWIND
...
```

In the above program, "MIRROR UP SPEED", "MIRROR DOWN SPEED", "SHUTTER CHARGE SPEED", "WIND UP SPEED", "REWIND SPEED" are output object statements for specifying "RMUS", "RMDS", "RSCS", "RWUSS", and "RRWSS" which are registers for the speed control parameter. In this case, output control values on and after "=" are set to the specified output object statement. FIG. 61 shows the contents of the object statement table corresponding to the output object statement in the above program. In this case, winding and rewinding film length can be set. Therefore, it is possible to make, for example, a program to "wind up the film according to the rotational angle of the dial when turning the dial counterclockwise while pressing the release button and stop to wind up when advancing the film for one frame". The above program language is shown below.

```
IF RELEASE BUTTON=OFF/ON
THEN WIND UP LENGTH=0
THEN RELEASE
THEN COUNTER=0
  IF RELEASE BUTTON=ON
  &IF DIAL=L
THEN COUNT UP
  &IF COUNTER<=19
THEN WIND UP LENGTH=2
THEN WIND UP
  IF RELEASE BUTTON=ON/OFF
THEN WIND UP LENGTH=38
END
```

In the above, program, the second line is used to prevent the normal wind up operation at the end of release processing from executing by setting the film length wound up to "0".

The sixth line is used to check if the dial rotates counterclockwise. The seventh line is used to operate the frame counter, in which counting is executed whenever the release button is pressed and the dial rotates. The eighth line judges if the counter indicates "19" or less, in which it is judged if the film is wound up for one frame (38 mm) because it is wound up by 2 mm for "1" count according to the program at the tenth line.

Figure 65:
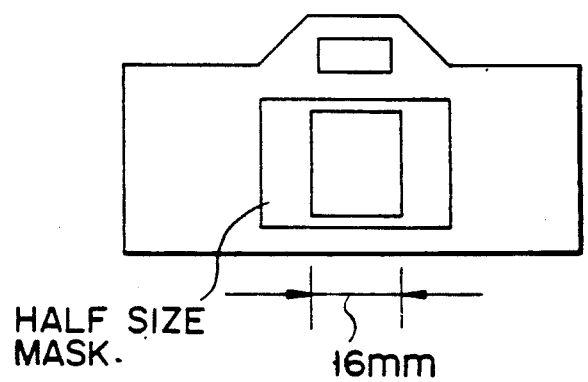
FIG. 65 is a view showing the construction of a half size camera.

Therefore, even if the release button is pressed and the dial is continuously rotated counterclockwise, the frame counter indicates 20 or more and winding is stopped. The eleventh line judges if the release button is released. If so, the film length wound up is set to the initial value (38 mm) by the program at the twelfth line. Because the film length wound up can be set, it is also possible to use a camera as a half-size camera by installing a "half size mask" in front of the film as shown in FIG. 65 and inputting the program for half-size winding as shown below.

```
IF RELEASE BUTTON=OFF/ON
THEN WIND UP LENGTH=18
THEN RELEASE
END
```

As described above in detail, according to the present invention, it is possible to previously check if an abnormal operation occurs by the indicator of a camera or an indicator outside a camera such as a program generator even if control programs are inputted to the camera in the sequence in which an abnormal operation may occur.

Therefore, it is possible to previously correct the program so that no abnormal operation occurs. It is also possible to avoid an abnormal operation even if no program is corrected by avoiding the program which may cause an abnormal operation from storing as execution data. Therefore, even for a camera with the configuration in which mechanical members are complicatedly related each other, it is possible to prevent the mechanical members from breaking due to an abnormal operation and abnormal current from occurring.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A camera to which program instructions for controlling the camera operations can be inputted from outside the camera, comprising:

inputting means for inputting a character string consisting of natural language representing a program for controlling the operation of constituent elements of the camera, the character string being one prepared outside the camera, detecting means for detecting whether or not the foremost characters of a specified number in said character string are those representing a conditional portion, conditional portion head-character picking up means which, in case it has been detected by said detecting means that said foremost characters of said character string are those representing said conditional portion, is intended to extract from said character string the head characters of words constituting said character string in the form of a symbol code representing said conditional portion and control portion, memory means for storing a pair of said symbol code and the foremost addresses of each subroutine for executing a control instruction represented by said symbol code, in corresponding relation to said symbol code, searching means for searching said foremost address corresponding to said symbol code from said memory means in accordance with at least said symbol code of said control portion extracted by said conditional portion head-character picking up means or control portion head-character picking up means, and subroutine execution means for executing a subroutine in accordance with said address searched by said searching means, whereby, in case said address searched by said searching means indicates the symbol code representing said conditional portion, a subroutine for judging whether or not the condition has been satisfied is first executed and then a subroutine for said control portion, whereas in case said address searched by said searching means indicates no symbol code representing said conditional portion, a subroutine for control portion is immediately executed.

2. The camera according to claim 1, further comprising display means which is used to make an error display in the case where no address corresponding to said symbol code has been searched by said searching means.

3. The camera according to claim 1, wherein said character string contains instructions for input control operation and output control operation in the case where said character string includes said conditional portion head characters, and contains an instruction for output control operation in the case where said character string does not include said conditional portion head characters; said conditional portion head-character picking up means sequentially picks up said head character (capital letter) from each word and sequentially stores said head character from the 1st address; and said control portion head-character picking up means sequentially picks up said head character from each word and sequentially stores said head characters from a next address after said 1st address.

4. A camera system including a camera to which programs can be inputted and being adapted to perform a plurality of control operations in accordance with a plurality of control program instructions inputted from outside the camera, comprising:

central processing unit (CPU) for controlling the camera operations, subroutines for executing individual camera operations, stored in ROM located within said CPU, inputting means for inputting a character string prepared outside the camera and consisting of natural language representing the program intended to control the operation of each constituent element of said camera, take-out means for sequentially taking out a one-line character string from said character strings representing said programs, checking means for taking out a control object sentence from said one-line character string and checking the number of words constituting said control object sentence, extraction means for extracting a specified head character from each word of said control object sentence and causing said characters thus extracted to constitute a specified symbol code for outputting the same, in corresponding relation to the number of words determined by said checking means, memory means for storing therein the addresses of subroutines for executing a program instruction represented by said symbol code, in combination with the addresses and in units of each symbol code, searching means for searching, in accordance with said symbol code extracted by said extraction means, the address of the corresponding subroutine, from said memory means, and, subroutine execution means for executing the subroutine stored in said address searched by said searching means.

5. The camera system according to claim 4, in which said memory means stores the addresses of the subroutines in a manner that the use purpose of processing of the subroutine corresponding to said symbol code includes not only the use purpose of input processing thereof but also the use purpose of output processing thereof, and which further comprises extraction means for taking out a specified number of the foremost characters from said one-line character string and extracting the foremost word representing one use purpose of processing of two use purposes of processing one of which is a use purpose of input control processing and the other of which is a use purpose of output control processing, judging means for determining whether or not the use purpose of processing represented by said foremost word and said use purpose of processing corresponding to said symbol code stored in said memory means are in coincidence with each other, and display means for making an error display in the case where said both have been determined not to coincide with each other by said judging means.

6. The camera system according to claim 4, further comprising display means for making an error display in the case where the corresponding address has not been found by said searching means.

7. A camera to which a program instruction for controlling the camera operation can be inputted from outside the camera, comprising:

inputting means for inputting a character string consisting of natural language representing a program used to control the operation of each constituent element of said camera, the character string being one prepared outside the camera, extraction means for extracting from said character string thus inputted a part of each word constituting the string as one used to constitute a symbol code, subroutines stored in ROM for executing the individual operations of the camera, memory means for storing, for each said symbol code, addresses of said ROM storing therein said subroutine for executing a program instruction corresponding to said symbol code, searching means for searching an address of said subroutine corresponding to said symbol code, from said memory means, and, executing means for executing said subroutine stored in said address thus searched.

8. The camera according to claim 7, which further comprises checking means for checking the foremost characters from said character string which indicate that the succeeding character string portion is used for input processing, and take-out means for taking out from said character string a control sentence excluding said foremost characters indicating the use for input processing, and in which, if said character string contains said foremost characters indicating the use for input processing and if said execution means detects that the control sentence succeeding to said foremost characters is qualified as said control sentence, said execution means executes the contents of a control sentence to be outputted which succeeds to this control instruction.

9. The camera according to claim 7, in which said memory means stores also the RAM addresses for input processing in corresponding relation to said ROM addresses if said control instruction corresponding to said symbol code is a control sentence to be inputted, thereby to judge, by the presence or absence of said RAM address, whether or not said control instruction is a control sentence to be inputted.

10. A camera system composed of a camera containing at least one control program used to control drive sections for operating constituent elements of the camera and a peripheral device thereof, said peripheral device comprising:

a character string preparation means for preparing a character string indicating the state of operation of the drive section for driving desired constituent element, and sending means for sending to said camera said character string prepared by said character string preparation means, and, said camera comprising:

receiving means for receiving said character string sent from said sending means of said peripheral device, conversion means for converting said character string received by said sending means into a specified symbol code in accordance with a predetermined rule, tables for storing address data of said control program used to control the operations of said drive sections for driving said constituent elements, in corresponding relation to said symbol code, searching means for searching the address data of said control program from said tables on the basis of said symbol code converted from said character string by said conversion means, memory means for storing therein the address data of said control program searched by said searching means, and, control means for controlling the operation of said drive section for driving each said constituent element on the basis of said data stored in said memory means.

11. The camera system according to claim 10, in which said character string prepared by said character string preparation means is one which consists of combined words forming natural language, the words indicating the operation of each constituent element of said camera.

12. The camera system according to claim 10, in which said conversion means operates to extract a specified number of characters containing at least capital letters of each word from said character string sent from said peripheral device.

13. The camera system according to claim 10, which has display means for making a warning display in the case where it has been found that the result searched by said searching means is absent in the table corresponding to said symbol code converted by said conversion means.

14. A photographing device having a plurality of control programs and being adapted to execute any one of said control programs in response to the data received from an external device, comprising:
   first memory means in which said plurality of control programs are stored in advance,
   means for receiving from the external device the character string data consisting of natural language and representing an operation desired to be controlled, which operation is performed in accordance with said control program,
   means for extracting local data from said character string data received as above in accordance with a specified reference for extraction, thereby to generate a first symbol code,
   address data generation means for generating an address data in corresponding relation to said first symbol code, and,
   means for designating said control program in said first memory means by use of said address data and executing the control program thus designated.

15. The photographing device according to claim 14. in which said address data generation means includes second memory means for storing beforehand a plurality of sets of data regarding a plurality of control programs, each set of data thereof being associated with one control program and composed of a second symbol code representing the control contents of the one control program and the data of a foremost address in which the one control program is stored, and
   means for searching said second symbol code in said second memory means to generate the data of the foremost address which constitutes a set of data having stored therein the same code as said first symbol code.

16. The photographing device according to claim 15, in which said address data generation means includes display means which, in case said address data generation means searches said second symbol code in said second memory means and as a result determines that no set of data has the same code as said first symbol code, makes its display of that it is impossible to perform the control operation corresponding to the character string received.

17. The photographing device according to claim 15, in which said address data generation means includes sending means which, in case said address data generation means searches said second symbol code in said second memory means and as a result determines that any set of data does not have the same code as said first symbol code, sends an item of data indicating that it is impossible to perform the control operation corresponding to said character string data received.

18. The photographing device according to claim 15, which further comprises display means for making its display of said first symbol code.

19. A camera which is adapted to control the driving of a plurality of constituent elements in response to a plurality of control program instructions inputted form outside the camera and to which programs can be inputted, comprising:
   subroutines stored in ROM and used to execute the operations of constituent elements of the camera,
   extraction means for extracting a symbol code from said plurality of control program instructions on an instruction-by-instruction basis,
   memory means for storing therein addresses representing said subroutines used to execute said control program instructions, in corresponding relation to said symbol code, ad for storing therein the operational state of said constituent elements after the execution of said subroutines as well as the operational state of said constituent elements immediately before the execution of said subroutines, this operational state being necessary for execution of said subroutines,
   comparison means for making comparison between two operational states of each said constituent element, one operational state being necessary for, but immediately preceding to, the execution of at least one control program of said plurality of control programs and the other operational state following the execution of another control program instruction executed before the execution of said at least one control program, in order to detect whether or not said plurality of control program instructions inputted by said inputting means are executable, said comparison being made by reading out said immediately preceding operational state and said succeeding operational state, and,
   display means for making a warning display of error in the case where it has been determined by said comparison means that said operational state of one constituent camera element for execution of said at least one control program instruction is out of coincidence with one for said another control program.

20. The camera according to claim 19, in which said comparison means compares said operational state for said one control program instruction with that of a corresponding camera element in an initialized state of said camera in the case where another control program does not exist before the execution of said one control program.

21. A camera which is adapted to perform a plurality of control operations in response to a plurality of control program instructions inputted from outside the camera and to which programs can be inputted, comprising:
   inputting means for inputting said plurality of control program instructions from outside the camera,
   subroutines stored in ROM and used to execute the operations of constituent elements of the camera,
   memory means for storing therein the operational states of said constituent elements necessary for execution of said subroutines and the operational states of said constituent elements following the execution of said subroutines,
   read-out means for reading out, in order to judge on the executability of said plurality of control program instructions inputted by said inputting means, from said memory means the operational states of said constituent elements necessary for executing a desired one of said plurality of control program instructions and for reading out, for the same purpose, from said memory means the operational states of said constituent elements following the execution of a control program instruction immediately before said desired one control program instruction is executed, and judging means for comparing one with the other of said two operational states of said constituent elements read out by said read-out means to judge, if both said operational states do not coincide with each other, that said desired one control program instruction is incapable of being executed.

22. The camera according to claim 21, which further comprises display means which makes a warning display when it has been judged by said judging means that said desired one control program instruction is incapable of being executed.

23. The camera according to claim 21, which further comprises inhibiting means which operates to inhibit the execution of said desired one control program instruction when it has been judged by said judging means that said desired one control program instruction is incapable of being executed.

24. A camera including processing means for storing control programs for controlling the driving of a drive section operating to drive constituent elements, in a memory in the form of subroutines, the subroutines being sequentially designated from an external unit so as to drive the constituent elements, comprising:
  first memory means for storing therein executable states of constituent elements in the form of English character string/numeral string data, in corresponding relation to said subroutines,
  second memory means for storing therein states of said subroutine after said subroutines have been executed, in corresponding relation to said subroutines,
  outputting means for sequentially outputting subroutine designation data corresponding to said subroutines being designated by said external unit,
  read-out means for reading out said English character string/numeral string data stored in said first and second memory means in response to said subroutine designation data outputted from said outputting means,
  third memory means for storing therein said English character string/numeral string of said second memory means read out by said read-out means and said subroutine designation data,
  comparison means for comparing said English character/numeral string data of said second memory means corresponding to said subroutine, said string data being one stored in said third memory means at a time immediately preceding to the execution of the present subroutine, with the newest said English character/numeral string data corresponding to said subroutine stored in said first memory means, each time said subroutine designation data is outputted, and
  inhibiting means for stopping said English character/numeral string data of said second memory means read out from being stored into said third memory means in the case where the values of both items of data are out of coincidence as a result of operation of said comparison means.

25. The camera according to claim 24, which further comprises display means for making a warning display in the case where said English character/numeral string data of said second memory means previously stored in said third memory means and said English character/numeral string data of said first memory means most newly read out are out of coincidence as a result of operation of said comparison means.

26. A camera including processing means for storing control programs for controlling the driving of a drive section operating to drive constituent elements, in a memory in the form of subroutines, the subroutines being sequentially designated from an external unit so as to drive the constituent elements, comprising:
  outputting means for sequentially outputting the subroutine data corresponding to a subroutine designated from said external unit,
  memory means for storing therein said subroutine data outputted from said outputting means,
  judging means for judging, each time the newest subroutine is designated by said external unit, and on the basis of said subroutine data stored in said memory means at a time immediately preceding to the execution of said newest subroutine and said newest subroutine data outputted from said outputting means, whether or not said newest subroutine can be executed subsequently to the execution of said previously designated subroutine, and,
  inhibiting means for stopping said newest subroutine designated by said external unit from being stored in said memory means in the case where said judging means has judged that execution of said newest subroutine subsequent to the execution of said previously designated subroutine is impossible.

27. The camera according to claim 26, which further comprises display means which makes a warning display in the case where it has been determined as a result of operation of said judging means that execution of said newest designated subroutine subsequent to execution of said previously designated subroutine is impossible.

28. The camera according to claim 26, in which said outputting means is one which produces as said subroutine data a program address of said newest subroutine designated from said external unit and data representing proper operational states of constituent camera elements before and after the execution of said newest subroutine; and said judging means is one which compares data representing the operational state of a corresponding constituent elements after execution of a subroutine in the subroutine data previously stored in said memory means with data representing the operational state of said constituent element before execution of said newest subroutine data and judges that subsequent execution of said newest subroutine data is impossible, in case both data do not coincide with each other, each time the newest subroutine is designated from said external unit.

29. A photographing device receiving a plurality of data sent from an external unit and controlling a drive section for constituent elements in corresponding relation to said data, comprising:
  a control mechanism for controlling the drive section for said constituent elements,
  first memory means in which there are stored a plurality of control programs for individually controlling said drive section for said constituent elements,
  second memory means for storing therein beforehand conditional data each representing a proper state of said constituent element enabling execution of each corresponding program of said control programs,
  third memory means for storing therein oeforehand state data each representing a state of said constituent element succeeding to the execution of each corresponding program of said control programs,
  designation means for designating one of said constituent elements desired to be operated and for sequentially receiving a plurality of control object data being sent in the sequential order in which said constituent elements are driven under control, read-out means for reading out from said second memory means said conditional data corresponding to the newest said control object data designated by said designation means and for reading out from said third memory means said state data corresponding to said control object data previously designated, judging means for judging whether or not said conditional data and said state data read out by said read-of means are in coincidence with each other, and, drive control means for reading out from said first memory means said control program having been designated by the control object data concerning which it has been judged by said judging means that both said conditional data and said state data are in coincidence, thereby to drive a corresponding said constituent element.

30. The photographing device according to claim 29, which further comprises display means for making its display to the effect that the designated data sent from said external unit is improper, in the case where said judging means has judged that said two items of data are not in coincidence.

31. The photographing device according to claim 29, which further comprises sending means for sending to said external device an indication data to the effect that the designated data sent from said external unit is improper, in the case where said judging means has judged that said two items of data are not in coincidence.

32. A camera system including a camera and an external unit, said camera including drive sections for operating constituent elements of the camera and an input section for inputting signals, the camera containing at least one control program for controlling the operation of said drive sections, said external unit comprising:

character string preparation means for preparing a character string representing the operation of each said constituent element desired to be controlled and character strings representing inputting conditions for said input section, and sending means for sending said character strings into said camera, and said camera comprising:

receiving means for receiving said character strings sent from said external unit, conversion means for converting each said character string received by said receiving means into a specified symbol code in accordance with a predetermined rule, data table means for storing therein an address data of said control program and data representing a state of input of said input section in corresponding relation to said symbol code, searching means for searching from said data table means said address data of said control program corresponding to said symbol code converted by said conversion means and said data representing said state of input of said input section, memory means for storing therein said address data of said control program searched by said searching means and said data representing said state of input of said input section, and control means for controlling the operation of said drive sections for said constituent element in accordance with said address data stored in said memory means at the time when said state of input of said input section has been determined to coincide with said state of input stored in said memory means in connection with said constituent element.

33. The camera system according to claim 32, in which said character string prepared by said character string preparation means is an English character/numeral string (character/numeral string) which represents said state of input of said input section as well as the operation of each said constituent element desired to be controlled.

34. The camera system according to claim 32, in which said conversion means operates to extract a specified number of characters including a capital letter in each word, from said English character/numeral string sent from said external unit and to convert said extracted characters into a symbol code.

35. The camera system according to claim 32, which further comprises display means for making a warning display in the case where it has been determined as a result of searching operation of said searching means that there is no table corresponding to said symbol code converted by said conversion means.

36. A photographing device adapted to receive data from an external unit and execute the drive control operation of each of constituent elements in response to said data received, comprising:

first memory means for storing therein beforehand a control program for individually performing the drive control operation for each said constituent element, receiving means for receiving from said external unit a program language for causing a control operation to be performed in corresponding relation to judgement of input, the program language consisting, in combination of an input judging character string composed of input-judging discrimination characters, input object designation characters and judging characters, and a controlling character string consisting of at least control object designation characters, second memory means for storing therein a plurality of data strings each prepared by converting each of said character strings received into a data string, inputting means for inputting of operations and signals, state-of-input detection means for detecting the state of input of said inputting means and causing said state of input to be stored in third memory means, data producing means for producing an execution data string by sequentially reading out from the foremost one said data strings stored in said second memory means, data processing means which operates to discriminate by use of a foremost data of said execution data string that said execution data string is one for input judgement or for control instruction, and which, in case said execution data string is for use in judgement of input, designates an address of said third memory means in accordance with the input object designation character of said execution data string and judges whether or not said data of address as designated is in coincidence with the judging data of said execution data string to generate a coincidence signal in case of coincidence judgement, and which, in case said execution data string is one for control instruction and in case said coincidence signal has been generated, designates an address of said first memory means in accordance with the control object designation data of said execution data string, thereby causing said control program as designated to be executed, and means which, after said data producing means has read out all of said data strings and after said data processing means has processed all of said execution data strings, again causes said state-of-input detection means, said data producing means and said data processing means to operate.

37. The photographing device according to claim 36, in which said input judging character string or said controlling character string is an English character/numeral string which represents a matter desired to be inputted or controlled with respect to said photographing device.

38. A camera which is adapted to perform a plurality of control operations in response to a plurality of control program instructions inputted from an external unit and to which programs can be inputted, comprising:

inputting means for inputting a character string representing a program instruction prepared by said external unit, detection means for extracting, for each line of said character strings, a specified number of characters succeeding to the foremost character inclusive and detecting whether or not the character string thus extracted is a predetermined foremost character string, and, display means which makes an error display in the case where it has been detected by said detection means that the program instruction consisting of said character string does not include said foremost character string as predetermined.

39. The camera according to claim 38, which further comprises:

take-out means for taking out a control sentence from said character string excluding said predetermined foremost character string, subroutines for executing the program instruction corresponding to said control sentence, extraction means for extracting a symbol code from said control sentence, memory means for storing therein addresses for said subroutines, each address corresponding to said symbol code, and searching means for searching the address for said subroutine in accordance with said symbol code extracted by said extraction means.

40. The camera according to claim 39, which further comprises display means for making an error display in the case where said address corresponding to said symbol code has not been found by said searching means.

41. The camera according to claim 38, which further comprises:

take-out means for taking out a control sentence from said character string excluding said predetermined foremost sentence, memory means for storing whether the control instruction corresponding to said control sentence is one intended to be inputted or one intended to be outputted, in corresponding relation to said control sentence, comparison means for making comparison between said predetermined foremost sentence and said control instruction to be inputted or outputted which has been stored in said memory means, for determining whether or not both correspond to each other, and display means for making an error display in the case where said both have been determined to be out of coincidence by said comparison means.

42. The camera according to claim 38, which further comprises:

note take-out means for taking out a note from said character string, memory means for storing therein whether or not the control instruction corresponding to said control sentence requires inclusion of any note, in corresponding relation to said control sentence, and display means for making an error display in the case where any note has not been taken out by said note take-out means irrespective of the fact that said control sentence requires the use of any note.

43. A camera which is adapted to perform a plurality of control operations in response to a plurality of control program instructions inputted from an external unit and to which programs can be inputted, comprising:

inputting means for inputting a character string representing the program instruction prepared by said external unit, control-sentence take-out means for taking out a control sentence from said character string, note take-out means for taking out a note from said character string, memory means for storing, in corresponding relation to said control sentence, whether or not the control instruction corresponding to said control sentence requires the use of any note, and display means for making an error display in the case where any note has not been taken out by said note take-out means irrespective of the fact that said control sentence necessitates the use of any note.

44. The camera according to claim 43, in which said control-sentence take-out means operates to extract a symbol code from said character string from which said control sentence has been taken out, whereas said memory means operates to store whether or not said control sentence necessitates the use of any note, for each symbol code corresponding to said control sentence.

45. A camera which is adapted to perform a plurality of control operations in response to a plurality of control program instructions inputted from an external unit and to which programs can be inputted, comprising:

inputting means for inputting a character string prepared by said external unit and representing said control program instruction, memory means for storing therein said plurality of control program instructions for each control instruction, first confirmation means for confirming, for each control instruction, that the foremost characters are contained in the foremost specified character string, take-out means for taking out a control sentence from a character string extending from said foremost characters to a note, conversion means for converting said control sentence into a symbol code, searching means for searching from ROM the data corresponding to said symbol code, second confirmation means for confirming that said corresponding data has been searched by said searching means, third confirmation means for confirming, in accordance with said corresponding data, that said foremost characters are in corresponding relation to said control sentence, fourth confirmation means for confirming that said note exists in the case of said control sentence necessitating the inclusion of said note, fifth confirmation means for confirming, in the case where said control sentence is to be outputted, that it is executable, by use of respective said corresponding data of said control sentence and a preceding control sentence, and display means for making an error display in the case where said confirmation has failed to be made by any one of said first to fifth confirmation means.

46. The camera according to claim 45, in which said error display means operates to display the number of a line corresponding to said program instruction in which said error has occurred.

47. The camera according to claim 45, in which said error display means operates, to display said program instruction in which no error generates, by use of big letters and to display said program instruction in which said error has occurred, by use of small letters.

48. A photographing device adapted to receive the data sent from an external unit and perform a processing corresponding to said data, comprising:

a plurality of operation members, first memory means for storing therein, in corresponding relation to each operation members of said plurality of operation members, a specified-control execution permission data which indicates permission or non-permission of the execution of the specified control in the case where each said operation member has been operated, a plurality of control means, second memory means for storing therein beforehand a plurality of control program instructions for individually controlling said plurality of control means, receiving means for receiving operation-member designation data and control object designation data sent from said external unit, means for generating a first permission signal in the case where said operation member corresponding to said operation-member designation data, of said plurality of operation members, has been operated, means for generating a second permission signal in the case where said operation member corresponding to said operation-member designation data, of said plurality of operation members, has been operated and in the case where said specified-control execution permission data stored in said first memory means and designated by said operation-member designation data is indicating the permission of the specified control, means for executing, in case said first permission signal has been generated, said control program stored in said second memory means and designated by said control-object designation data, and means for performing a specified item of control corresponding to the operation of said operation member in the case where this said operation member corresponding to said operation-member designation data, of said plurality of operation members has been operated and where said second permission signal has been generated.

49. A photographing device adapted to control the amount driven or the drive speed of a photographing member drive for purpose of photographing, in corresponding relation to data sent from an external unit, comprising:

a plurality of photographing members, a plurality of driving mechanisms provided for individually driving said plurality of photographing members, detection means provided for individually detecting the amount driven or the drive speed of each of said plurality of photographing members, memory means for individually storing therein target drive values for said plurality of photographing members, control means for controlling each of said driving mechanisms for said plurality of photographing members and driving said driving mechanism so that each said detected value may be in coincidence with said target drive value stored in said memory means, means for receiving a character string data sent from said external unit, said character string data consisting of natural language and each concerning a control object and a target drive value, means for generating from said character string as received, numerical value data of said target drive value as well as control object designation data, and means for designating an address of said memory means in accordance with said control object designation data and writing said numerical value data of said target drive value into said address thus designated.

* * * * *